United States Patent
Saitoh et al.

(10) Patent No.: US 7,239,596 B2
(45) Date of Patent: *Jul. 3, 2007

(54) OPTICAL PICKUP DEVICE AND OPTICAL RECORDING MEDIUM DRIVING APPARATUS

(75) Inventors: Ryo Saitoh, Yokohama (JP); Fumihiko Ito, Kawasaki (JP); Yoshinari Yokochi, Tokyo (JP); Makoto Itonaga, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 534 days.

This patent is subject to a terminal disclaimer.

(21) Appl. No.: 10/848,612

(22) Filed: May 19, 2004

(65) Prior Publication Data

US 2004/0233821 A1    Nov. 25, 2004

(30) Foreign Application Priority Data

May 23, 2003  (JP) ................... P2003-146075
Oct. 10, 2003  (JP) ................... P2003-352448

(51) Int. Cl.
*G11B 7/00* (2006.01)

(52) U.S. Cl. ............... 369/112.05; 369/112.07; 369/112.23

(58) Field of Classification Search ............ None
See application file for complete search history.

(56) References Cited

U.S. PATENT DOCUMENTS

| | | | |
|---|---|---|---|
| 6,222,812 B1* | 4/2001 | Yoo et al. ........... | 369/112.16 |
| 6,449,095 B1* | 9/2002 | Ohtaki et al. ........ | 369/103 |
| 6,552,990 B1* | 4/2003 | Kajiyama et al. ..... | 369/112.06 |
| 6,856,587 B2* | 2/2005 | Kim et al. .......... | 369/53.3 |
| 6,952,390 B2* | 10/2005 | Mimori ............. | 369/112.07 |
| 6,982,838 B2* | 1/2006 | Maruyama et al. .... | 369/112.03 |
| 7,075,865 B2* | 7/2006 | Nishioka et al. ..... | 369/44.37 |
| 7,120,109 B1* | 10/2006 | Kim et al. .......... | 369/112.24 |
| 2002/0181366 A1* | 12/2002 | Katayama .......... | 369/53.2 |
| 2005/0047313 A1* | 3/2005 | Saitoh et al. ....... | 369/112.05 |

FOREIGN PATENT DOCUMENTS

JP    2000-105943    11/2000

* cited by examiner

*Primary Examiner*—Thang V. Tran
(74) *Attorney, Agent, or Firm*—The Nath Law Group; Jerald L. Meyer; Stanley N. Protigal

(57) ABSTRACT

There is disclosed an optical pickup device including: a blue semiconductor laser which emits a first laser light having a wavelength of 450 nm or less to record on or reproduce from an extra-high density optical disc; a red semiconductor laser which emits a second laser light having a wavelength longer than that of the first laser light to record on or reproduce from a DVD having a low recording density; an objective lens; and an aberration correction element. The objective lens is designed for the extra-high density optical disc, and has a numerical aperture (NA) of 0.75 or more. The aberration correction element passes the first laser light as such and thereafter allows the light to be incident upon the objective lens, whereas the element limits an aperture with respect to the second laser light and diffracts the second laser light so as to correct an aberration with respect to the DVD and thereafter allows the light to be incident upon the objective lens.

16 Claims, 26 Drawing Sheets

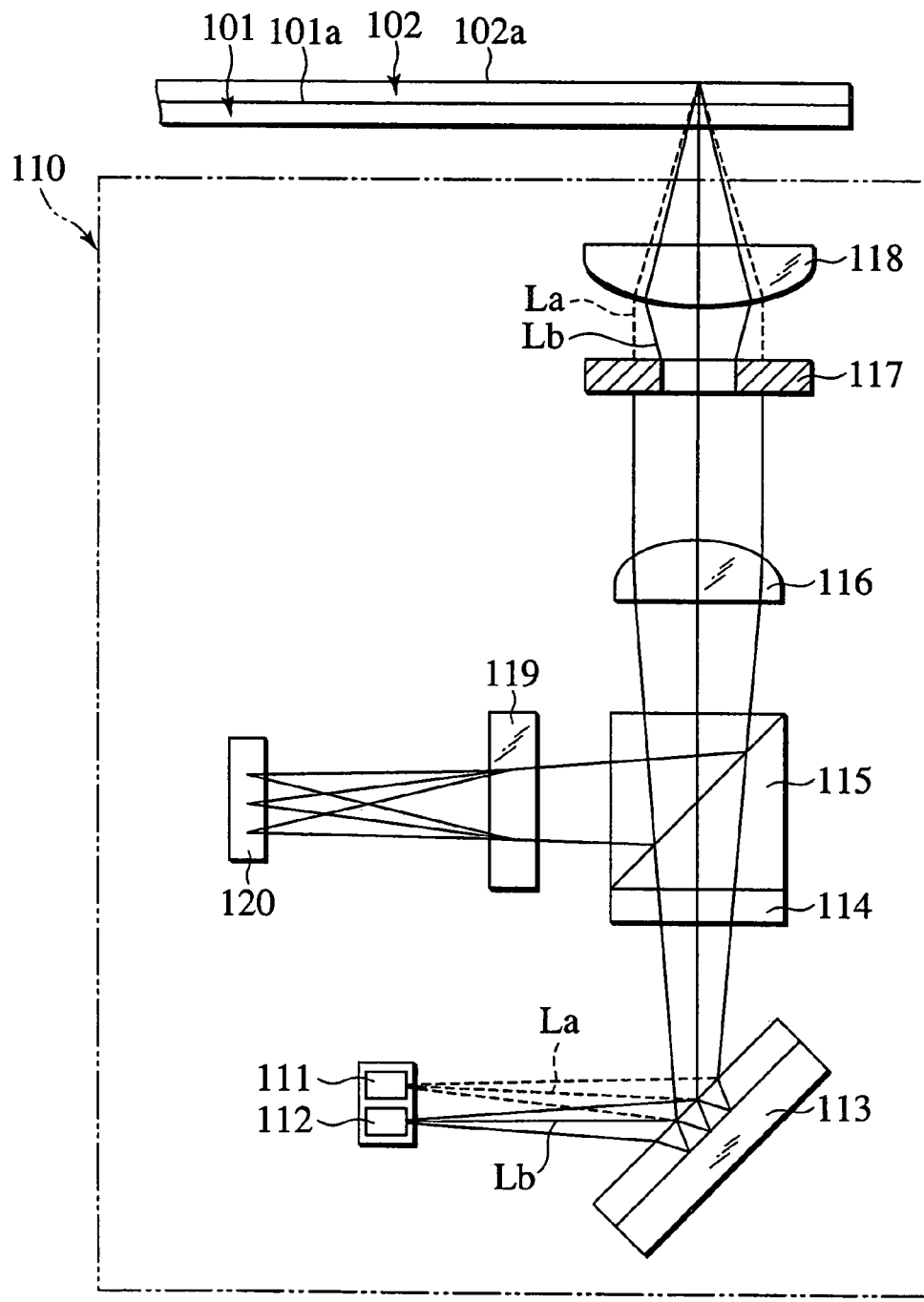

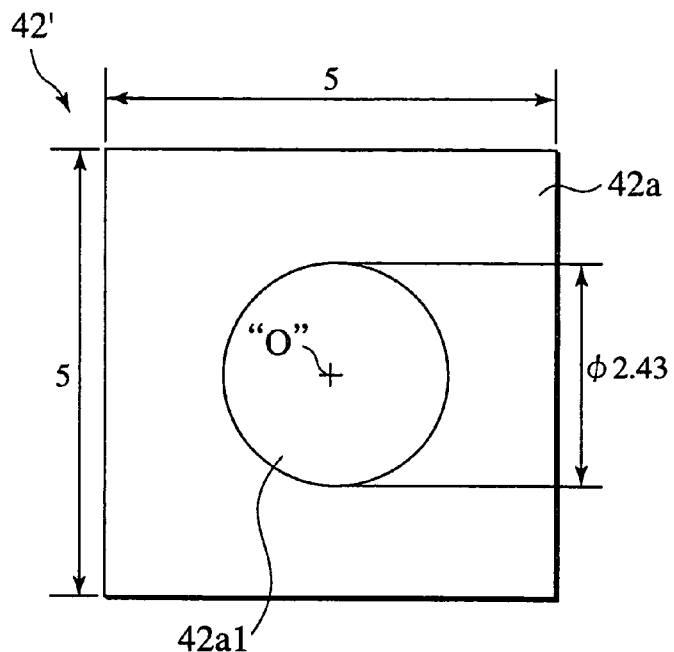
FIG.18A
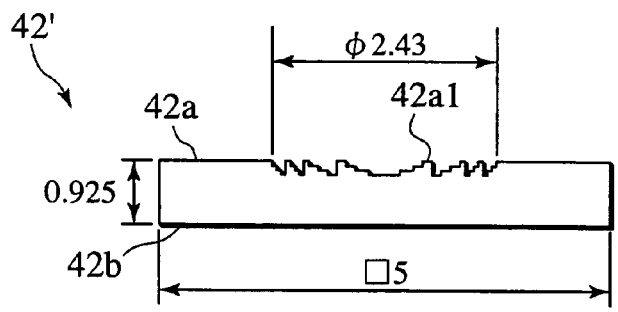
FIG.18B
FIG.18C
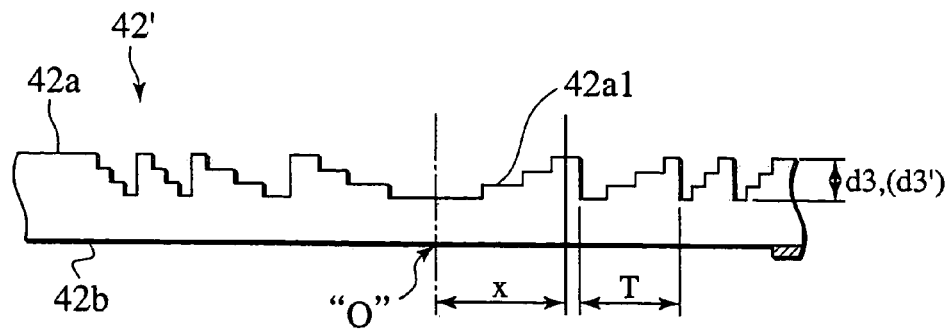

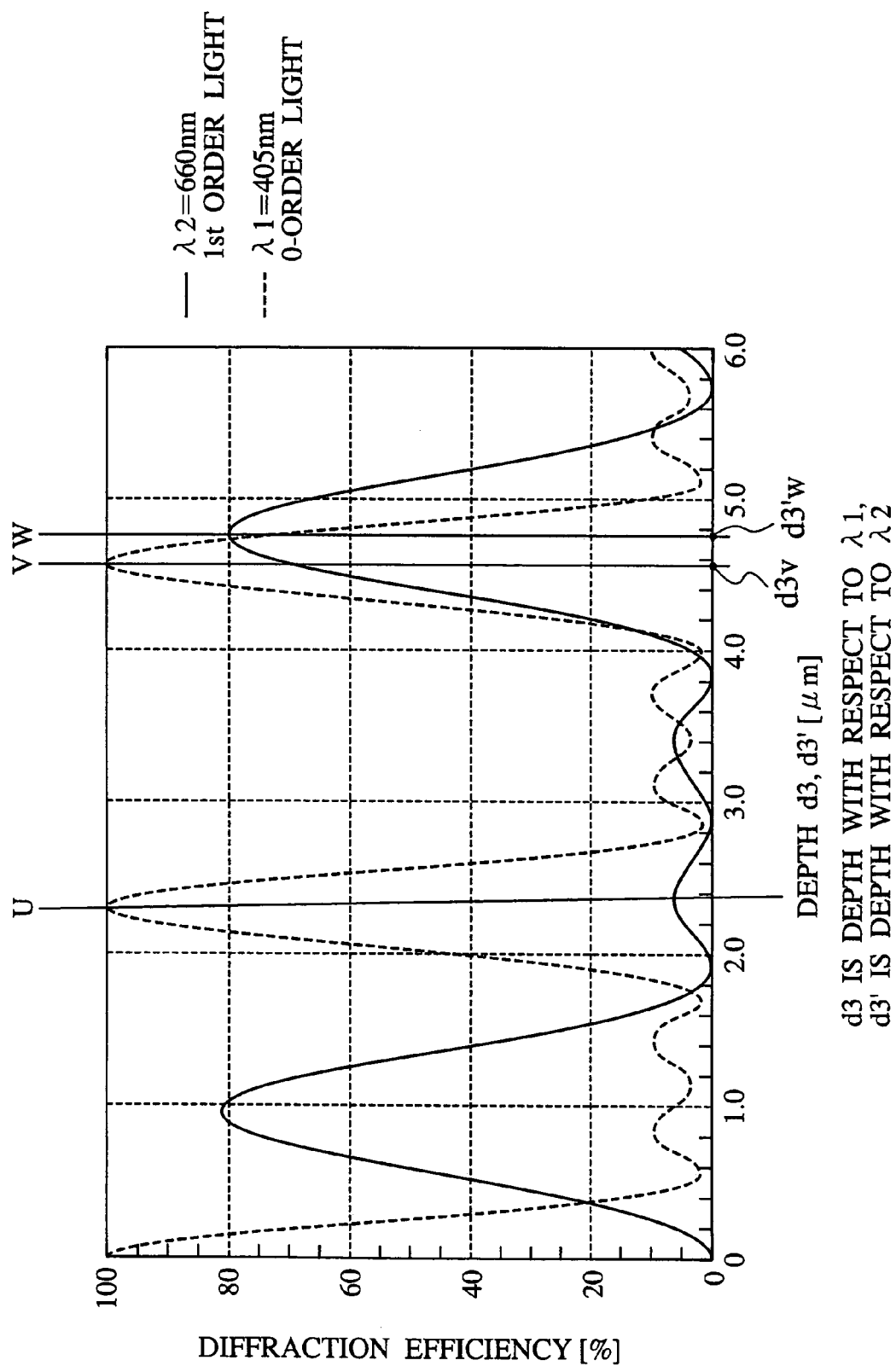

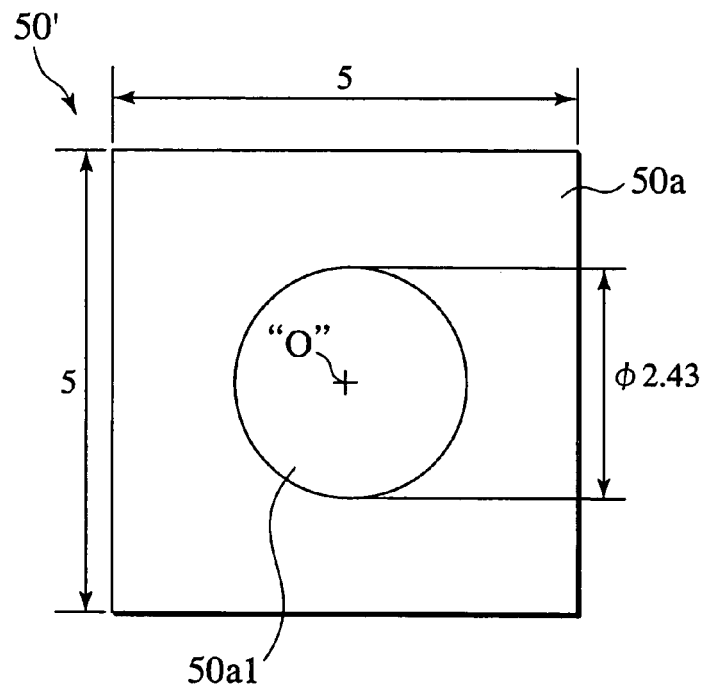
FIG.21A
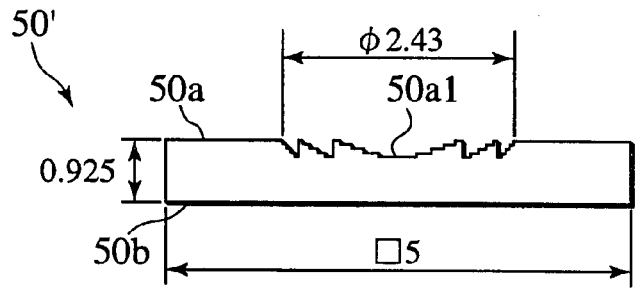
FIG.21B
FIG.21C
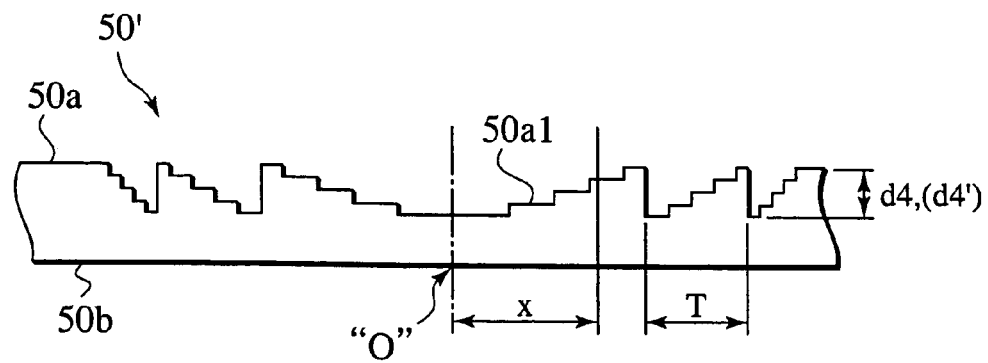

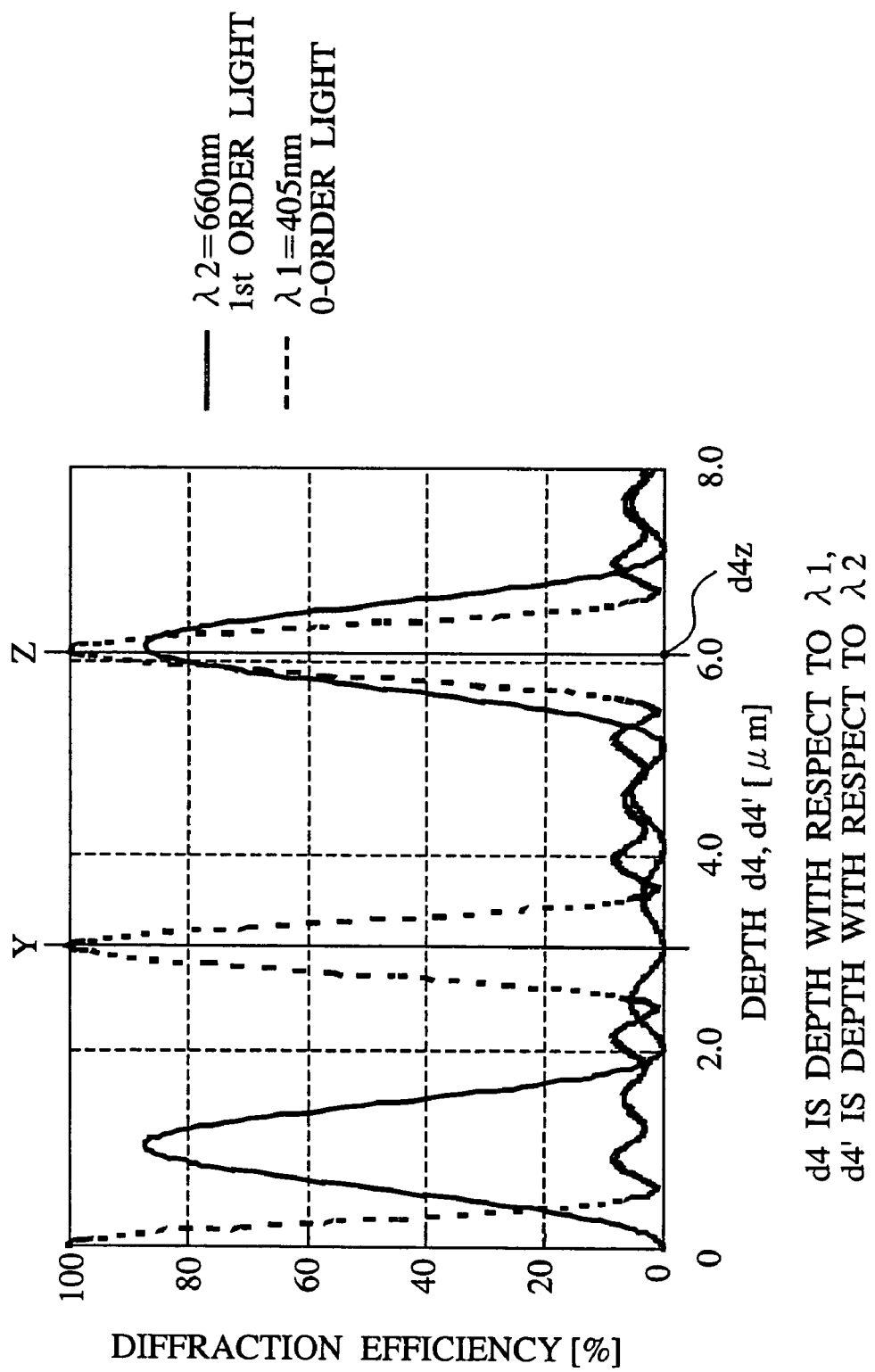

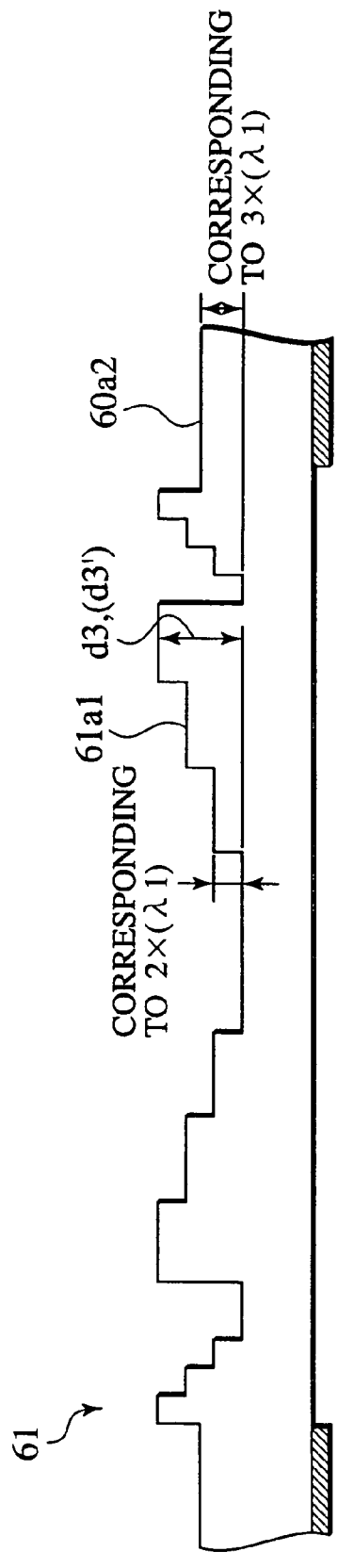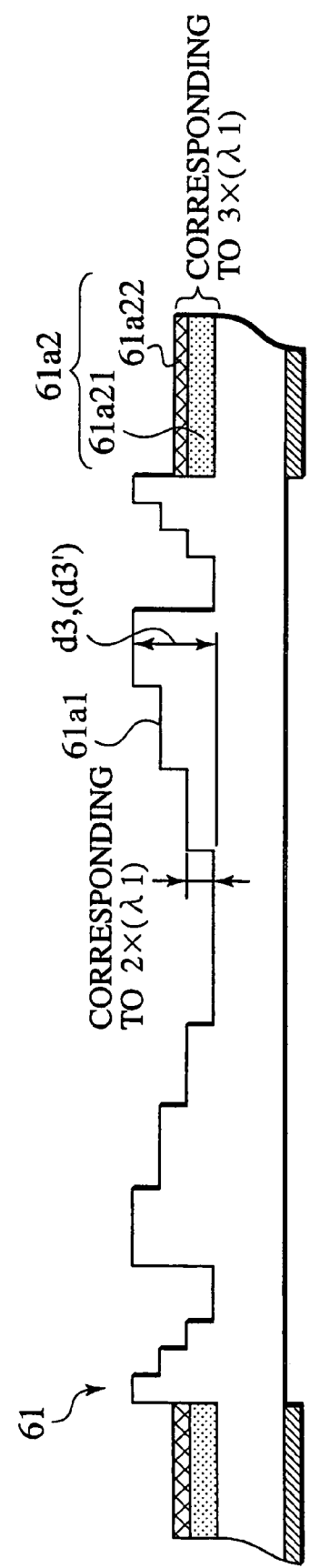

OPTICAL PICKUP DEVICE AND OPTICAL RECORDING MEDIUM DRIVING APPARATUS

BACKGROUND OF THE INVENTION

1. Field of the Invention

The present invention relates to an optical pickup device and an optical recording medium driving apparatus comprising at least an objective lens having a numerical aperture (NA) of 0.75 or more, and an aberration correction element for correcting a sphere aberration generated by a difference of a substrate thickness between first and second optical recording mediums at a time when the objective lens is used, to selectively record on or reproduce from the first and second optical recording mediums different in substrate thickness using first and second laser lights having different wavelengths.

2. Description of the Background Art

In general, optical recording mediums such as a disc-shaped optical disc and card-shaped optical card have been frequently used, because the mediums are capable of recording information signals such as video information, sound information, and computer data in tracks spirally or concentrically formed in a transparent substrate, and capable of accessing a desired track at a high rate during reproduction of recorded tracks.

As this type of optical recording medium, the optical discs such as a compact disc (CD) and a digital versatile disc (DVD) have already been on the market. In recent years, an extra-high density optical disc (Blu-ray Disc) has been actively developed which is capable of recording or reproducing information signals at a density higher than that of CD, DVD in order to increase the density of the optical disc.

First, for the above-described CD, a disc substrate has heretofore been irradiated with a laser beam obtained by focusing a laser beam having a wavelength of around 780 nm with an objective lens having a numerical aperture (NA) of about 0.45 to record or reproduce the information signal on or from a signal surface which is positioned distant from the laser incident incidence surface of the disc substrate by approximately 1.2 mm.

Moreover, for the above-described DVD, the disc substrate has heretofore been irradiated with the laser beam obtained by focusing a laser beam having a wavelength of around 650 nm with an objective lens having a numerical aperture (NA) of about 0.6 to record or reproduce the information signal on or from the signal surface which is positioned distant from the incidence surface by approximately 0.6 mm. In this case, a recording capacity of the DVD is increased six to eight times that of the CD, and the capacity of one surface is about 4.7 gigabyte (GB) with a diameter of a disc substrate of 12 cm.

Furthermore, the above-described extra-high density optical disc has been developed in which the disc substrate is irradiated with a laser beam having a wavelength of 450 nm or less, which has been focused with an objective lens having a numerical aperture (NA) of 0.75 or more, so as to be capable of recording or reproducing the information signal on or from a signal surface which is positioned distant from the incidence surface by approximately 0.1 mm. In this case, the recording capacity of the surface of the extra-high density optical disc is around 25 gigabytes (GB) with the diameter of the disc substrate of 12 cm.

Additionally, there has been an optical pickup device comprising an objective lens shared with respect to two types of optical discs already on the market such as the CD and DVD and an optical element which transmits all the laser beams having a wavelength of around 650 nm to record on or reproduce from the DVD while interrupts the laser beam having a wavelength of around 780 nm by an outer circular portion thereof and diffracts it by an inner circular portion thereof to record on or reproduce from the CD (see, for example, Japanese Patent Application Laid-Open No. 2000-105943 (pages 4 to 6, FIGS. 1, 10, 11)).

FIG. 1 is a constitution diagram showing one example of a conventional optical pickup device. FIGS. 2A and 2B are explanatory views of a second optical element shown in FIG. 1, where FIG. 2A is a diagram showing the recording or reproducing of the DVD, and FIG. 2B is a diagram showing the recording or reproducing of the CD.

A conventional optical pickup device 110 shown in FIGS. 1, 2A, and 2B is described in the Japanese Patent Application Laid-Open No. 2000-105943. The device will be briefly described with reference to the document.

As shown in FIG. 1, the conventional optical pickup device 110 comprises: a first semiconductor laser 111 which emits a laser light La having a wavelength of 650 nm for a DVD 101; a second semiconductor laser 112 which emits a laser light Lb having a wavelength of 780 nm for a CD 102; a first optical element 113 which corrects an optical axis deviation between the laser light La having a wavelength of 650 nm and the laser light Lb having a wavelength of 780 nm; a correction plate 114 which corrects a phase difference caused by the first optical element 113; a half mirror 115 which transmits the respective laser lights La, Lb emitted from the first and second semiconductor lasers 111, 112 and which reflects each light reflected by a signal surface 101a of the DVD 101 or a signal surface 102a of the CD 102 so as to change a direction of the light by approximately 90°; a collimator lens 116 which forms the laser light La having a wavelength of 650 nm and the laser light Lb having a wavelength of 780 nm into parallel lights; a second optical element 117 which allows the laser light La having a wavelength of 650 nm, transmitted through the collimator lens 116, to be incident upon an objective lens 118 and which interrupts the laser light Lb having a wavelength of 780 nm, transmitted through the collimator lens 116, by the outer circular portion thereof and diffracts the light by the inner circular portion thereof and allows the light to be incident upon the objective lens 118; the objective lens 118 which focuses the laser light La having a wavelength of 650 nm and the laser light Lb having a wavelength of 780 nm to converge the light on the signal surface 101a of the DVD 101 or the signal surface 102a of the CD 102; a Wollaston prism 119 which separates each reflected light from the DVD 101 or the CD 102 into a laser light containing only an s-polarized component, a laser light containing only a p-polarized component, and a laser light containing the s-polarized component mixed with the p-polarized component; and a photodetector 120 which detects the laser light of only the s-polarized component, the laser light of only the p-polarized component, and the laser light of the s-polarized component mixed with the p-polarized component from the Wollaston prism 119.

Here, in the above-described constituting members, as enlarged and shown in FIGS. 2A and 2B, especially the second optical element 117 comprises an outer circular portion 117a and an inner circular portion 117b. Moreover, the outer circular portion 117a of the second optical element 117 has a function of transmitting the laser light La having a wavelength of 650 nm wholly as it is, and diffracting only the laser light Lb having a wavelength of 780 nm outside an optical axis to prevent the light from being incident upon the objective lens 118. On the other hand, the inner circular portion 117b of the second optical element 117 has a function of transmitting the laser light La having a wavelength of 650 nm wholly as it is, and diffracting only the laser light Lb having a wavelength of 780 nm to allow the light to be incident upon the objective lens 118.

In this case, for a sectional structure of the second optical element 117, the outer circular portion 117a includes a concave/convex pattern structure, the inner circular portion 117b roughly has triangular shapes, and a portion corresponding to a slope of each triangular shape has a stair-like pattern structure.

Moreover, as shown in FIG. 2A, in the recording or playback of the DVD 101 by the objective lens 118, the laser light La having a wavelength of 650 nm passes as such without being influenced by the second optical element 117 and is incident upon the objective lens 118. The light is focused onto the signal surface 101a of the DVD 101 having a disc substrate thickness of 0.6 mm by the objective lens 118.

On the other hand, as shown in FIG. 2B, in the recording or playback of the CD 102 by the objective lens 118, for the laser light Lb having a wavelength of 780 nm, a portion incident upon the outer circular portion 117a of the second optical element 117 is largely diffracted outside the optical axis by a concave/convex diffraction pattern, and is not incident upon the objective lens 118. The laser light Lb incident upon the inner circular portion 117b of the second optical element 117 is diffracted to the outside by the triangular stair-like pattern structure, but is incident upon the objective lens 118 without being largely diffracted as in the outer circular portion 117a. Therefore, only the laser light Lb incident upon only the inner circular portion 117b of the second optical element 117 reaches the objective lens 118, and is focused onto the signal surface 102a of the CD 102 having a disc substrate thickness of 1.2 mm by the objective lens 118.

That is, the laser light Lb having a wavelength of 780 nm is substantially interrupted by the outer circular portion 117a of the second optical element 117, diffracted by the inner circular portion 117b, and is incident upon the objective lens 118. In this case, the objective lens 118 is designed for the DVD having a disc substrate thickness of 0.6 nm. Therefore, when the laser light Lb having a wavelength of 780 nm is only interrupted by the outer circular portion and is incident upon the disc substrate having a thickness of 1.2 mm, aberration is generated, and the lens is designed so as to reduce this aberration. Therefore, a diameter of the inner circular portion 117b of the second optical element 117, and a size of the triangular shape which causes diffraction are determined in such a manner that an effective numerical aperture of the objective lens 118 is 0.45 with respect to the laser light Lb having a wavelength of 780 nm. It has also been described that when the signal recording into a recordable/reproducible CD-recordable (CD-R) is considered, an effective numerical aperture of the objective lens 118 is suitable, and therefore the diameter of the inner circular portion 117b of the second optical element 117 is determined so as to set the effective numerical aperture of the objective lens 118 to 0.45 to 0.50.

Additionally, according to the conventional optical pickup device 110, the DVD 101 and the CD 102 can be selectively recorded or reproduced using the objective lens 118 designed for the DVD and the first and second optical elements 113, 117. However, it is clear that anything is not considered with respect to the extra-high density optical disc being developed in the conventional optical pickup device 110.

On the other hand, when proceeding with the development of the extra-high density optical disc, needless to say, there has also been a demand for a recordable or reproducible optical pickup device and optical disc driving apparatus in which an extra-high density optical disc and DVD are used in common. Furthermore, there is also a possibility of a recordable or reproducible optical pickup device and optical disc driving apparatus in which an extra-high density optical disc and CD are used in common.

SUMMARY OF THE INVENTION

To solve the problem, an objective lens having a numerical aperture (NA) of 0.75 or more is required for a first optical recording medium (extra-high density optical disc), and the same objective lens is also used for a second optical recording medium (optical discs such as DVD and CD) having a recording density lower than that of the first optical recording medium. Furthermore, it is necessary to design a new aberration correction element in which a first laser light for the first optical recording medium is transmitted as it is and is thereafter incident upon the objective lens, whereas a second laser light for the second optical recording medium is diffracted to correct an aberration and is thereafter incident upon the objective lens. There has been a demand for an optical pickup device and an optical recording medium driving apparatus (optical disc driving apparatus) which satisfy these requirements.

To achieve the above-described object, according to an aspect of the present invention, there is provided an optical pickup device which selectively records or reproduces data on or from a first optical recording medium, a second optical recording medium having a recording density lower than that of the first optical recording medium and having a substrate thickness larger than that of the first optical recording medium, and a combined optical recording medium including combined and integrally stacked signal surfaces of the first and second optical recording mediums, the device comprising: a first laser light source which emits a first laser light having a wavelength of 450 nm or less for the first optical recording medium; a second laser light source which emits a second laser light having a wavelength longer than that of the first laser light for the second optical recording medium; an objective lens whose numerical aperture (NA) is set to 0.75 or more for the first optical recording medium and in which at least one of first and second surfaces turning to a reverse direction each other is formed in a non-spherical surface and which converges the first and second laser lights on the respective signal surfaces of the first and second optical recording mediums; and an aberration correction element in which a circular light-transparent flat portion and an annular aperture limiting portion for the second laser light are formed toward an outer circular portion from a central portion on the side of the first and second laser light sources and in which a diffraction pattern portion is formed in an inner circular region on the side of the objective lens and in which an outer side of the diffraction pattern portion is flatted, wherein the aberration correction element transmits the first laser light, which is incident thereon in a parallel light state, as such through the light-transparent flat portion and the aperture limiting portion for the second laser light, transmits the first laser light without diffracting the first laser light through the diffraction pattern portion, and allows a 0-order light thereof to be incident upon the objective lens, and the aberration correction element interrupts the second laser light, which is incident thereon in the parallel light state, by the aperture limiting portion for the second laser light to limit the numerical aperture into the objective lens to a predetermined numerical aperture, transmits the second laser light through the light-transparent flat portion, and thereafter diffracts the second laser light by the diffraction pattern portion so that a 1st order light of the second laser light capable of correcting a spherical aberration that will occur on the objective lens is incident upon the objective lens.

According to the present invention described above in detail, the optical pickup device comprises: the first laser light source which emits the first laser light having a wavelength of 450 nm or less for recording or reproducing data on or from the first optical recording medium; the second laser light source which emits the second laser light having a wavelength longer than that of the first laser light for recording or reproducing data on or from the second optical recording medium having a recording density lower than that of the first optical recording medium; the objective lens whose numerical aperture (NA) is set to 0.75 or more for the first optical recording medium; and the aberration correction element in which the first laser light is transmitted as such and thereafter allowed to be incident upon the objective lens and which limits an opening into the objective lens with respect to the second laser light and diffracts the second laser light with respect to the second optical recording medium so as to correct the aberration and thereafter allows the second laser light to be incident upon the objective lens. Therefore, the aberration correction element having a good balance performance with respect to the first and second optical recording mediums can be obtained, and the first and second optical recording mediums can be satisfactorily recorded or reproduced. Moreover, the first and second laser lights are incident upon the aberration correction element in the form of the parallel lights. Therefore, even when the optical axes of the first and second laser lights slightly deviate from the optical axis of the objective lens, deterioration of the spherical aberration is reduced, and it is easy to adjust the optical axis at the time of assembling of the optical pickup device.

Moreover, to achieve the above-described object, according to another aspect of the present invention, there is provided an optical pickup device which selectively records or reproduces data on or from a first optical recording medium, a second optical recording medium having a recording density lower than that of the first optical recording medium and having a substrate thickness larger than that of the first optical recording medium, and a combined optical recording medium including combined and integrally stacked signal surfaces of the first and second optical recording mediums, the device comprising: a first laser light source which emits a first laser light having a wavelength of 450 nm or less for the first optical recording medium; a second laser light source which emits a second laser light having a wavelength longer than that of the first laser light for the second optical recording medium; an objective lens whose numerical aperture (NA) is set to 0.75 or more for the first optical recording medium and in which at least one of first and second surfaces turning to reverse direction each other is formed in a non-spherical surface and which converges the first and second laser lights on the respective signal surfaces of the first and second optical recording mediums; and an aberration correction element which is formed to be flat on the side of the first and second laser light sources and in which a diffraction pattern portion is formed in an inner circular region on the side of the objective lens and in which an outer side of the diffraction pattern portion is formed to be flat, wherein the aberration correction element transmits the first laser light, which is incident thereon in a parallel light state, without diffracting the first laser light through the diffraction pattern portion, and allows a 0-order light thereof to be incident upon the objective lens, and the aberration correction element diffracts only light through the diffraction pattern portion of the second laser light, which is incident thereon in the parallel light state, so that a 1st order light of the second laser light capable of correcting a spherical aberration that will occur on the objective lens is incident upon the objective lens.

According to the optical pickup device of the present invention, an effect similar to that of the first aspect of the invention is obtained. Additionally, especially the aberration correction element is formed to be flat on the first and second laser light source sides, and the diffraction pattern portion is formed in the inner circular region on the objective lens side. Therefore, the aberration correction element can be partially simplified, and accordingly the aberration correction element can be prepared inexpensively.

In a preferable embodiment of the present invention, in the diffraction pattern portion, a plurality of concave/convex diffraction pattern portions formed in a concave/convex state are arranged in an annular form in such a manner that a concave/convex repeating period is gradually shortened or lengthened toward an outer circular portion from an inner circular portion, and a depth of the concave portion in the diffraction pattern portion is set to be between a depth capable of obtaining an approximately maximum diffraction efficiency with respect to the first laser light and a depth capable of obtaining an approximately maximum diffraction efficiency with respect to the second laser light.

According to this embodiment, in the diffraction pattern portion, a plurality of concave/convex diffraction pattern portions formed in the concave/convex state are arranged in the annular form so as to gradually shorten or lengthen the concave/convex repeating period toward the outer circular portion from the inner circular portion. Moreover, the depth of the concave portion in the diffraction pattern portion is set to be between the depth capable of obtaining the approximately maximum diffraction efficiency with respect to the first laser light and the depth capable of obtaining the approximately maximum diffraction efficiency with respect to the second laser light. Therefore, a high and good-balance diffraction efficiency can be obtained with respect to both the first and second laser lights.

In a preferable embodiment of the present invention, in the diffraction pattern portion, a plurality of concave/convex diffraction pattern portions formed in a concave/convex state are arranged in an annular form in such a manner that a concave/convex repeating period is gradually shortened or lengthened toward an outer circular portion from an inner circular portion, and a depth of the concave portion in the diffraction pattern portion is set to be equal to an optical path difference corresponding to the wavelength of the first laser light.

According to the embodiment, in the diffraction pattern portion, a plurality of concave/convex diffraction pattern portions formed in the concave/convex state are arranged in the annular form so as to gradually shorten or lengthen the concave/convex repeating period toward the outer circular portion from the inner circular portion, and the depth of the concave portion in the diffraction pattern portion is set to be equal to the optical path difference corresponding to the wavelength of the first laser light. Therefore, the maximum diffraction efficiency is obtained with respect to the first laser light, and a satisfactory diffraction efficiency is also obtained with respect to the second laser light.

In a preferable embodiment of the present invention, in the diffraction pattern portion, a plurality of stair-like diffraction pattern portions formed in a stair concave state including n (n is a natural number of 3 or more) or more stairs are formed in an annular form in such a manner that a period of a stair-like concave portion is gradually shortened or lengthened toward an outer circular portion from an inner circular portion, and a depth of the whole stair-like concave portion in the diffraction pattern portion is set to be between a depth capable of obtaining an approximately maximum diffraction efficiency with respect to the first laser light and a depth capable of obtaining an approximately maximum diffraction efficiency with respect to the second laser light.

According to the embodiment, in the diffraction pattern portion, a plurality of stair-like diffraction pattern portions formed in the stair concave state including n (n is a natural number of 3 or more) or more stairs are arranged in the annular form so as to gradually shorten or lengthen the period of the stair-like concave portion toward the outer circular portion from the inner circular portion. Moreover, the depth of the whole stair-like concave portion in the diffraction pattern portion is set to be between the depth capable of obtaining the approximately maximum diffraction efficiency with respect to the first laser light and the depth capable of obtaining the approximately maximum diffraction efficiency with respect to the second laser light. Therefore, the high and good-balance diffraction efficiency can be obtained with respect to the first and second laser lights.

In a preferable embodiment of the present invention, in the diffraction pattern portion, a plurality of stair-like diffraction pattern portions formed in a stair concave state including n (n is a natural number of 3 or more) or more stairs are arranged in an annular form in such a manner that a period of a stair-like concave portion is gradually shortened or lengthened toward an outer circular portion from an inner circular portion, and a depth of the whole stair-like concave portion per stair is set to be an optical path difference corresponding to twice the wavelength of the first laser light.

According to the preferable embodiment, in the diffraction pattern portion, the plurality of stair-like diffraction pattern portions formed in the stair concave state including n (n is a natural number of 3 or more) or more stairs are arranged in the annular form so as to gradually shorten or lengthen the period of the stair-like concave portion toward the outer circular portion from the inner circular portion. Moreover, the depth of the stair-like concave portion per stair is set to be the optical path difference corresponding to twice the wavelength of the first laser light. Therefore, the maximum diffraction efficiency is obtained with respect to the first laser light, and the satisfactory diffraction efficiency is also obtained with respect to the second laser light.

In a preferable embodiment of the present invention, an outer circular flat portion is formed outside the stair-like diffraction pattern portion, and a height to the surface of the outer circular flat portion from a position of a stair-like concave portion lowermost stair in the diffraction pattern portion is set to be an optical path difference corresponding to (n−1) times the wavelength of the first laser light.

According to the embodiment, the outer circular flat portion is formed outside the stair-like diffraction pattern portion, and the height to the surface of the outer circular flat portion from the position of the stair-like concave portion lowermost stair in the diffraction pattern portion is set to be the optical path difference corresponding to (n−1) times the wavelength of the first laser light. Therefore, a chromatic aberration can be reduced with respect to the first laser light.

Moreover, to achieve the above-described object, according to still another aspect of the present invention, there is provided an optical recording medium driving apparatus in which a first optical recording medium, a second optical recording medium having a recording density lower than that of the first optical recording medium and having a substrate thickness larger than that of the first optical recording medium, and a combined optical recording medium including combined and integrally stacked signal surfaces of the first and second optical recording mediums are selectively attached onto a rotatable turntable, and an information signal is recorded on or reproduced from the signal surface of the first or second optical recording medium by an optical pickup device, wherein the above-described optical pickup device is applied, the aberration correction element and the objective lens having optical axes aligned with each other are stored in a lens holder, and the lens holder is supported rockably in a focus direction and a tracking direction of the first and second optical recording mediums.

According to the present invention, when the first optical recording medium, the second optical recording medium having the recording density lower than that of the first optical recording medium, and the combined optical recording medium including the combined and integrally stacked signal surfaces of the first and second optical recording mediums are selectively recorded or reproduced by the optical pickup device, the above-described optical pickup device is applied. Moreover, the aberration correction element and the objective lens having the optical axes aligned with each other are stored in the lens holder, and the lens holder is supported rockably in the focus direction and the tracking direction of the first and second optical recording mediums. Therefore, the aberration correction element having good balance performance with respect to the first and second optical recording mediums can be obtained, and the first and second optical recording mediums can be satisfactorily recorded or reproduced while generation of a comatic aberration is controlled.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a constitution diagram showing one example of a conventional optical pickup device;

FIG. 2A shows that a DVD is recorded or reproduced, and FIG. 2B shows that a CD is recorded or reproduced;

FIG. 7A is a top plan view, FIG. 7B is a front view, and FIG. 7C is an enlarged view of a concave/convex diffraction pattern portion;

FIG. 12A is a top plan view, FIG. 12B is a front view, and FIG. 12C is an enlarged view of the concave/convex diffraction pattern portion;

FIG. 17A is a top plan view, FIG. 17B is a front view, and FIG. 17C is an enlarged view of a stair-like diffraction pattern portion having a 4-stair structure;

FIGS. 18A to 18C are explanatory views of the aberration correction element as a modification in which the aberration correction element in Embodiment 2 is partially simplified, where FIG. 18A is a top plan view, FIG. 18B is a front view, and FIG. 18C is an enlarged view of the stair-like diffraction pattern portion having the 4-stair structure;

FIG. 19 is a diagram showing a relation between each diffraction efficiency at a time at which the first and second laser lights having the wavelengths $\lambda 1$, $\lambda 2$ are incident upon the stair-like diffraction pattern portion having the 4-stair structure and a depth of a stair-like concave portion in the stair-like diffraction pattern portion;

FIG. 20A is a top plan view, FIG. 20B is a front view, and FIG. 20C is an enlarged view of the stair-like diffraction pattern portion including a 5-stair structure;

FIGS. 21A to 21C are explanatory views of the aberration correction element of a modification in which the aberration correction element in Embodiment 3 is partially simplified, where FIG. 21A is a top plan view, FIG. 21B is a front view, and FIG. 21C is an enlarged view of the stair-like diffraction pattern portion including the 5-stair structure;

FIG. 22 is a diagram showing a relation between each diffraction efficiency at a time at which the first and second laser lights having the wavelengths $\lambda 1$, $\lambda 2$ are incident upon the stair-like diffraction pattern portion having the 5-stair structure and the depth of the whole stair-like concave portion in the stair-like diffraction pattern portion;

FIG. 23A is a top plan view, FIG. 23B is a front view, and FIG. 23C is an enlarged view of the stair-like diffraction pattern portion including the 5-stair structure;

FIGS. 25A and 25B are enlarged views of the stair-like diffraction pattern portion including the 4-stair structure in Embodiment 4;

FIG. 26A is a top plan view, FIG. 26B is a front view, and FIG. 26C is an enlarged view of the stair-like diffraction pattern portion including the 5-stair structure;

DESCRIPTION OF THE PREFERRED EMBODIMENTS

Embodiments of an optical pickup device and an optical recording medium driving apparatus according to the present invention will be described hereinafter in detail with reference to FIGS. 3 to 28.

The optical pickup device and optical recording medium driving apparatus according to the present invention are characterized in that there are disposed at least: an objective lens designed for a first optical recording medium (extra-high density optical disc: Blu-ray Disc) having next-generation optical disc standards; and an aberration correction element for correcting a spherical aberration caused by a difference of a substrate thickness between the first and second optical recording mediums at the time of using the objective lens for a case where the first and second optical recording mediums having different substrate thicknesses are selectively recorded or reproduced using first and second laser lights having different wavelengths.

Embodiment 1

Figure 2A:
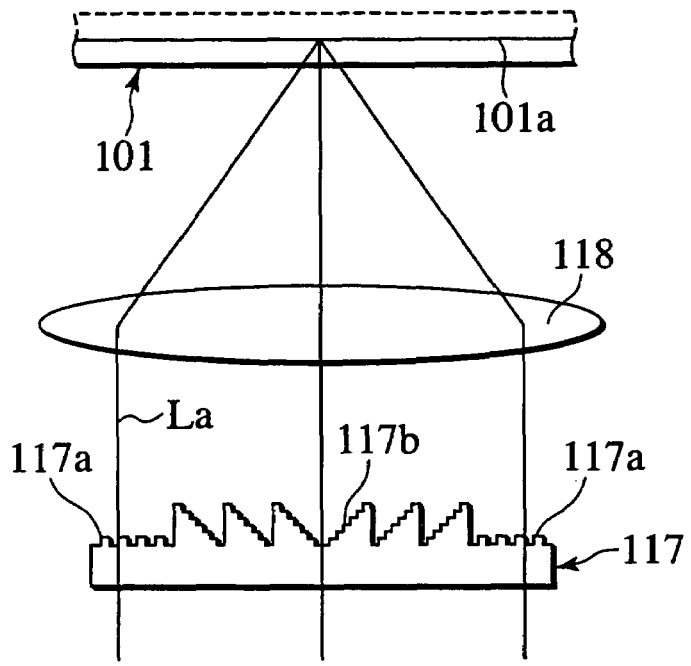
FIGS. 2A and 2B are explanatory views of a second optical element shown in FIG. 1.
Figure 2B:
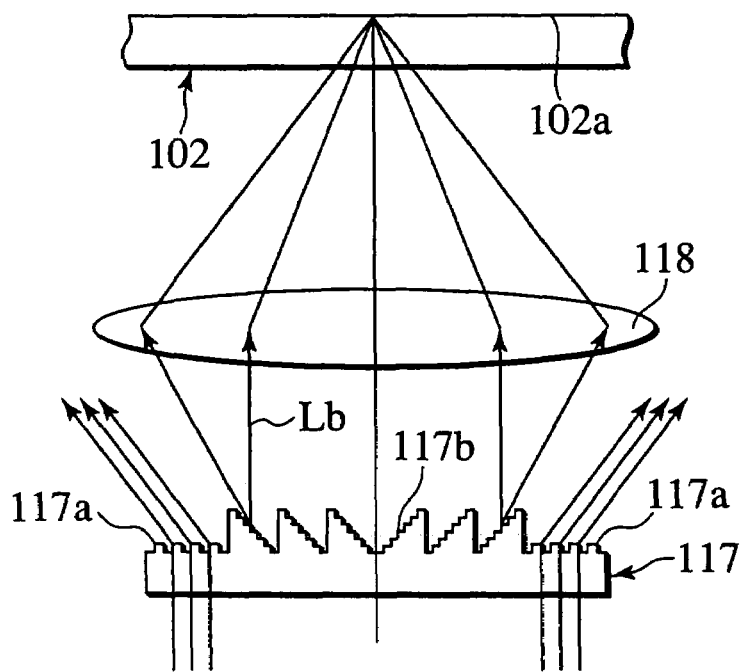
Figure 3:
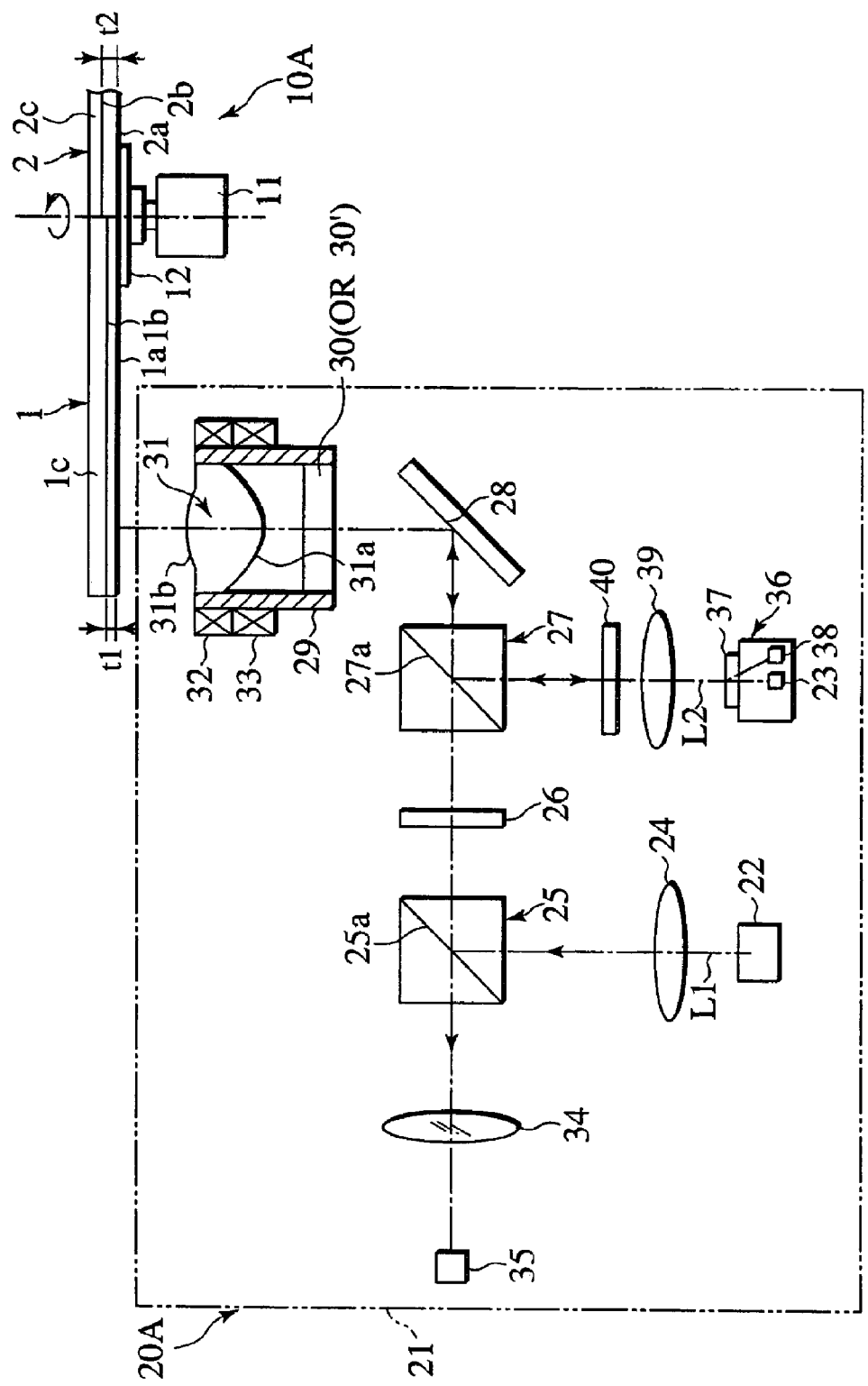
FIG. 3 is a diagram showing the whole constitution of an optical pickup device and an optical recording medium driving apparatus of Embodiment 1 according to the present invention.

FIG. 3 is a diagram showing the whole constitution of an optical pickup device and an optical recording medium driving apparatus of Embodiment 1 according to the present invention.

FIG. 3 shows an optical pickup device 20A and an optical recording medium driving apparatus (hereinafter referred to as the optical disc driving apparatus) 10A to which the optical pickup device 20A is applied. They have been developed so as to be capable of selectively applying: a first optical recording medium (extra-high density optical disc: Blu-ray Disc) 1 for recording or reproducing an information signal on or from a signal surface 1b having a small substrate thickness at an extra-high density by a first laser light L1 having a wavelength λ1 of 450 nm or less; a second optical recording medium (DVD) 2 for recording or reproducing the information signal on or from a signal surface 2b having a substrate thickness larger than that of the signal surface 1b at a high density by a second laser light L2 having a wavelength λ2 of around 650 nm, which is longer than the wavelength λ1 of the first laser light L1; and a combined optical recording medium in which any of the first and second laser lights L1, L2 is incident upon a common laser beam incidence surface and signal surfaces 1b, 2b of the first and second optical recording mediums 1, 2 are appropriately combined and integrally stacked.

It is to be noted that although not shown herein, a total disc substrate thickness of the combined optical recording medium in which the respective signal surfaces 1b, 2b of the first and second optical recording mediums 1, 2 are combined is set to approximately 1.2 mm. The extra-high density optical disc 1 and the DVD 2 will be individually described hereinafter in detail. Since the combined optical recording medium is an application, the description is omitted.

Moreover, in the following description, an application to a disc-shaped optical disc as the first and second optical recording mediums 1, 2 will be described, but the present invention is not limited to this, and may also be applied to a card-shaped optical recording medium.

Furthermore, the first and second optical recording mediums 1, 2 are selectively attached onto a turntable 12 fixed to a shaft of a spindle motor 11 rotatably disposed in the optical disc driving apparatus 10A.

Here, in the extra-high density optical disc (Blu-ray Disc) 1 which is the first optical recording medium, a disc substrate thickness t1 between a laser beam incidence surface 1a and the signal surface 1b is set to be thin in a range of approximately 0.05 mm to 0.15 mm based on next-generation optical disc standards. A reinforcing plate 1c is bonded onto the surface so that a total thickness is set to be large, and the total thickness is, for example, approximately 1.2 mm. It is to be noted that in the following description, the first optical recording medium is represented by the extra-high density optical disc 1.

Moreover, in the digital versatile disc (DVD) 2 which is the second optical recording medium, a disc substrate thickness t2 between a laser beam incidence surface 2a and the signal surface 2b is set to approximately 0.6 mm, which is larger than the thickness of the extra-high density optical disc 1, based on DVD standards. An approximately 0.6 mm thick reinforcing plate 2c is bonded onto the surface so that the total thickness is, for example, approximately 1.2 mm. It is to be noted that in the following description, the second optical recording medium is represented by the DVD 2.

It is to be noted that in Embodiment 1, the respective disc substrate thicknesses t1, t2 of the extra-high density optical disc 1 and the DVD 2 are set, for example, to 0.1 mm and 0.6 mm, respectively.

Moreover, the optical pickup device 20A of Embodiment 1 according to the present invention is disposed movably in a diametric direction of the extra-high density optical disc 1 or the DVD 2 below the laser beam incidence surface 1a of the extra-high density optical disc 1 or the laser beam incidence surface 2a of the DVD 2.

In the optical pickup device 20A, a first laser light source (hereinafter referred to as the blue semiconductor laser) which emits a first laser light L1 having a wavelength of 450 nm or less for the extra-high density optical disc 1, and a second laser light source (hereinafter referred to as the red semiconductor laser) 23 which emits a second laser light L2 having a wavelength of around 650 nm for the DVD 2 are disposed in a pickup housing 21.

It is to be noted that the wavelength λ1 of the first laser light emitted from the blue semiconductor laser 22 is set, for example, to 405 nm. On the other hand, it is assumed that the wavelength λ2 of the second laser light emitted from the red semiconductor laser 23 is set, for example, to 660 nm.

First, a blue semiconductor laser 22 side will be described in accordance with the extra-high density optical disc 1. The first laser light L1 having the wavelength λ1=405 nm emitted from the blue semiconductor laser 22 is a divergent light of linear polarization (p-polarized light), this divergent light is formed into a parallel light in a collimator lens 24, and the parallel light of the first laser light L1 is reflected by a polarization selective dielectric multilayered film 25a (p-polarization: reflection, s-polarization: transmission) of a polarized beam splitter 25 to change a direction by 90°. Thereafter, the first laser light L1 is transmitted through a phase plate 26 to form a circularly polarized light. In this case, the phase plate 26 for the first laser light applies a phase difference of (λ1)/4 at a time of transmission of the first laser light L1 having a wavelength λ1=405 nm.

Moreover, the first laser light L1 transmitted through the phase plate 26 passes through a dichroic film 27a of a dichroic prism 27. In this case, the dichroic film 27a of the dichroic prism 27 is attached so as to pass the first laser light L1 having the wavelength λ1=405 nm emitted from the blue semiconductor laser 22 and to reflect the second laser light L2 having a wavelength λ2=660 nm emitted from the red semiconductor laser 23.

Moreover, the first laser light L1 transmitted through the dichroic prism 27 changes a ray direction by 90° in a plane mirror 28 for rising. Thereafter, the parallel light of the first laser light L1 is incident upon an aberration correction element 30 stored in a lower part of a lens holder 29, and a 0-order light is transmitted without being diffracted in the aberration correction element 30, and is further incident upon an objective lens 31 stored in an upper part of the lens holder 29. A first laser beam obtained by focusing the first laser light L1 by the objective lens 31 is incident via the laser beam incidence surface 1a of the extra-high density optical disc 1 and converged on the signal surface 1b.

It is to be noted that a function of the aberration correction element 30 with respect to the first laser light L1 will be described later in detail.

In this case, a numerical aperture of the objective lens 31 is set to 0.75 or more for the extra-high density optical disc, and at least one of first and second surfaces 31a, 31b turning to a reverse direction each other is formed in a non-spherical surface. In Embodiment 1, a single lens having a numerical aperture (NA) of 0.85 is used, and the first surface 31a facing the aberration correction element 30 side and the second surface 31b facing each optical disc 1, 2 side are both formed in the non-spherical surface as described later, and are optimized in an infinitely conjugated state with respect to the first laser light L1 having the wavelength $\lambda 1=405$ nm. Moreover, a distance between the objective lens 31 whose spherical aberration is minimum with respect to the first laser light L1 and the laser beam incidence surface 1a of the extra-high density optical disc 1, that is, a working distance is about 0.5 mm.

Further the aberration correction element 30 stored in the lower part of the lens holder 29 and the objective lens 31 stored in the upper part of the lens holder 29 are integrated in the lens holder 29 while optical axes are aligned with each other, so that the comatic aberration is inhibited from being generated. The aberration correction element 30 and objective lens 31 constituting a main part of Embodiment 1 will be described later in detail.

Additionally, a focus coil 32 and a tracking coil 33 are integrally attached on the periphery of the lens holder 29, and the lens holder 29 is supported rockably in the focus direction and tracking direction of the extra-high density optical disc 1 or the DVD 2 via a plurality of suspension wires (not shown) fixed to the periphery of the lens holder 29.

Moreover, the aberration correction element 30 and objective lens 31 are integrated with the lens holder 29 via the focus coil 32, the tracking coil 33, and a permanent magnet (not shown), and are controlled in the focus direction and tracking direction of the extra-high density optical disc 1. It is to be noted that also in the DVD 2 described later, the aberration correction element 30 and objective lens 31 are integrated with the lens holder 29, and are controlled in the focus direction and tracking direction of the DVD 2.

Thereafter, reproducing, recording, or deleting is performed with respect to the signal surface 1b of the extra-high density optical disc 1 by the first laser beam converged on the objective lens 31.

Furthermore, a returning first reflected light by the first laser light L1 reflected by the signal surface 1b of the extra-high density optical disc 1 forms a circularly polarized light turned in reverse to that of a forward path, and is incident upon the objective lens 31 again. The light is formed into the parallel light by the objective lens 31, transmitted through the aberration correction element 30, thereafter changes the ray direction by 90° by the plane mirror 28, and passes through the dichroic film 27a of the dichroic prism 27 and through the phase plate 26 to form a linearly polarized light (s-polarized light) having a polarization direction crossing that of the forward path at right angles. In this case, the first reflected light transmitted through the phase plate 26 is the linearly polarized light (s-polarized light) whose polarization direction crosses that of the forward path at right angles. Therefore, the light passes through the polarization selective dielectric multilayered film 25a of the polarized beam splitter 25, forms a convergent light by a sensor lens 34, and is converged on a first photodetector 35. Moreover, the first photodetector 35 detects a tracking error signal, focus error signal, and main data signal at a time of reproduction of the signal surface 1b of the extra-high density optical disc 1.

Next, a red semiconductor laser 23 side for the DVD 2 will be described. The second laser light L2 having a wavelength $\lambda 2=660$ nm emitted from the red semiconductor laser 23 is a divergent light of the linear polarization (p-polarized light), this divergent light passes through a hologram element 37 in the integrated device for DVD 36 to form a parallel light in a collimator lens 39, and the parallel light passes through a phase plate 40 for the second laser light to form a circularly polarized light. In this case, the phase plate 40 for the second laser light applies a phase difference of $(\lambda 2)/4$ at a time of the transmission of the second laser light L2 having a wavelength $\lambda 2=660$ nm.

It is to be noted that the integrated device for DVD 36 is constituted by integrating the red semiconductor laser 23, the hologram element 37 disposed above the red semiconductor laser 23, and a second photodetector 38 disposed on the right side of the red semiconductor laser 23 on a semiconductor substrate (not shown).

Moreover, the second laser light L2 transmitted through the phase plate 40 is reflected by the dichroic film 27a of the dichroic prism 27 to change the ray direction by 90°. Furthermore, the ray direction is changed by 90° in the plane mirror 28 for rising. Thereafter, the parallel light of the second laser light L2 is incident upon the aberration correction element 30, and an aperture is limited in the outer circular region of the aberration correction element 30 so that the numerical aperture (NA) into the objective lens 31 is 0.6. However, after the spherical aberration is corrected by the 1st order light diffracted in the inner circular region, the divergent light by the diffracted 1st order light is incident upon the objective lens 31, and a second laser beam obtained by focusing the second laser light L2 by the objective lens 31 is incident via the laser beam incidence surface 2a of the DVD 2 and is converted on the signal surface 2b.

It is to be noted that the function of the aberration correction element 30 with respect to the second laser light L2 will be described later in detail.

Thereafter, the reproducing, recording, or deleting is performed with respect to the signal surface 2b of the DVD 2 by the second laser beam converged on the objective lens 31.

Furthermore, a returning second reflected light by the second laser light L2 reflected on the signal surface 2b of the DVD 2 thereafter forms a circularly polarized light turned in reverse to that of the forward path, and is incident upon the objective lens 31 again. A second reflected light of the 1st order light is formed into the convergent light by the objective lens 31, further formed into the parallel light by the aberration correction element 30, thereafter changes the ray direction by 90° by the plane mirror 28, and is reflected by the dichroic film 27a of the dichroic prism 27 to change the ray direction by 90°. The light passes through the phase plate 40 to form a linearly polarized light (s-polarized light) reverse to the light of the forward path. The light is formed in the convergent light by the collimator lens 39, diffracted by the hologram element 37, and converged onto the second photodetector 38. Accordingly, the second photodetector 38 detects the tracking error signal, focus error signal, and main data signal at the time of the reproduction of the signal surface 2b of the DVD 2.

In this case, the spherical aberration generated by an optical condensing system disposed on the optical axis between the red semiconductor laser 23 and the signal surface 2b of the DVD 2 is corrected by the aberration correction element 30. When the spherical aberration is minimized, the distance between the objective lens 31 and the laser beam incidence surface 2a of the DVD 2, that is, the working distance is about 0.35 mm.

As described above, a non-polarization optical system is disposed on the DVD 2 side, but the linearly polarized light crossing the forward path at right angles is formed, and therefore the red semiconductor laser 23 is hardly influenced by the second reflected light.

Here, the aberration correction element 30 and objective lens 31 forming the main part of Embodiment 1 will be described in order with reference to FIGS. 4A to 9.

Figure 4A:
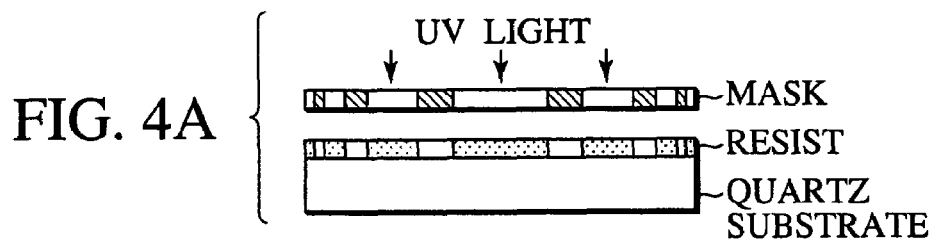
FIGS. 4A to 4C are process diagrams showing Preparation Method 1 of an aberration correction element in Embodiment 1 shown in FIG. 3.
Figure 4B:
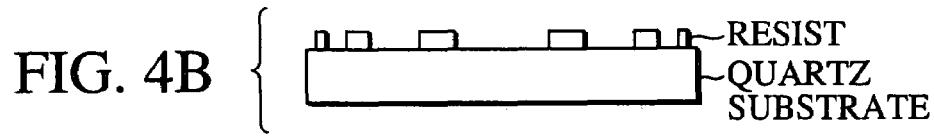
Figure 4C:
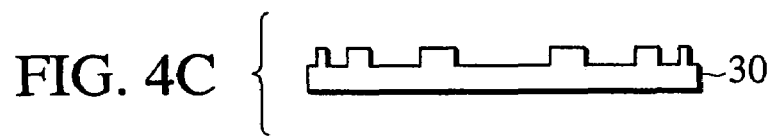
Figure 5A:
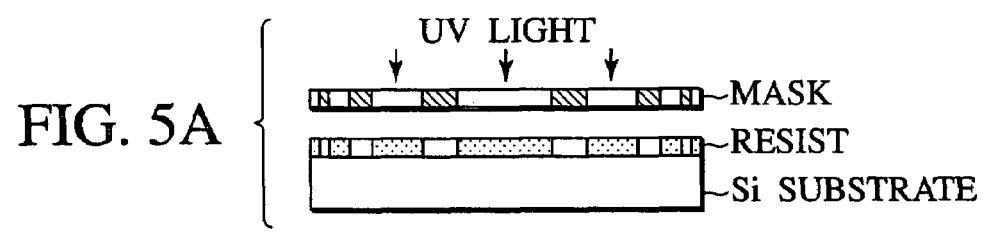
FIGS. 5A to 5F are process diagrams showing Preparation Method 2 of the aberration correction element in Embodiment 1 shown in FIG. 3.
Figure 5B:
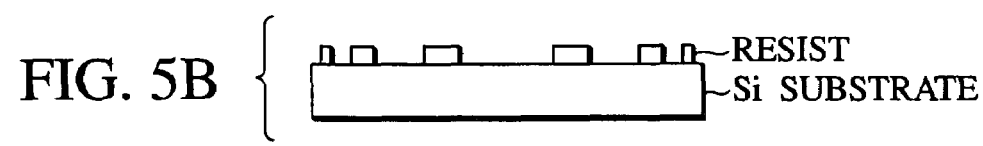
Figure 5C:
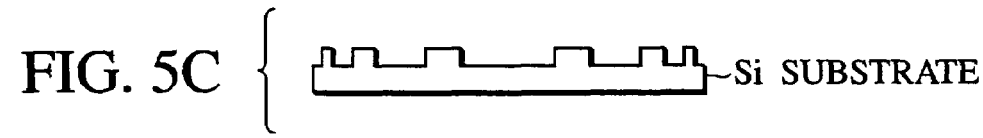
Figure 5D:
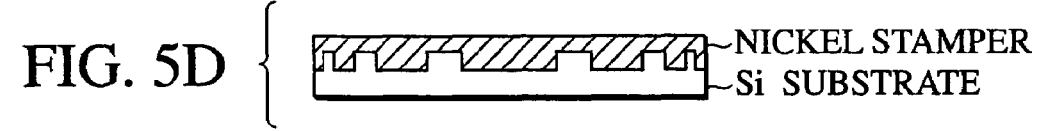
Figure 5E:
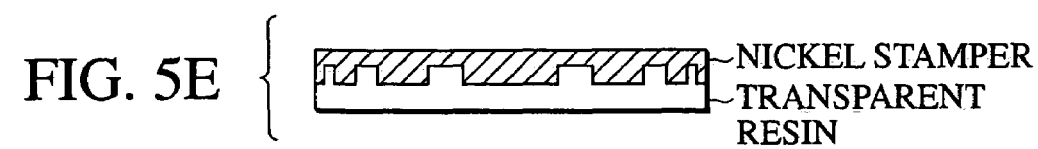
Figure 5F:
Figure 6A:
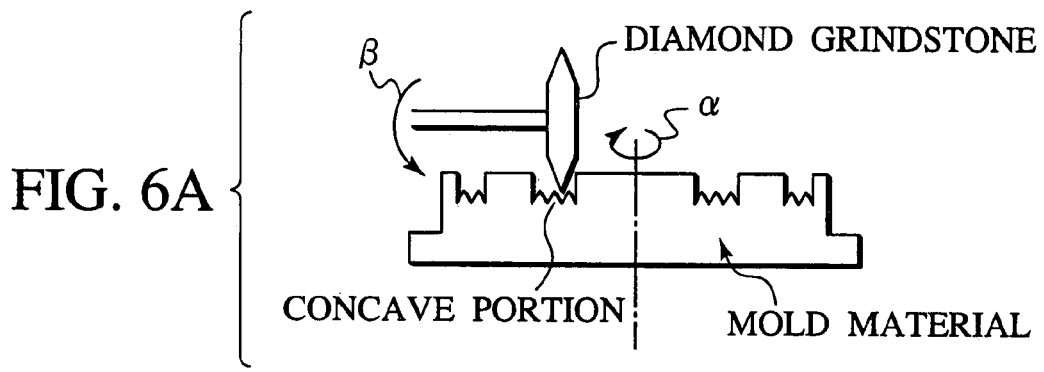
FIGS. 6A to 6E are process diagrams showing Preparation Method 3 of the aberration correction element in Embodiment 1 shown in FIG. 3.
Figure 6B:
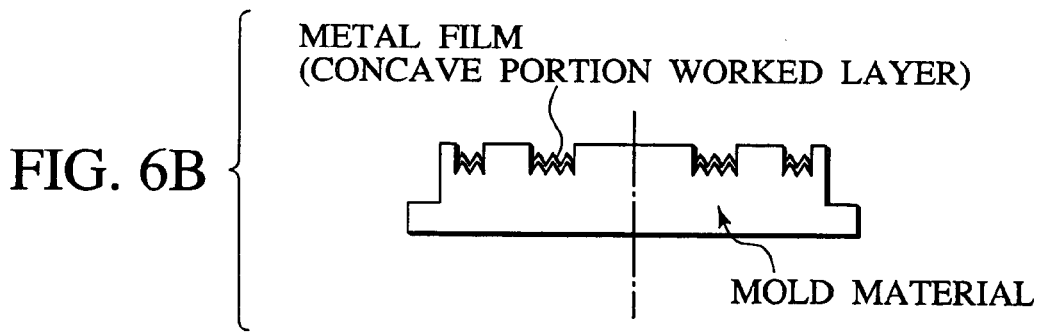
Figure 6C:
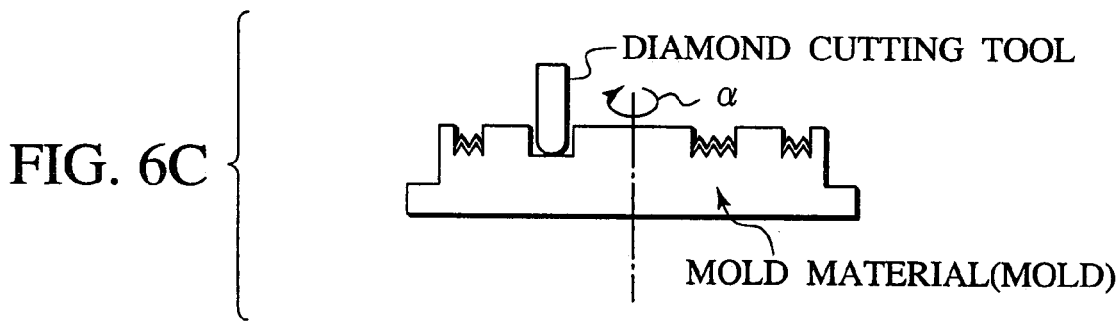
Figure 6D:
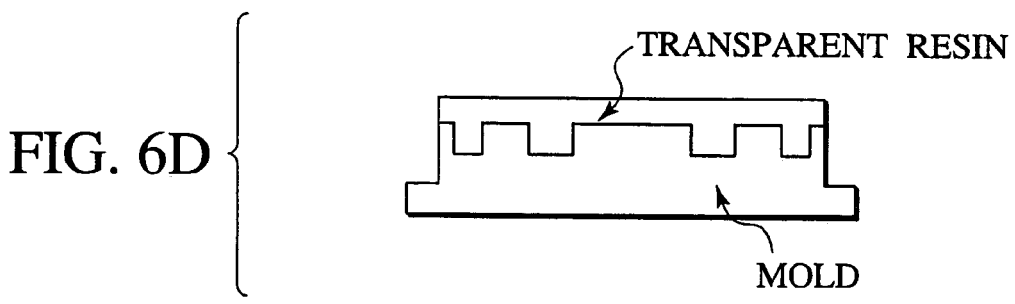
Figure 6E:
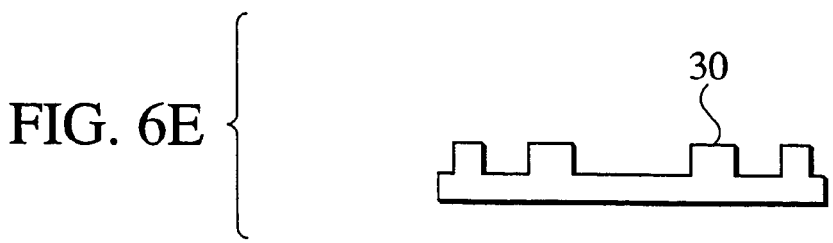
Figure 7A:
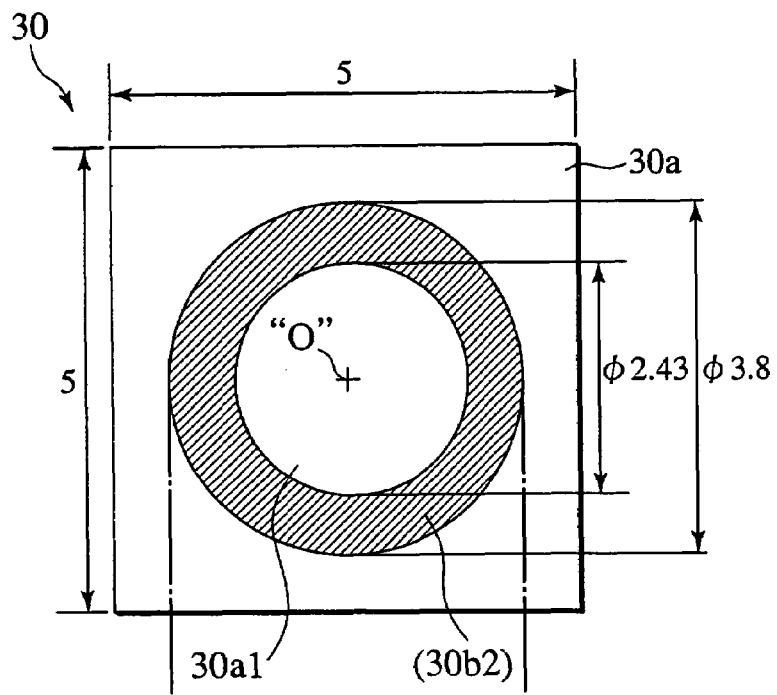
FIGS. 7A to 7C are explanatory views of the aberration correction element in Embodiment 1 shown in FIG. 3, where
Figure 7B:
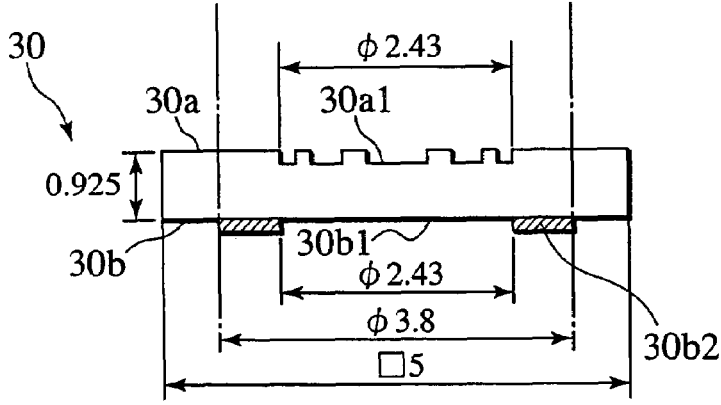
Figure 7C:
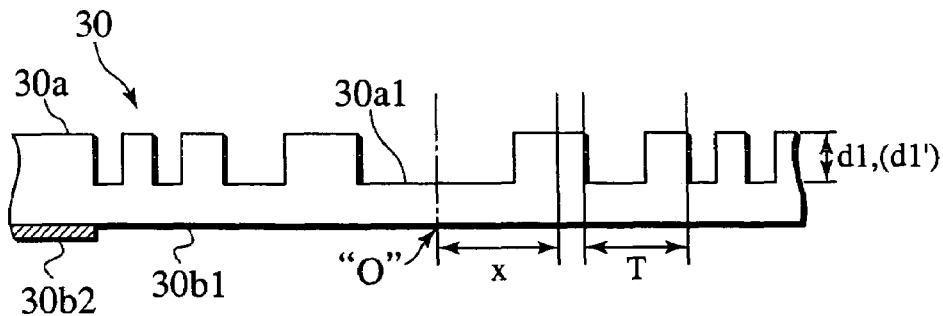
Figure 8:
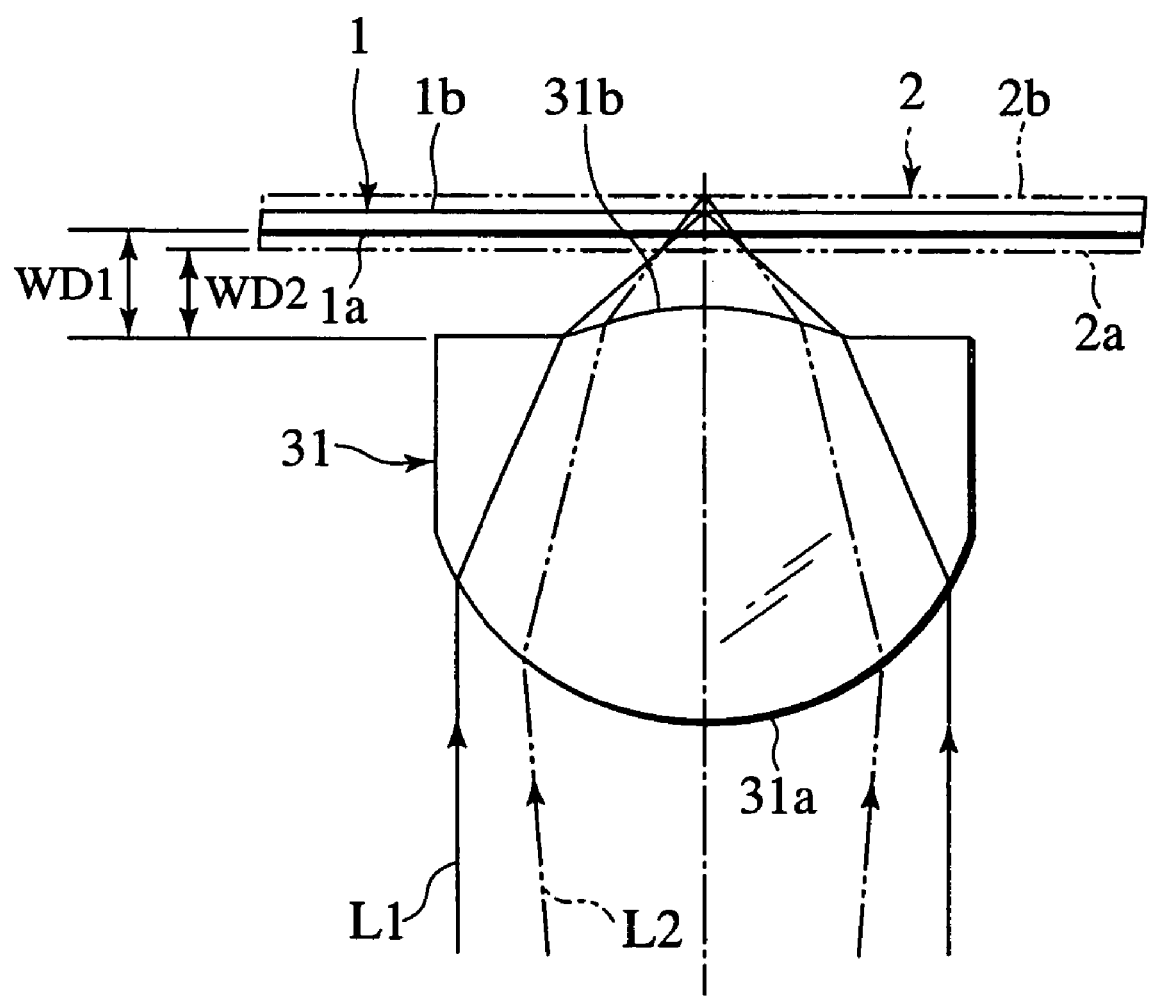
FIG. 8 is an enlarged diagram showing a case where an extra-high density optical disc or DVD is recorded or reproduced using an objective lens optimized in an infinitely conjugated state for the extra-high density optical disc.
Figure 9:
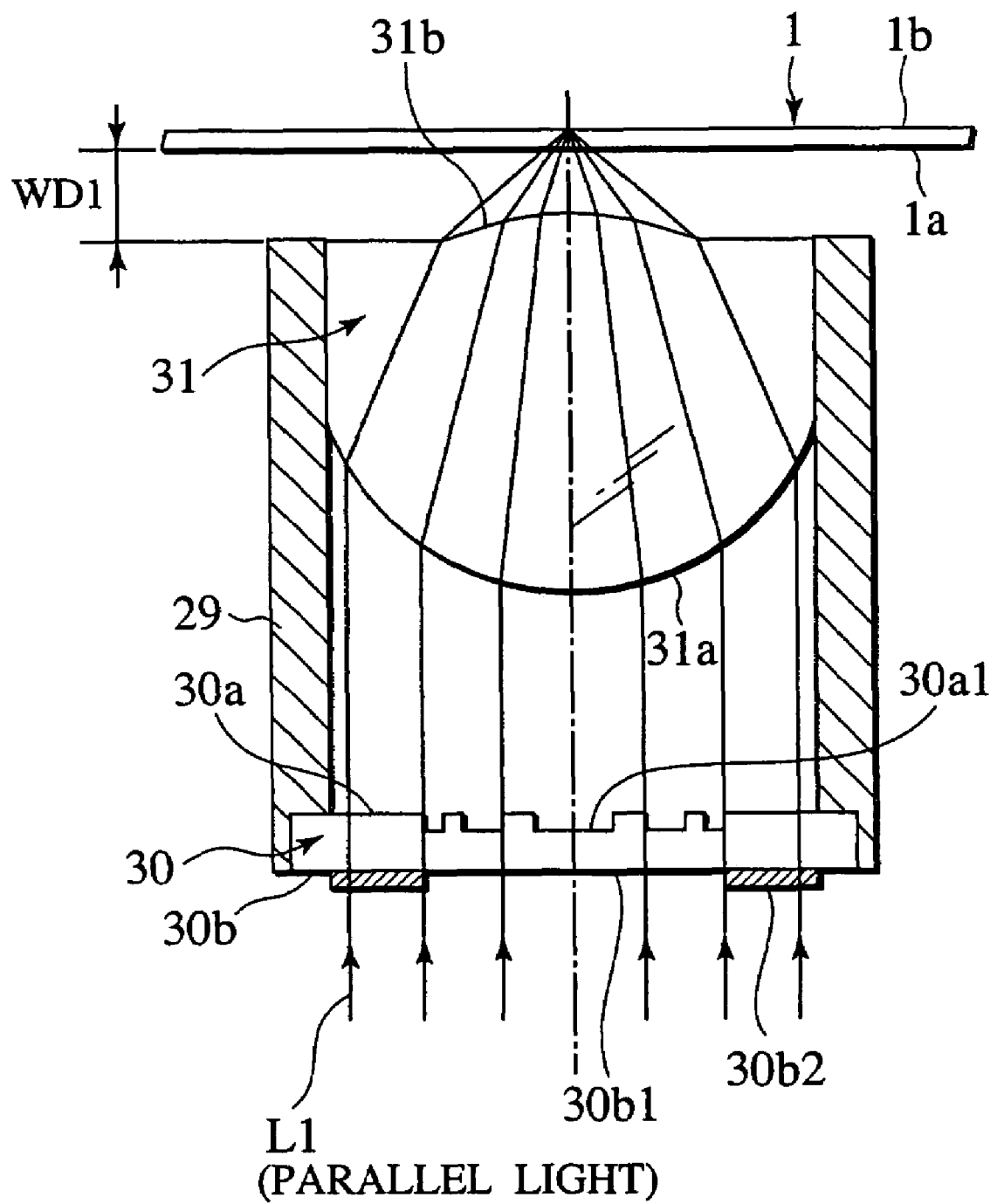
FIG. 9 is a diagram schematically showing a case where the extra-high density optical disc is recorded or reproduced with the aberration correction element shown in FIGS. 7A to 7C and the objective lens shown in FIG. 8.
Figure 10:
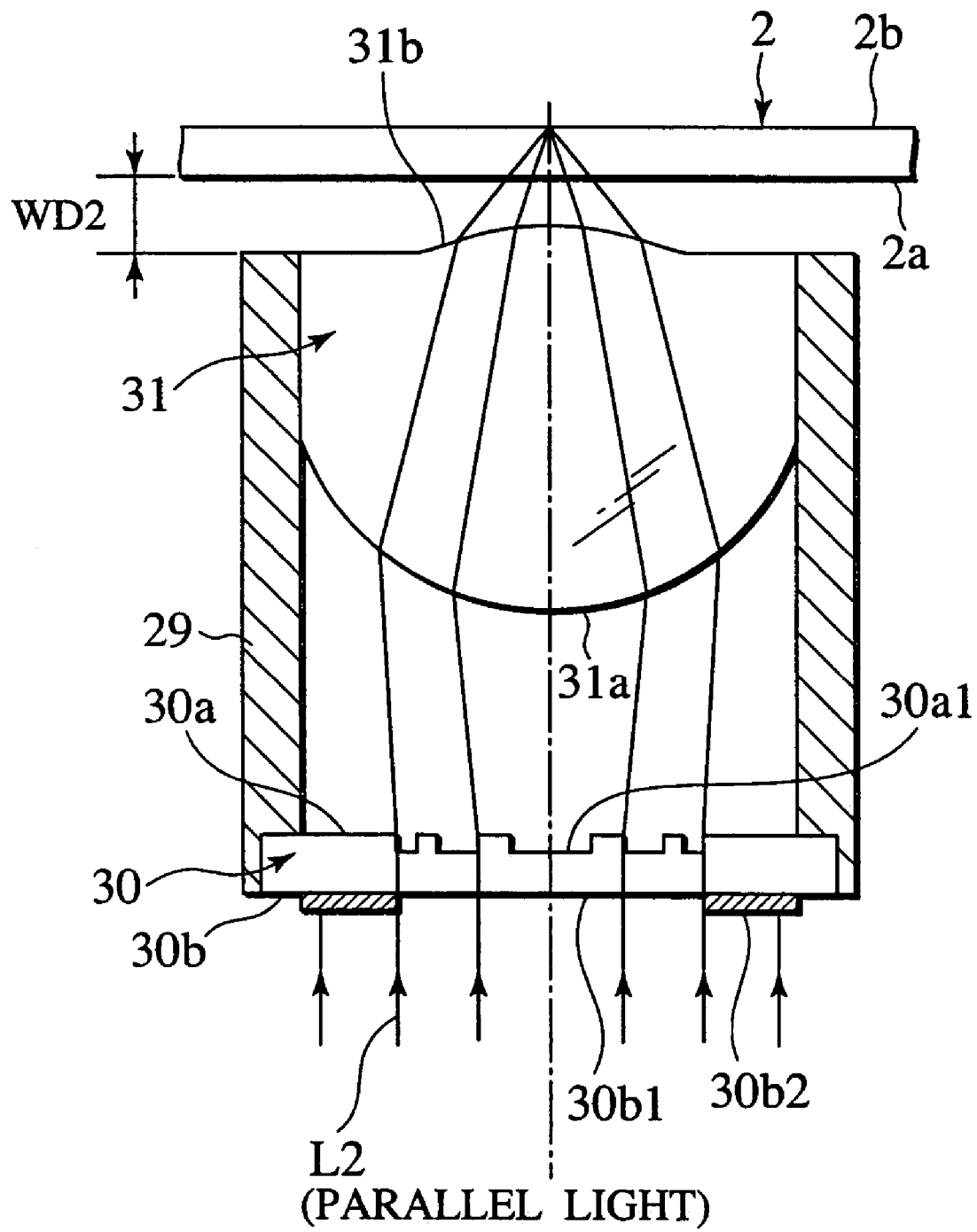
FIG. 10 is a diagram schematically showing a case where the DVD is recorded or reproduced with the aberration correction element shown in FIGS. 7A to 7C and the objective lens shown in FIG. 8.
Figure 11:
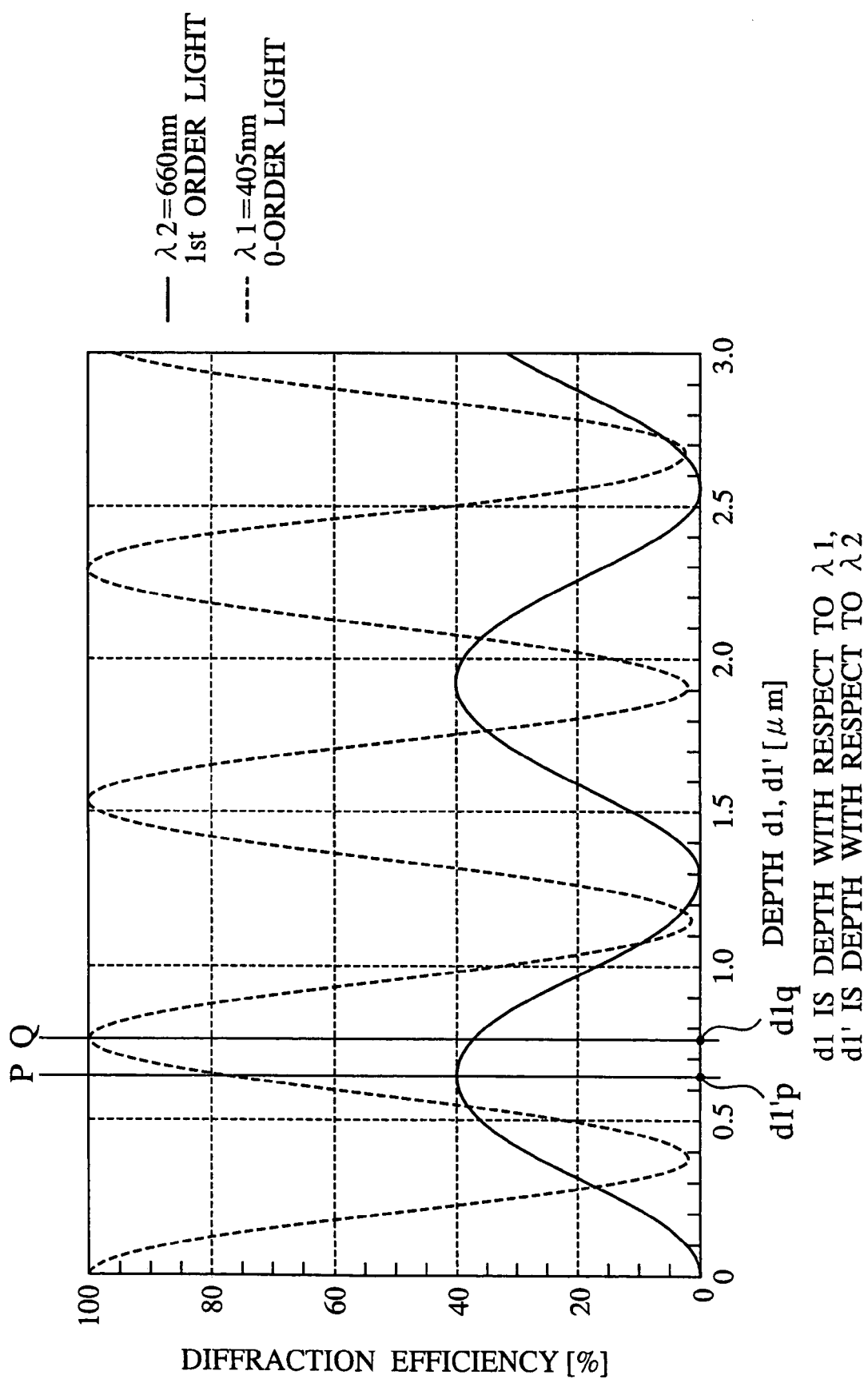
FIG. 11 is a diagram showing a relation between each diffraction efficiency at a time at which first and second laser lights having wavelengths $\lambda 1$, $\lambda 2$ are incident upon the concave/convex diffraction pattern portion and a depth of a concave portion in the concave/convex diffraction pattern portion.

FIGS. 4A to 4C are process diagrams showing Preparation Method 1 of the aberration correction element in Embodiment 1 shown in FIG. 3. FIGS. 5A to 5F are process diagrams showing Preparation Method 2 of the aberration correction element in Embodiment 1 shown in FIG. 3. FIGS. 6A to 6E are process diagrams showing Preparation Method 3 of the aberration correction element in Embodiment 1 shown in FIG. 3. FIGS. 7A to 7C are explanatory views of the aberration correction element in Embodiment 1 shown in FIG. 3, where FIG. 7A is a top plan view, FIG. 7B is a front view, and FIG. 7C is an enlarged view of a concave/convex diffraction pattern portion. FIG. 8 is an enlarged diagram showing a case where the extra-high density optical disc or DVD is recorded or reproduced using the objective lens optimized in the infinitely conjugated state for the extra-high density optical disc. FIG. 9 is a diagram schematically showing a case where the extra-high density optical disc is recorded or reproduced with the aberration correction element shown in FIGS. 7A to 7C and the objective lens shown in FIG. 8. FIG. 10 is a diagram schematically showing a case where the DVD is recorded or reproduced with the aberration correction element shown in FIGS. 7A to 7C and the objective lens shown in FIG. 8. FIG. 11 is a diagram showing a relation between each diffraction efficiency at a time at which the first and second laser lights having the wavelengths $\lambda 1$, $\lambda 2$ are incident upon the concave/convex diffraction pattern portion and a depth of a concave portion in the concave/convex diffraction pattern portion.

Here, the aberration correction element 30 constituting the main part of Embodiment 1 is prepared using any of Preparation Method 1 shown in FIGS. 4A to 4C, Preparation Method 2 shown in FIGS. 5A to 5F, and Preparation Method 3 shown in FIGS. 6A to 6E.

First, Preparation Method 1 of the aberration correction element 30 will be described. In an exposure process shown in FIG. 4A, a mask for the concave/convex diffraction pattern portion of the aberration correction element 30 described later is prepared by an electron drawing device, this mask is allowed to face a resist formed on, for example, a quartz substrate having light-transparency, the mask is irradiated with a UV light from above, and the resist is exposed to the UV light passed through openings in the mask. Next in a development process shown in FIG. 4B, a resist portion exposed to the UV light is removed to expose a part of the quartz substrate, and a resist portion which has not been exposed to the UV light on the quartz substrate is left. Next in an etching/resist removing process shown in FIG. 4C, the portion exposing the quartz substrate is etched using an etching solution. Thereafter, when the resist left on the quartz substrate is removed, the concave/convex diffraction pattern portion is formed on the quartz substrate, and the aberration correction element 30 is prepared using the quartz substrate. In this case, the mask is prepared beforehand so that a large number of aberration correction elements 30 can be prepared by the quartz substrate. In a stage in which the etching/resist removing process ends, a large number of aberration correction elements 30 are cut from the quartz substrate. Then, a large number of aberration correction elements 30 can be prepared by the quartz substrate, and cost of the aberration correction element 30 can be reduced.

Next, Preparation Method 2 of the aberration correction element 30 will be described. Instead of the quartz substrate having light-transparency, an opaque Si substrate is used. In a process of FIGS. 5A to 5C, the process of FIGS. 4A to 4C is performed, and the concave/convex diffraction pattern portion is formed on an Si substrate. Thereafter, in a stamper preparation process shown in FIG. 5D, a nickel stamper is prepared in which the concave/convex diffraction pattern portion is reversed by electroforming. Next, in a transfer process shown in FIG. 5E, the concave/convex diffraction pattern portion of the nickel stamper is transferred onto a transparent resin molten by molding by use of the nickel stamper. Next, in a stamper peeling process shown in FIG. 5F, when the nickel stamper is peeled from the transparent resin, the same concave/convex diffraction pattern portion as that formed on the Si substrate is formed, the aberration correction element 30 using the transparent resin can be repeatedly prepared many times, and the cost of the aberration correction element 30 can be further reduced using the transparent resin with an inexpensive material cost.

Furthermore, Preparation Method 3 of the aberration correction element 30 will be described. In a rough working process shown in FIG. 6A, a mold material formed of a metal is used in order to prepare a mold in which the concave/convex diffraction pattern portion is reversed. In this case, the mold material is rotated in an arrow $\alpha$ direction centering on a central axis of the mold material, and a diamond grindstone is rotated in an arrow $\beta$ direction on an upper surface side of the mold material to grind the concave portion in an annular shape with the diamond grindstone. Next, in a worked layer forming process shown in FIG. 6B, a metal film is deposited in the concave portion of the mold material ground in FIG. 6A by sputtering or plating to form a concave portion worked layer. Thereafter, in a precise cutting process shown in FIG. 6C, the mold material is rotated in an arrow a direction, and the inside of the concave portion worked layer formed in FIG. 6B is precisely cut with a diamond cutting tool to prepare a mold having a concave/convex diffraction pattern. Next, in a transfer process shown in FIG. 6D, the concave/convex diffraction pattern portion of the mold is transferred onto the molten transparent resin. Next, in a mold peeling process shown in FIG. 6E, when the transparent resin is peeled from the mold, the concave/convex diffraction pattern portion reverse to that of the mold is formed, and the aberration correction element 30 using the transparent resin can be prepared. Also in this case, since the aberration correction element 30 can be prepared using the mold repeatedly many times, the cost of the aberration correction element 30 can further be reduced using the transparent resin with the inexpensive material cost.

Moreover, in Embodiment 1, Preparation Method 1 described above is applied. As a glass material, instead of using the quartz substrate shown in FIG. 4, borosilicate crown glass (BK7) having a thickness, for example, of 0.925 mm is used to prepare the aberration correction element 30 in a shape shown in FIGS. 7A to 7C.

That is, as shown in FIGS. 7A and 7B, the aberration correction element 30 in Embodiment 1 is formed in an outer configuration of a 5 mm square using borosilicate crown glass (BK7) having light-transparency and having a thickness of 0.925 mm. Moreover, a concave/convex diffraction pattern portion 30*a*1 is formed in an inner circular region having a diameter of 02.43 mm centering on a center "O" on an upper surface 30*a* side facing the objective lens 31 (FIG. 3). Furthermore, an outer circular region adjacent to the periphery of the concave/convex diffraction pattern portion 30*a*1 forms a flat upper surface 30*a* on which any concave/convex diffraction pattern portion is not formed.

Moreover, as enlarged and shown in FIG. 7C, in the concave/convex diffraction pattern portions 30*a*1 formed in a concave/convex form on the upper surface 30*a* of the aberration correction element 30, a plurality of annular concave/convex pattern are formed in such a manner that a concave/convex repeating period T is gradually shortened or lengthened toward an outer circular portion from an inner circular portion. This concave/convex portion is equivalent to a stair structure whose stair number n is set to two and whose step number n−1 is set to one with respect to Embodiment 2 described later.

Turning back to FIGS. 7A and 7B, a light-transparent flat portion 30b1 is formed in a circular shape in the inner circular region having a diameter φ2.43 mm or less centering on the center "O" at the reverse side of the concave/convex diffraction pattern portion 30a1. Moreover, an aperture limiting portion 30b2 for the second laser light is formed in an annular form using a dichroic film so as to limit a numerical aperture into the objective lens 31 to 0.6 with respect to the second laser light L2 in an outer circular region having a diameter φ2.43 mm or more and φ3.8 mm or less, adjacent to the periphery of the light-transparent flat portion 30b1.

In this case, the aperture limiting portion 30b2 for the second laser light formed on an undersurface 30b of the aberration correction element 30 has characteristics that the first laser light L1 having a wavelength λ1=405 nm±8 nm emitted from the blue semiconductor laser 22 (FIG. 3) is transmitted by the dichroic film having a wavelength selecting property and that the second laser light L2 having a wavelength λ2=660 nm±10 nm emitted from the red semiconductor laser 23 (FIG. 3) is interrupted.

It is to be noted that instead of forming the dichroic film as the aperture limiting portion 30b2 for the second laser light formed on the undersurface 30b of the aberration correction element 30, a concave/convex diffraction pattern having a similar performance and having a concave/convex dimension different from that of the concave/convex diffraction pattern portion 30a1 may also be formed in the annular form in the outer circular region.

Furthermore, when reflection preventive films (not shown) each having a reflectance of 0.5% or less are formed on the upper surface 30a and the undersurface 30b of the aberration correction element 30, a light transmittance is 98% or more.

Therefore, in the aberration correction element 30, the circular light-transparent flat portion 30b1 and the annular aperture limiting portion 30b2 for the second laser light are formed in order toward the outer circular portion from the central portion on the undersurface 30b on the side of the first and second laser light sources 22, 23. Moreover, the diffraction pattern portion 30a1 is formed on the inner circular region of the upper surface 30a on an objective lens 31 side, and the outer side of this diffraction pattern portion 30a1 is formed to be flat.

In this case, when borosilicate crown glass (BK7) is used as the glass material of the aberration correction element 30, a refractive index N1 with respect to the first laser light L1 having the wavelength λ1=405 nm emitted from the blue semiconductor laser 22 (FIG. 3) is 1.5302, and a refractive index N2 with respect to the second laser light L2 having the wavelength λ2=660 nm emitted from the red semiconductor laser 23 (FIG. 3) is 1.5142.

Moreover, as enlarged and shown in FIG. 7C, in the inner circular region of the upper surface 30a of the aberration correction element 30, a depth d1 of the concave portion in the concave/convex diffraction pattern portion 30a1 whose step number is one is obtained from the following equation (1) so as to prevent a diffraction function with respect to the 0-order light of the first laser light L1 having the wavelength λ1=405 nm emitted from the blue semiconductor laser 22 (FIG. 3). The 0-order light of the first laser light L1 is transmitted as such without being diffracted. That is, when a depth d1 of the concave portion in the concave/convex diffraction pattern portion 30a1 is an integer times a phase difference 2π (optical path difference equal to the wavelength λ1 of the first laser light L1), a 0-order diffraction efficiency is 100%.

$$d1 = \frac{(\lambda 1)}{(N1)-1} \times (k1), \quad (1)$$

where d1 is the depth of the concave portion in the concave/convex diffraction pattern portion 30a1 with respect to the 0-order light of the first laser light L1;

λ1 is the wavelength of the first laser light L1;

N1 is a refractive index of the aberration correction element 30 with respect to the first laser light L1; and k1 is a period coefficient with respect to the 0-order light of the first laser light L1 (natural number).

Assuming that k1 in the above equation (1) is a period coefficient (natural number) with respect to the 0-order light of the first laser light L1, a period coefficient k1 with respect to the 0-order light of the first laser light L1 is 1 on the line Q in FIG. 11 described later. Moreover, when the refractive index N1 of the aberration correction element 30 with respect to the first laser light L1 having the wavelength λ1=405 nm is 1.5302, a depth d1 of the concave portion in the concave/convex diffraction pattern portion 30a1 with respect to the 0-order light of the first laser light L1 is as follows from the above equation (1):

$d1=0.405/(1.5302-1)\mu m=0.763\ \mu m$.

Accordingly, the depth d1 (=0.763 μm) in the concave/convex diffraction pattern portion 30a1 is a value with which an optical path difference equal to the wavelength λ1 of the first laser light L1 is obtained. Therefore, the depth d1 of the concave portion in the concave/convex diffraction pattern portion 30a1 is set to be an optical path difference correspondingly equal to the wavelength λ1 of the first laser light L1.

On the other hand, a depth d1' of the concave portion in the concave/convex diffraction pattern portion 30a1 with respect to the 1st order light of the second laser light L2 is obtained from the following equation (2). This will be described later in detail.

$$d1' = \frac{1}{2} \times \frac{(\lambda 2)}{(N2)-1} \times (k2), \quad (2)$$

where d1' is a depth of the concave portion of the concave/convex diffraction pattern portion 30a1 with respect to the 1st order light of the second laser light L2;

λ2 is a wavelength of the second laser light L2;

N2 is a refractive index of the aberration correction element 30 with respect to the second laser light L2; and k2 is a period coefficient (natural number) with respect to the 1st order light of the second laser light L2.

Furthermore, in the concave/convex diffraction pattern portion 30a1 formed on the upper surface 30a of the aberration correction element 30, when the signal surface 2b of the DVD 2 (FIG. 3) is irradiated with the 1st order light obtained by diffracting the parallel light of the second laser light L2 having the wavelength λ2=660 nm emitted from the red semiconductor laser 23 (FIG. 3) described later, a spot of the second laser light L2 on the signal surface 2b corresponds to the numerical aperture (NA)=0.6. A phase difference in a distance x in a radial direction from the center "O" of the concave/convex diffraction pattern portion 30a1 is obtained by a phase difference function Φ(x) shown in the following equation (3) so that the spherical aberration of the 1st order light of the second laser light L2 is minimized. When the phase difference is binarized, the concave/convex shape of two steps in the radial direction is determined.

$$\Phi(x) = \frac{2\pi m}{(\lambda 2)} \times (A_2 x^2 + A_4 x^4 + A_6 x^6 + A_8 x^8), \quad (3)$$

where Φ(x) is a phase difference function;

m is a diffraction order;

$A_2$ to $A_8$ are phase difference function coefficients of second to eighth orders;

x is a distance in the radial direction from the center "0" of the concave/convex diffraction pattern portion 30a1; and λ2 is a wavelength of the second laser light L2.

Examples of the phase difference function coefficients $A_2$ to $A_8$ in the phase difference function Φ(x) with respect to the concave/convex diffraction pattern portion 30a1 in the above equation (3) are shown in Table 1.

TABLE 1

| | |
|---|---|
| $A_2$ | 102.632072 |
| $A_4$ | −6.671030 |
| $A_6$ | 2.521836 |
| $A_8$ | −1.137079 |

Next, as shown in FIG. 8, the objective lens 31 constituting the main part of Embodiment 1 is designed for the extra-high density optical disc, for example, optical glass manufactured by HOYA (NBF1) is used as the glass material, the first surface 31a side facing the aberration correction element 30 is formed in a non-spherical surface, and the second surface 31b side facing the extra-high density optical disc 1 or the DVD 2 is also formed in the non-spherical surface.

In this case, a working distance WD1 between the second surface 31b of the objective lens 31 and the laser beam incidence surface 1a of the extra-high density optical disc 1 is about 0.5 mm, and a working distance WD2 between the second surface 31b of the objective lens 31 and the laser beam incidence surface 2a of the DVD 2 is about 0.35 mm.

Moreover, when optical glass manufactured by HOYA (NBF1) is used as the glass material of the objective lens 31, a refractive index N3 with respect to the first laser light L1 having the wavelength λ1=405 nm emitted from the blue semiconductor laser 22 (FIG. 3) is 1.768985, and a refractive index N4 with respect to the second laser light L2 having the wavelength λ2=660 nm emitted from the red semiconductor laser 23 (FIG. 3) is 1.738532.

Here, Table 2 shows specifications of the objective lens 31 designed to be optimum in the infinitely conjugated state so as to record on or reproduce from the extra-high density optical disc 1 by the first laser light L1 having the wavelength λ1=405 nm.

TABLE 2

| | |
|---|---|
| Designed wavelength | 405 nm |
| Numerical aperture (NA) | 0.85 |
| Focal distance | 2.20 mm |
| Incidence pupil diameter | 3.74 mm |
| Magnification | 0 time (parallel light) |

From Table 2, a designed wavelength λ1 of the first laser light L1 emitted from the blue semiconductor laser 22 (FIG. 3) is set, for example, to 405 nm, and the objective lens 31 having an numerical aperture (NA) of 0.85 is used.

Next, when the first surface 31a and the second surface 31b of the objective lens 31 are formed in the non-spherical surface, the non-spherical surface is represented by the following equation (4) which is a polynomial equation:

$$Z = \frac{Ch^2}{1 + \sqrt{1 - (1+K)C^2 h^2}} + \quad (4)$$
$$B_4 h^4 + B_6 h^6 + B_8 h^8 + B_{10} h^{10} + B_{12} h^{12},$$

where Z is a distance from a vertex of the first surface 31a or the second surface 31b of the objective lens 31;

C is a curvature (1/curvature radius) of the first surface 31a or the second surface 31b;

h is a height from the optical axis of the objective lens 31;

K is a Korenich constant; and $B_4$ to $B_{12}$ are non-spherical surface coefficients of fourth to twelfth orders.

When the polynomial equation of the above equation (4) is used, the examples of the non-spherical surface coefficients $B_4$ to $B_{12}$ for forming the first surface 31a of the objective lens 31 in the non-spherical surface are shown in Table 3.

TABLE 3

| | |
|---|---|
| $B_4$ | −0.00092006967 |
| $B_6$ | −0.00025706693 |
| $B_8$ | −0.00057872391 |
| $B_{10}$ | 0.0002222827 |
| $B_{12}$ | −5.678923?10$^{-5}$ |

Moreover, when the polynomial equation of the above equation (4) is used, the examples of the non-spherical surface coefficients $B_4$ to $B_{10}$ for forming the second surface 31b of the objective lens 31 in the non-spherical surface are shown in Table 4.

TABLE 4

| | |
|---|---|
| $B_4$ | 0.61448774 |
| $B_6$ | −0.1395629 |
| $B_8$ | 0.12867014 |
| $B_{10}$ | −0.043733069 |

Furthermore, when the aberration correction element 30 shown in FIGS. 7A to 7C and the objective lens 31 shown in FIG. 8 are stored in the lens holder 29, optical surface forming members with respect to the extra-high density optical disc 1, DVD 2 are shown in Table 5 as follows.

TABLE 5

| Optical surface forming member | Surface shape | Radius [mm] | Thickness [mm] | Material | Korenich constant |
|---|---|---|---|---|---|
| Aberration correction element | — | — | 0.925 | BK7 | — |
| Space | — | — | 4.0 | — | — |
| First surface of objective lens | Non-spherical surface | 1.812171 | 3.104 | NBF1 | −0.337179 |
| Second surface of objective lens | Non-spherical surface | −6.507584 | | | −845.651577 |
| Space | — | — | 0.50 | for extra-high density optical disc | |
| | — | — | 0.35 | for DVD | — |
| Extra-high density optical disc | — | — | 0.10 | Transparent resin | — |
| DVD | — | — | 0.60 | Polycarbonate | — |

From Table 5, the thickness of the aberration correction element 30 is 0.925 mm, and the space between the aberration correction element 30 and the objective lens 31 is 4.0 mm. The curvature radius in the vertex of the first surface 31a of the objective lens 31 is 1.812171 mm, the curvature radius in the vertex of the second surface 31b is −6.507584 mm, a lens thickness between the first and second surfaces 31a, 31b of the objective lens 31 is 3.104 mm, the working distance of the objective lens 31 to the extra-high density optical disc 1 is 0.5 mm, and the working distance of the objective lens 31 to the DVD 2 is 0.35 mm.

Next, the recording or reproducing of the extra-high density optical disc 1, DVD 2 in a state in which the aberration correction element 30 shown in FIGS. 7A to 7C and the objective lens 31 shown in FIG. 8 are stored in the lens holder 29 will be described in order with reference to FIGS. 9, 10.

First, as shown in FIG. 9, when the extra-high density optical disc 1 is recorded or reproduced with the aberration correction element 30 and objective lens 31 stored in the lens holder 29, the first laser light L1 having the wavelength λ1=405 nm emitted from the blue semiconductor laser 22 (FIG. 3) is formed in the parallel light in the collimator lens 24 (FIG. 3) in a state in which the working distance WD1 between the second surface 31b of the objective lens 31 and the laser beam incidence surface 1a of the extra-high density optical disc 1 is set to about 0.5 mm. When the parallel light is incident on the undersurface 30b side of the aberration correction element 30, the parallel light of the first laser light L1 is passed through the light-transparent flat portion 30b1 formed in the circular shape in the inner circular region of the undersurface 30b and the aperture limiting portion 30b2 for the second laser light formed in an annular shape using the dichroic film outside the light-transparent flat portion 30b1. Thereafter, the parallel light of the first laser light L1 as 0-order light is transmitted without being diffracted in the concave/convex diffraction pattern portion 30a1 formed in the inner circular region of the upper surface 30a of the aberration correction element 30, and the light remains to be the parallel light, and is incident upon the first surface 31a of the objective lens 31.

Moreover, the first laser beam focused by the first and second surfaces 31a, 31b of the objective lens 31 is incident upon the laser beam incidence surface 1a of the extra-high density optical disc 1, and is converged onto the signal surface 1b having a disc substrate thickness of 0.1 mm.

In this case, since any diffraction does not occur with respect to the first laser light L1 having the wavelength λ1=405 nm in the concave/convex diffraction pattern portion 30a1 formed in the upper surface 30a of the aberration correction element 30, any loss is not generated in quantity of light in the aberration correction element 30 except reflection or absorption. When the depth d1 of the concave portion in the concave/convex diffraction pattern portion 30a1 is set to 0.763 μm as described above, the diffraction efficiency of the 0-order light is 100%. At this time, since an output of the blue semiconductor laser 22 (FIG. 3) having the wavelength λ1=405 nm is low, it is indispensable that the loss in the quantity of light is little in each optical component of the optical pickup device 20A of Embodiment 1.

Next, as shown in FIG. 10, when the DVD 2 is recorded or reproduced with the aberration correction element 30 and objective lens 31 stored in the lens holder 29, the second laser light L2 having the wavelength λ2=660 nm emitted from the red semiconductor laser 23 (FIG. 3) is formed in the parallel light in the collimator lens 39 (FIG. 3) in a state in which the working distance WD2 between the second surface 31b of the objective lens 31 and the laser beam incidence surface 2a of the DVD 2 is set to about 0.35 mm. When the parallel light is incident on the undersurface 30b side of the aberration correction element 30, the parallel light of the second laser light L2 is interrupted by the aperture limiting portion 30b2 for the second laser light formed in the annular form using the dichroic film in the outer circular region of the undersurface 30b, and the aperture is limited to set the numerical aperture (NA) into the objective lens 31 to 0.6. Even in this case, after transmitted through the light-transparent flat portion 30b1 formed in the circular shape in the inner circular region of the undersurface 30b of the aberration correction element 30, the parallel light of the second laser light L2 is diffracted by the concave/convex diffraction pattern portion 30a1 formed in the inner circular region of the upper surface 30a of the aberration correction element 30. The 1st order light as divergent light obtained by the diffraction is incident upon the first surface 31a of the objective lens 31 to correct a spherical aberration thereon.

Moreover, the second laser beam focused by the first and second surfaces 31a, 31b of the objective lens 31 is incident upon the laser beam incidence surface 2a of the DVD 2, and converged onto the signal surface 2b having a disc substrate thickness of 0.6 mm.

In this case, since the objective lens 31 is designed for the extra-high density optical disc, the spherical aberration is large with respect to the second laser light L2 having the wavelength λ2=660 nm emitted from the red semiconductor laser 23 (FIG. 3). However, since the wave front correction is performed with respect to the second laser light L2 in the concave/convex diffraction pattern portion 30a1 formed on the upper surface 30a of the aberration correction element 30 to correct the spherical aberration, any trouble is not caused in the recording or reproducing of the DVD 2.

From the above description, in the optical pickup device 20A of Embodiment 1, the first laser light L1 for the extra-high density optical disc and the second laser light L2 for the DVD are incident upon the aberration correction element 30 in the form of the parallel lights. Therefore, even when the optical axes of the first and second laser lights L1, L2 slightly deviate from the optical axis of the objective lens 31, the spherical aberration is only little deteriorated. Moreover, it is easy to adjust the optical axes at the time of assembling of the optical pickup device 20A.

Here, when the extra-high density optical disc 1 or the DVD 2 is selectively recorded or reproduced with the aberration correction element 30 and objective lens 31 stored in the lens holder 29, as shown in FIG. 7, the concave/convex repeating period T in the concave/convex diffraction pattern portion 30a1 formed in the upper surface 30a of the aberration correction element 30 is sufficiently large as compared with the wavelength. When the portion is regarded as thin, an m-order diffraction efficiency ηm after the transmission through the concave/convex diffraction pattern portion 30a1 is represented by the following equation (5) using a scalar theory:

$$\eta_m = \left| \frac{1}{T} \int_0^T \exp\{j\Phi(x)\} \exp\left(-j\frac{2\pi m x}{T}\right) dx \right|^2, \quad (5)$$

where ηm denotes an m-order diffraction efficiency;

T denotes a period of the concave/convex pattern in the concave/convex diffraction pattern portion 30a1;

Φ(x) denotes a phase difference function; and m denotes a diffraction order.

In this case, the concave/convex repeating period T in the concave/convex diffraction pattern portion 30a1 in the equation (5) is calculated as a certain value to facilitate the calculation. However, as described above, the concave/convex repeating period T in the concave/convex diffraction pattern portion 30a1 is formed to be gradually shortened or lengthened toward the outer from the inner in the radial direction of the aberration correction element 30.

Next, FIG. 11 shows a result of calculation of the diffraction efficiencies of the 0-order light of the first laser light L1 and the 1st order light of the second laser light L2 using the above equation (5) at a time at which the first laser light L1 having the wavelength λ1=405 nm for the extra-high density optical disc and the second laser light L2 having the wavelength λ2=660 nm for the DVD are incident upon the concave/convex diffraction pattern portion 30a1 formed in the upper surface 30a of the aberration correction element 30.

Here, as described above, the depth d1=0.763 μm of the concave portion in the concave/convex diffraction pattern portion 30a1 formed in the upper surface 30a of the aberration correction element 30 is a value designed for the 0-order light of the first laser light L1 having wavelength λ1=405 nm for the extra-high density optical disc. As described above using the equation (1), the depth d1=0.763 μm of concave portion in the concave/convex diffraction pattern portion 30a1 is set to be an optical path difference correspondingly equal to the wavelength λ1 of the first laser light L1. Therefore, when the depth d1 of the concave portion in the concave/convex diffraction pattern portion 30a1 is equal to the optical path difference corresponding to the wavelength λ1 of the first laser light L, the diffraction efficiency of the 0-order light of the first laser light L1 is 100% on the line Q in FIG. 9.

On the other hand, when the depth d1 of the concave portion in the concave/convex diffraction pattern portion 30a1 is 0.763 μm with respect to the 0-order light of the first laser light L1, the diffraction efficiency of the 1st order light with respect to the second laser light L2 having the wavelength λ2=660 nm for the DVD is 37.1%.

In the above description, conditions on which the diffraction efficiency of the 1st order light is maximized with respect to the second laser light L2 having the wavelength λ2=660 nm for the DVD are determined. As a result, the depth d1' of the concave portion in the concave/convex diffraction pattern portion 30a1 on a line P in FIG. 11 is 0.642 μm, and the maximum diffraction efficiency of the 1st order light with respect to the second laser light L2 at this time is 40.5%.

On the other hand, when the depth d1' of the concave portion in the concave/convex diffraction pattern portion 30a1 is 0.642 μm with respect to the 1st order light of the second laser light L2, the diffraction efficiency of the 0-order light with respect to the first laser light L1 having the wavelength λ1=405 nm for the extra-high density optical disc is 77.2%.

From the above description, to establish a system for recording or reproducing both the extra-high density optical disc 1 and the DVD 2, it is preferable to obtain a high diffraction efficiency on the aberration correction element 30 with respect to both the first laser light L1 having wavelength λ1=405 nm and the second laser light L2 having the wavelength λ2=660 nm. In this case, the red semiconductor laser 23 (FIG. 3) having the wavelength λ2 of about 660 nm for the DVD having a high output can be produced in mass, but a diffraction efficiency as high as possible is preferable. On the other hand, the blue semiconductor laser 22 (FIG. 3) having a wavelength λ1 of about 405 nm for the extra-high density optical disc has a low output, but a diffraction efficiency of 100% is not essential, and a slight drop in the diffraction efficiency is permitted. For example, there is a demand for a design in which a diffraction efficiency of 70% or more in the extra-high density optical disc 1 is secured, slight sacrifice may be made, a high diffraction efficiency close to the maximum diffraction efficiency is kept in the DVD 2, and thus a good balance is established.

In consideration of the above-described conditions, the depth d1, (d1') of the concave portion in the concave/convex diffraction pattern portion 30a1 formed in the upper surface 30a of the aberration correction element 30 is set to be between a depth capable of obtaining an approximately maximum diffraction efficiency with respect to the first laser light L1 and a depth capable of obtaining the approximately maximum diffraction efficiency with respect to the second laser light L2 (section held between the lines P and Q in FIG. 11). Then, a diffraction efficiency of 77% or more is obtained with respect to the first laser light L1 having the wavelength λ1=405 nm, and a diffraction efficiency of 37% or more is obtained with respect to the second laser light L2 having the wavelength λ2=660 nm. That is, it is preferable to set the depth d1, (d1') of a concavity in the concave/convex diffraction pattern portion 30a1 to be the optical path difference equal to the wavelength λ1 of the first laser light L1 in the section held between the lines P and Q in FIG. 11.

Moreover, even in a case where a depth error of about 10 nm is generated at the time of preparation of the above-described concave/convex diffraction pattern portion 30a1, a high diffraction efficiency can be secured in the section held between the lines P and Q in FIG. 11 (a range of a phase difference of 1.687π to 2π with respect to the wavelength λ1).

Furthermore, the concave/convex diffraction pattern portion 30a1 formed in the upper surface 30a of the aberration correction element 30 has a concave/convex structure whose stair number of a stair structure is two and whose step number is one. Therefore, −1st order light is generated symmetrically with the 1st order light of the second laser light L2 or a high-order light thereof is generated, but a diffracted light other than the 1st order light of the second laser light L2 is not formed into an image on the signal surface 2b of the DVD 2, and accordingly there is little influence.

Additionally, in FIG. 11, a depth d1q of the concave portion at a time when the diffraction efficiency of the concave/convex diffraction pattern portion 30a1 is maximized with respect to the 0-order light of the first laser light L1 having the wavelength λ1 is on the line Q. Therefore, when k1=1 is substituted into a period coefficient k1 with respect to the 0-order light of the first laser light L1 in the above-described equation (1), the depth is represented by the following equation (6).

$$d1q = \frac{(\lambda 1)}{(N1) - 1} \quad (6)$$

On the other hand, a depth d1′p of the concave portion at a time when the diffraction efficiency of the concave/convex diffraction pattern portion 30a1 is maximized with respect to the 1st order light of the second laser light L2 having the wavelength λ2 is on the line P. Therefore, when k2=1 is substituted into a period coefficient k2 with respect to the 1st order light of the second laser light L2 in the above-described equation (2), the depth is represented by the following equation (7).

$$d1'p = \frac{1}{2} \times \frac{(\lambda 2)}{(N2) - 1} \quad (7)$$

Here, when a range of the wavelength λ1 of the first laser light L1 is 403 nm or more and 415 nm or less, a range of the wavelength λ2 of the second laser light L2 is 640 nm or more and 660 nm or less, and the respective refractive indexes N1, N2 of the glass material of the aberration correction element 30 with respect to the first and second laser lights L1, L2 at this time are as shown in Table 6 described below, the depths d1q, d1′p of the concave portion in the concave/convex diffraction pattern portion 30a1 capable of obtaining the maximum diffraction efficiency are shown in Table 6.

TABLE 6

| Refractive index N1 | Refractive index N2 | d1q [μm] λ1 = 403 nm | d1q [μm] λ1 = 415 nm | d1′q [μm] λ2 = 640 nm | d1′q [μm] λ2 = 660 nm |
|---|---|---|---|---|---|
| 1.4 | 1.39 | 1.008 | 1.038 | 0.821 | 0.846 |
| 1.5 | 1.49 | 0.806 | 0.830 | 0.653 | 0.673 |
| 1.6 | 1.59 | 0.672 | 0.692 | 0.542 | 0.559 |
| 1.7 | 1.69 | 0.576 | 0.593 | 0.464 | 0.478 |

In the Table 6, for example, when the refractive indexes of the glass material of the aberration correction element 30 are N1=1.4 with respect to the first laser light L1, and N2=1.39 with respect to the second laser light L2, and the depth of the concave portion in the concave/convex diffraction pattern portion 30a1 is d1′p=0.821 μm or more, d1q=1.038 μm or less, the diffraction efficiencies of the first and second laser lights L1, L2 can be well balanced. As apparent also from FIG. 11, changes of the diffraction efficiencies are gentle in the vicinity of d1q, d1′p.

Moreover, when the wavelength λ1 of the first laser light L1 is 403 nm to 415 nm, the wavelength λ2 of the second laser light L2 is 640 nm to 660 nm, and the respective refractive indexes N1, N2 of the glass material of the aberration correction element 30 are as shown in Table 7 with respect to the first and second laser lights L1, L2 at this time, the depths d1′p and d1q are set to maximum widths, and the diffraction efficiency at this time is shown in Table 7 below.

TABLE 7

| Refractive index | Maximum width [μm] d1q and d1′q | 0-order diffraction efficiency of λ1 [%] | | 1st order diffraction efficiency of λ2 [%] | |
|---|---|---|---|---|---|
| | | 403 nm | 415 nm | 640 nm | 660 nm |
| N1 = 1.4 | 0.821 to | 70.2 to | 63.3 to | 33.9 to | 35.6 to |
| N2 = 1.39 | 1.038 | 100.0 | 100.0 | 40.5 | 40.5 |
| N1 = 1.5 | 0.653 to | 68.9 to | 62.0 to | 33.6 to | 35.3 to |
| N2 = 1.49 | 0.830 | 100.0 | 100.0 | 40.5 | 40.5 |
| N1 = 1.6 | 0.542 to | 68.0 to | 61.0 to | 33.4 to | 35.1 to |
| N2 = 1.59 | 0.692 | 100.0 | 100.0 | 40.5 | 40.5 |
| N1 = 1.7 | 0.464 to | 67.7 to | 60.7 to | 33.2 to | 35.0 to |
| N2 = 1.69 | 0.593 | 100.0 | 100.0 | 40.5 | 40.5 |

As apparent from Table 7, when the depth d1, (d1′) of the concave portion in the concave/convex diffraction pattern portion 30a1 of the aberration correction element 30 is set between d1′p and d1q (a range from phase difference 2π to one slightly shorter than 2π with respect to the wavelength λ1), the change is gentle in the vicinity of the maximum diffraction efficiency for both the extra-high density optical disc 1 and the DVD 2. Therefore, the aberration correction element 30 is capable of obtaining a high and good-balance diffraction efficiency for both the first and second laser lights L1, L2. That is, the phase difference between the light passing through a convex portion and the light passing through a concave portion is set to 2π or to be slightly shorter than 2π in the concave/convex diffraction pattern portion 30a1 of the aberration correction element 30.

Next, the application of an aberration correction element 30′ of a modification in which the aperture limiting portion 30b2 for the second laser light formed in the outer circular region of the undersurface 30b of the aberration correction element 30 is removed to achieve partial simplification in the optical pickup device 20A of Embodiment 1 will be described with reference to FIG. 3 described above, and new FIGS. 12A to 14.

Figure 12A:
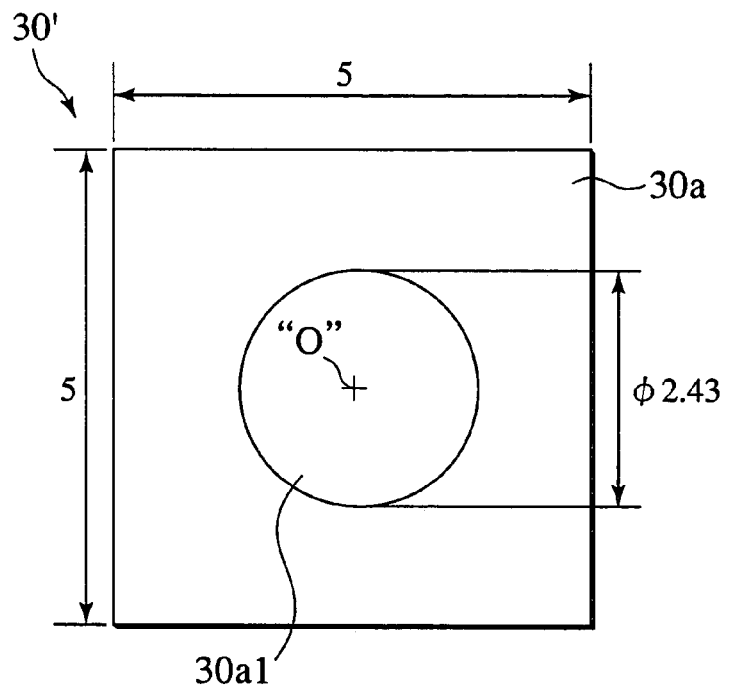
FIGS. 12A to 12C are explanatory views of an aberration correction element as a modification in which the aberration correction element in Embodiment 1 is partially simplified, where
Figure 12B:
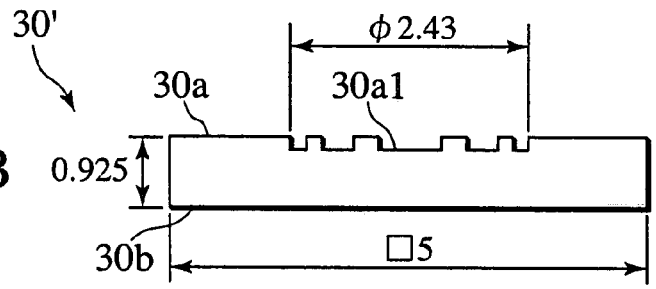
Figure 12C:
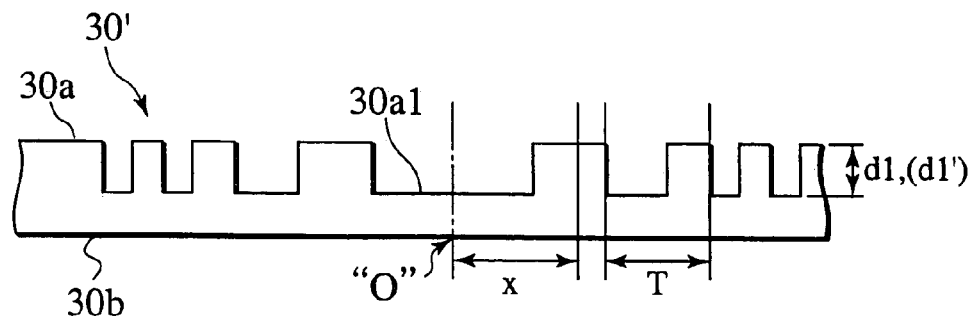
Figure 13:
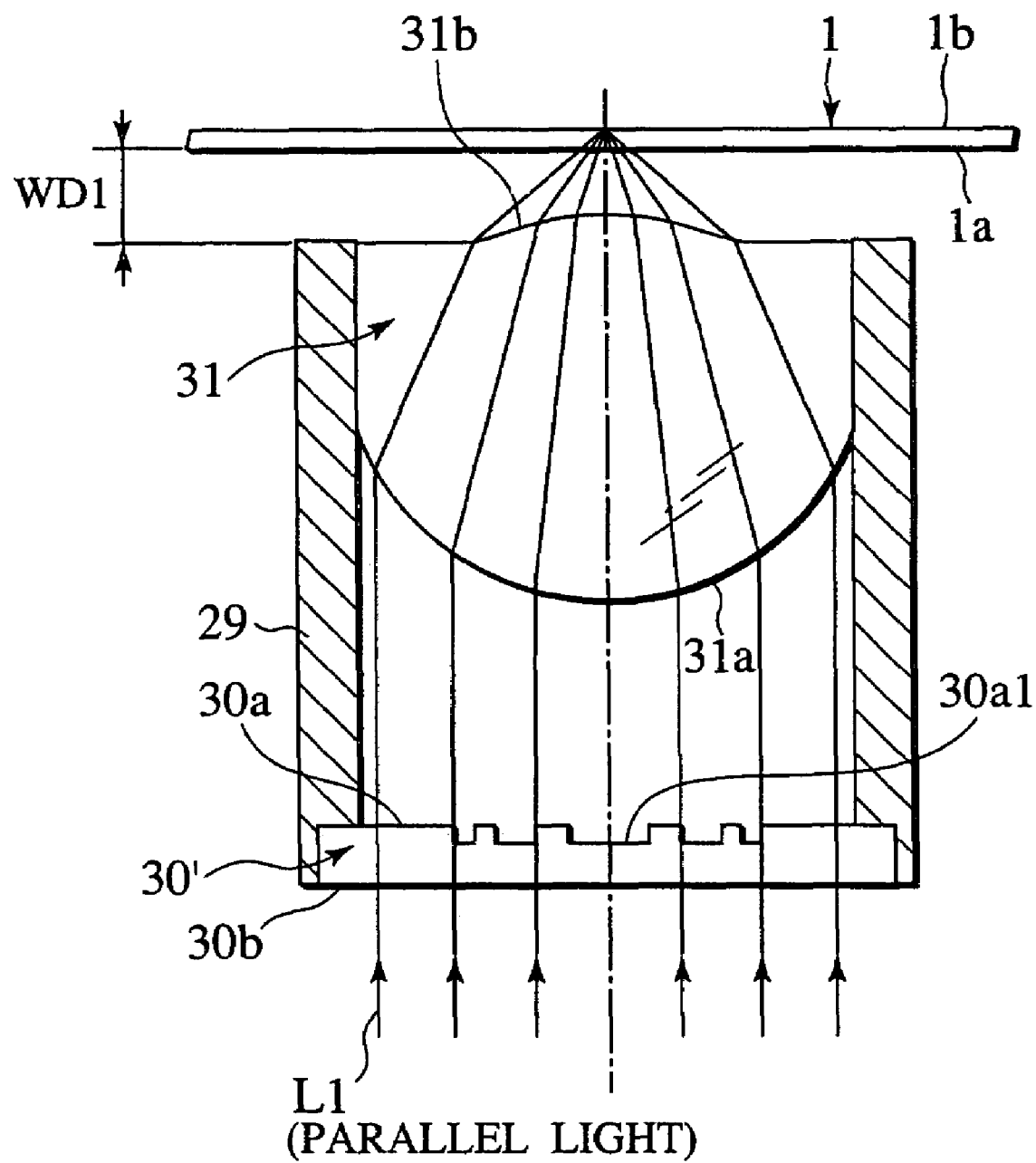
FIG. 13 is a diagram schematically showing a case where the extra-high density optical disc is recorded or reproduced with the aberration correction element as the modification shown in FIGS. 12A to 12C and the objective lens shown in FIG. 8.
Figure 14:
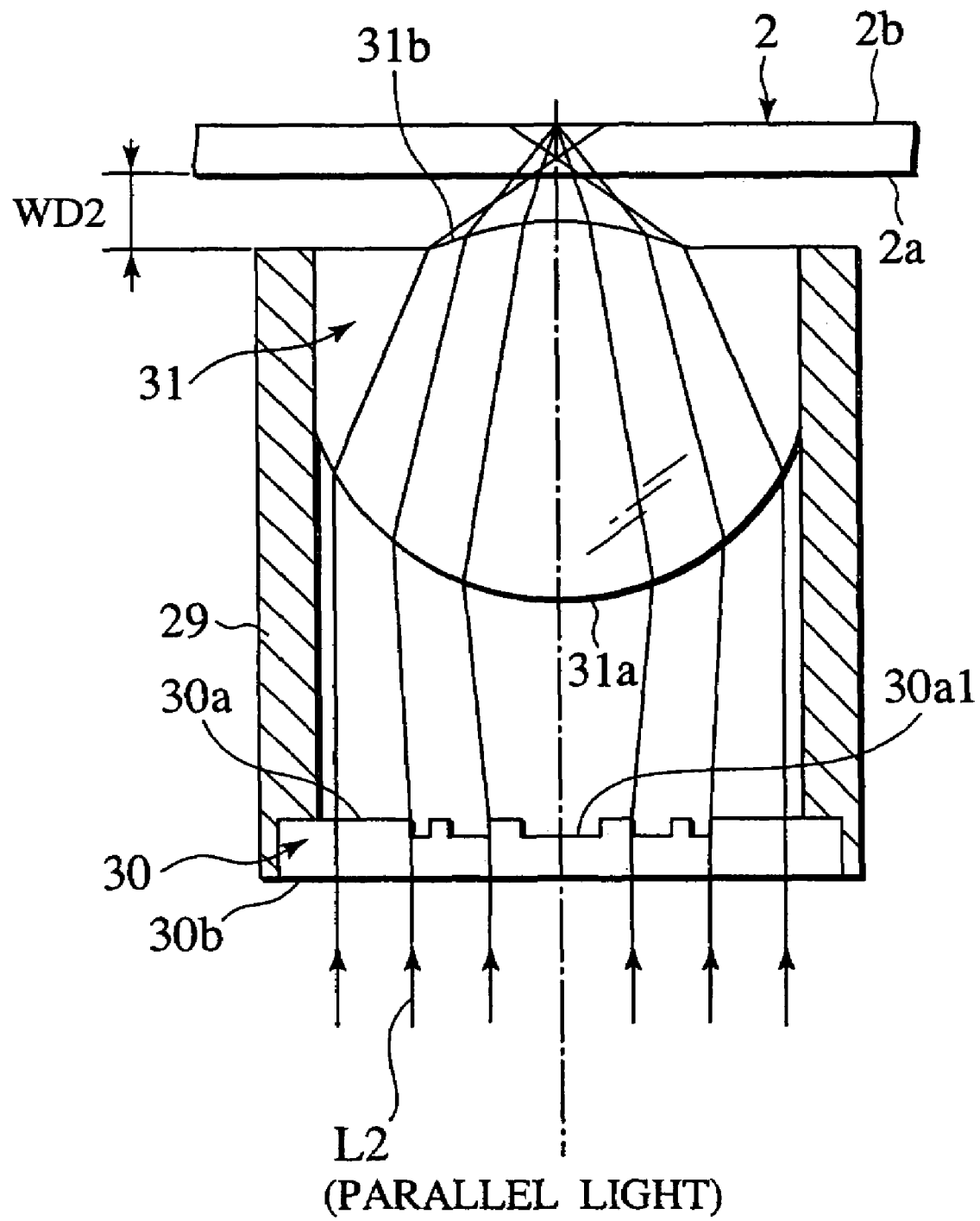
FIG. 14 is a diagram schematically showing a case where the DVD is recorded or reproduced with the aberration correction element as the modification shown in FIGS. 12A to 12C and the objective lens shown in FIG. 8.

FIGS. 12A to 12C are explanatory views of the aberration correction element as a modification in which the aberration correction element in Embodiment 1 is partially simplified, where FIG. 12A is a top plan view, FIG. 12B is a front view, and FIG. 12C is an enlarged view of the concave/convex diffraction pattern portion. FIG. 13 is a diagram schematically showing a case where the extra-high density optical disc is recorded or reproduced with the aberration correction element as the modification shown in FIGS. 12A to 12C and the objective lens shown in FIG. 8. FIG. 14 is a diagram schematically showing a case where the DVD is recorded or reproduced with the aberration correction element as the modification shown in FIGS. 12A to 12C and the objective lens shown in FIG. 8.

In the optical pickup device 20A of Embodiment 1, an aberration correction element 30' replacing the above-described aberration correction element 30 in a modification in which the partial simplification is achieved is stored in the lower part of the lens holder 29 as shown in FIG. 3, and the objective lens 31 is stored in the upper part of the aberration correction element 30'.

That is, as shown in FIGS. 12A and 12B, in the aberration correction element 30' of the partially simplified modification, an outer configuration is formed in a 5 mm square using borosilicate crown glass (BK7) having light-transparency and having a thickness of 0.925 mm in the same manner as in the aberration correction element 30 described with reference to FIGS. 7A and 7B. Moreover, the concave/convex diffraction pattern portion 30a1 is formed in the inner circular region having a diameter of φ2.43 mm centering on the center "O" on the upper surface 30a side facing the objective lens 31 (FIG. 3). Furthermore, the outer circular region adjacent to the inner circular region of the concave/convex diffraction pattern portion 30a1 constitutes the flat upper surface 30a on which any concave/convex diffraction pattern portion is not formed.

Moreover, as enlarged and shown in FIG. 12C, in the concave/convex diffraction pattern portions 30a1 formed in a concave/convex form on the upper surface 30a of the aberration correction element 30, a plurality of annular concave/convex pattern are formed in such a manner that the concave/convex repeating period T is gradually shortened or lengthened toward the outer circular portion from the inner circular portion. The depth d1 of the concave portion in the concave/convex diffraction pattern portion 30a1 having a step number of one is obtained from the above equation (1) so as to prevent the diffraction function from being produced with respect to the 0-order light of the first laser light L1 having the wavelength λ1=405 nm emitted from the blue semiconductor laser 22 (FIG. 3). As a result, the 0-order light of the first laser light L1 is transmitted as such without being diffracted. That is, when the depth d1 of the concave portion in the concave/convex diffraction pattern portion 30a1 is an integer times the phase difference 2π, the 0-order diffraction efficiency is 100%. When the period coefficient k1 with respect to the 0-order light of the first laser light L1 in the equation (1) is 1, the depth d1 of the concave portion in the concave/convex diffraction pattern portion 30a1 formed in the upper surface 30a of the aberration correction element 30' is 0.763 μm.

On the other hand, a respect different from the above-described aberration correction element 30 will be described. Since the undersurface 30b of the aberration correction element 30' of the partially simplified modification is formed to be simply flat, and the aperture limiting portion for the second laser light for limiting the numerical aperture into the objective lens 31 is not formed into any film with respect to the second laser light L2, the aberration correction element 30' of the partially simplified modification can be prepared inexpensively.

Here, as shown in FIG. 13, when the extra-high density optical disc 1 is recorded or reproduced with the aberration correction element 30' and objective lens 31 stored in the lens holder 29, the first laser light L1 having the wavelength λ1=405 nm emitted from the blue semiconductor laser 22 (FIG. 3) is formed in the parallel light in the collimator lens 24 (FIG. 3) in a state in which the working distance WD1 between the second surface 31b of the objective lens 31 and the laser beam incidence surface 1a of the extra-high density optical disc 1 is set to about 0.5 mm. When the parallel light is incident on the undersurface 30b side of the aberration correction element 30', the parallel light of the first laser light L1 is not diffracted by the concave/convex diffraction pattern portion 30a1 formed in the inner circular region of the upper surface 30a, and the 0-order light is transmitted as such and remains to be the parallel light. The parallel light is incident upon the first surface 31a of the objective lens 31.

Moreover, the first laser beam focused by the first and second surfaces 31a, 31b of the objective lens 31 is incident upon the laser beam incidence surface 1a of the extra-high density optical disc 1, and is converged onto the signal surface 1b having a disc substrate thickness of 0.1 mm.

In this case, since any diffraction does not occur with respect to the first laser light L1 having the wavelength λ1=405 nm in the concave/convex diffraction pattern portion 30a1 formed in the upper surface 30a of the aberration correction element 30', any loss is not generated in the quantity of light except the reflection or absorption in the aberration correction element 30'. When the depth d1 of the concave portion in the concave/convex diffraction pattern portion 30a1 is set to 0.763 μm as described above, the diffraction efficiency of the 0-order light is 100%.

Next, as shown in FIG. 14, when the DVD 2 is recorded or reproduced with the aberration correction element 30' and objective lens 31 stored in the lens holder 29 of the modification, the second laser light L2 having the wavelength λ2=660 nm emitted from the red semiconductor laser 23 (FIG. 3) is formed in the parallel light in the collimator lens 39 (FIG. 3) in a state in which the working distance WD2 between the second surface 31b of the objective lens 31 and the laser beam incidence surface 2a of the DVD 2 is set to about 0.35 mm. This parallel light is incident on the undersurface 30b side of the aberration correction element 30'.

Here, parallel light through the outer circular region with φ2.43 mm or more outside the concave/convex diffraction pattern portion 30a1 formed in the inner circular region of the upper surface 30a in the parallel light incident upon the undersurface 30b side of the aberration correction element 30' is transmitted as such through the outer circular region of the flat upper surface 30a on which any concave/convex diffraction pattern portion is not formed. Therefore, an aberration in a peripheral portion on the aberration correction element 30' is large, the wave fronts of the inner and outer circular regions non-continuously change, the continuity of the wave front is not kept, and thus an outer circular region light does not contribute to the formation of the spot on the signal surface 2b. In other words, as described above, the concave/convex diffraction pattern portion 30a1 formed in the inner circular region of the upper surface 30a of the aberration correction element 30' is formed in such a manner that the numerical aperture into the objective lens 31 corresponds to 0.6 with respect to the DVD 2. Therefore, since the parallel light of the outer circular region by the second laser light L2 does not pass through the concave/convex diffraction pattern portion 30a1, the light does not contribute to the formation of the spot in a state in which the numerical aperture into the objective lens 31 is limited with respect to the DVD 2.

On the other hand, for the parallel light incident upon the undersurface 30b side of the aberration correction element 30', only the parallel light of the inner circular region with φ2.43 mm or less inside the concave/convex diffraction pattern portion 30a1 formed in the inner circular region of the upper surface 30a is diffracted by the concave/convex diffraction pattern portion 30a1. The 1st order light as divergent light obtained by the diffraction is incident upon the first surface 31a of the objective lens 31 to correct a spherical aberration thereon.

Moreover, the second laser beam focused by the first and second surfaces 31a, 31b of the objective lens 31 is incident upon the laser beam incidence surface 2a of the DVD 2, and converged onto the signal surface 2b having a disc substrate thickness of 0.6 mm.

In this case, since the objective lens 31 is designed for the extra-high density optical disc, the spherical aberration is large with respect to the second laser light L2 having the wavelength λ2=660 nm emitted from the red semiconductor laser 23 (FIG. 3). However, since the wave front is corrected with respect to the second laser light L2 in the concave/convex diffraction pattern portion 30a1 formed on the upper surface 30a of the aberration correction element 30' to correct the spherical aberration, any trouble is not caused in the recording or reproducing of the DVD 2.

Moreover, also with the use of the aberration correction element 30' of the partially simplified modification, the first laser light L1 for the extra-high density optical disc and the second laser light L2 for the DVD are incident upon the undersurface 30b of the aberration correction element 30' in the form of the parallel lights. Therefore, in the same manner as in the above-described aberration correction element 30, even when the optical axes of the first and second laser lights L1, L2 slightly deviate from the optical axis of the objective lens 31, the deterioration of the spherical aberration is reduced, and it is easy to adjust the optical axis at the time of the assembling of the optical pickup device 20A.

Furthermore, also in the aberration correction element 30' of the partially simplified modification, the depth d1, (d1') of the concave portion in the concave/convex diffraction pattern portion 30a1 formed in the upper surface 30a is set to be between a depth capable of obtaining the approximately maximum diffraction efficiency with respect to the first laser light L1 having the wavelength λ1 of 405 nm and a depth capable of obtaining the approximately maximum diffraction efficiency with respect to the second laser light L2 having the wavelength λ2 of 660 nm in the same manner as described above with reference to FIG. 11. Accordingly, the extra-high density optical disc 1 and DVD 2 can be satisfactorily recorded or reproduced.

Embodiment 2

Figure 15:
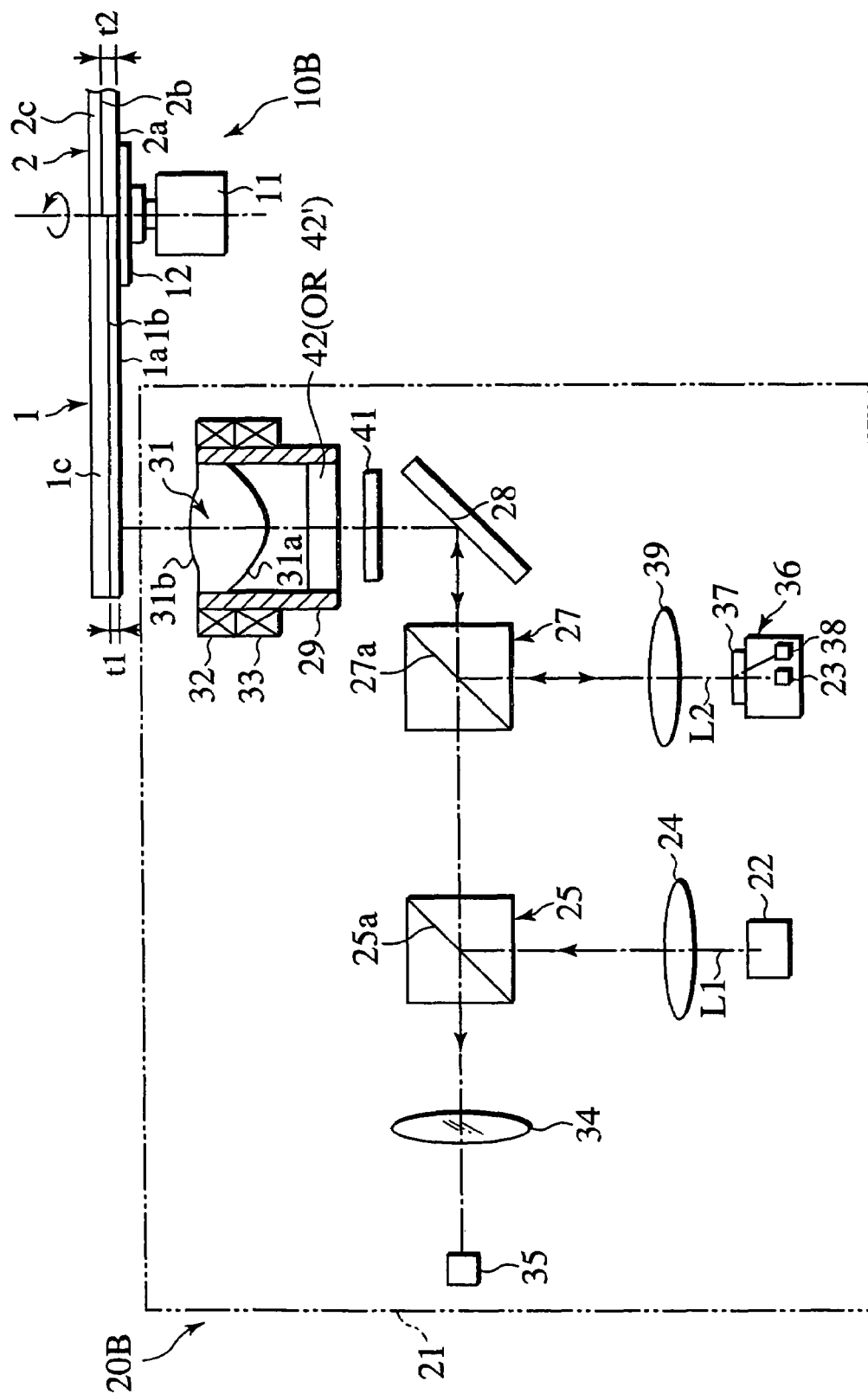
FIG. 15 is a diagram showing the whole constitution of the optical pickup device and optical recording medium driving apparatus of Embodiment 2 of the present invention.
Figure 16A:
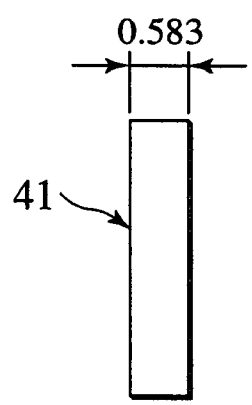
FIGS. 16A and 16B are a side view and front view showing an enlarged phase plate shown in FIG. 15.
Figure 16B:
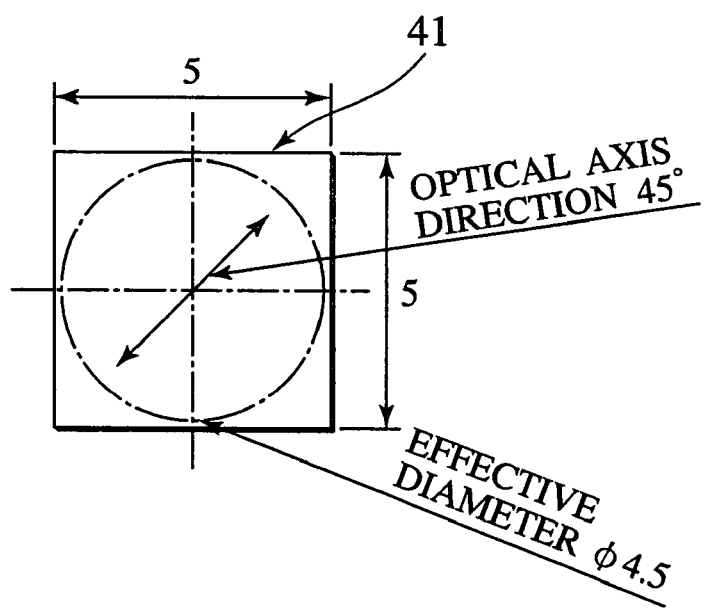
Figure 17A:
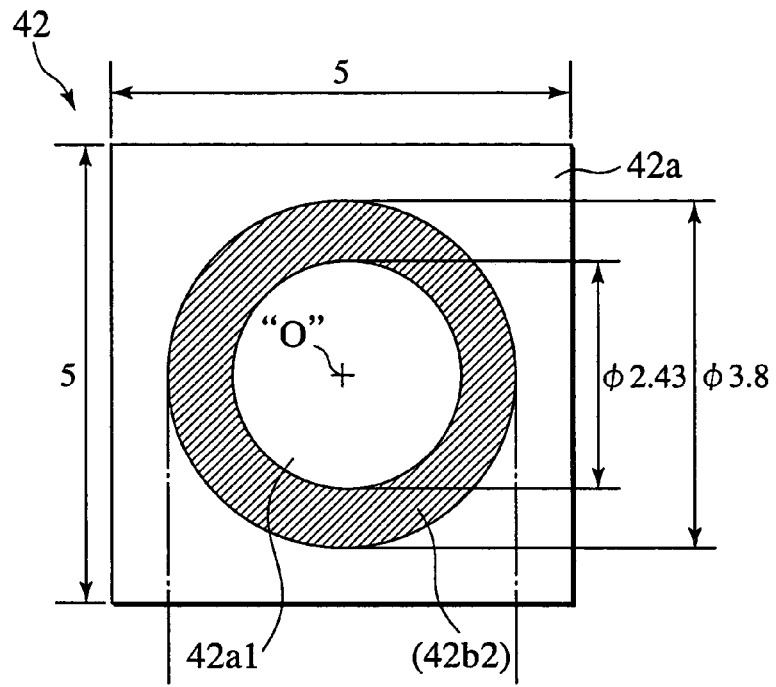
FIGS. 17A to 17C are explanatory views of the aberration correction element in Embodiment 2 shown in FIG. 15, where
Figure 17B:
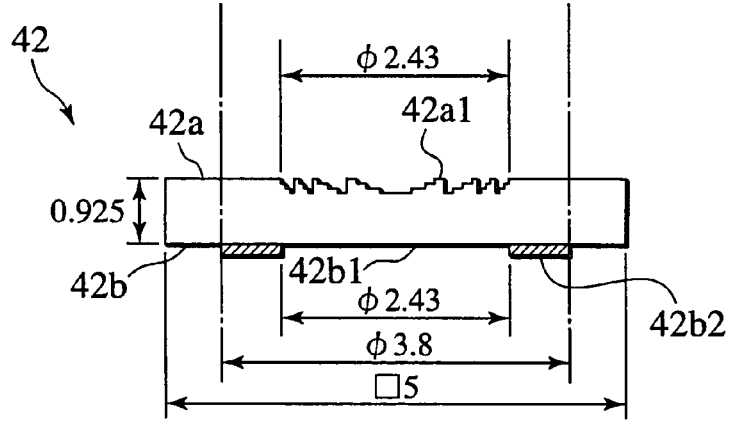
Figure 17C:
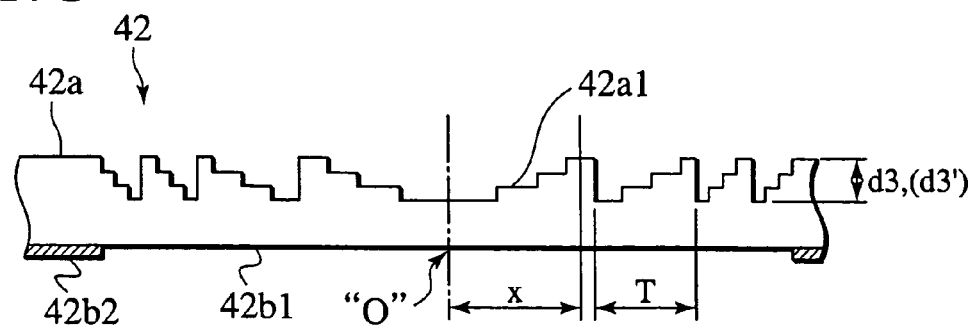

FIG. 15 is a diagram showing the whole constitution of the optical pickup device and optical recording medium driving apparatus of Embodiment 2 according to the present invention. FIGS. 16A and 16B are a side view and front view showing an enlarged phase plate shown in FIG. 15. FIGS. 17A to 17C are explanatory views of the aberration correction element in Embodiment 2 shown in FIG. 15, where FIG. 17A is a top plan view, FIG. 17B is a front view, and FIG. 17C is an enlarged view of a stair-like diffraction pattern portion having a 4-stair structure. FIGS. 18A to 18C are explanatory views of the aberration correction element as a modification in which the aberration correction element in Embodiment 2 is partially simplified, where FIG. 18A is a top plan view, FIG. 18 B is a front view, and FIG. 18C is an enlarged view of the stair-like diffraction pattern portion having the 4-stair structure. FIG. 19 is a diagram showing a relation between each diffraction efficiency at a time at which the first and second laser lights having the wavelengths λ1, λ2 are incident upon the stair-like diffraction pattern portion having the 4-stair structure and a depth of a stair-like concave portion in the stair-like diffraction pattern portion.

An optical pickup device 20B and an optical recording medium driving apparatus (hereinafter referred to as the optical disc driving apparatus) 10B to which this optical pickup device is applied in Embodiment 2 according to the present invention shown in FIG. 15 are different from the optical pickup device 20A and the optical disc driving apparatus 10A to which the optical pickup device is applied in Embodiment 1 according to the present invention described above with reference to FIG. 3 only in the following. That is, the phase plate 26 for the first laser light and the phase plate 40 for the second laser light are deleted, a phase plate 41 for both the first and second laser lights is disposed above the plane mirror 28 instead. Moreover, instead of the concave/convex diffraction pattern portion 30a1 of the aberration correction element 30 in Embodiment 1 (or the aberration correction element 30'), a stair-like diffraction pattern portion 42a1 depressed in a stair form including a 4-stair structure and formed in an annular shape centering on the center "O" in the inner circular region of an aberration correction element 42 (or an aberration correction element 42'). Here, the same constituting members as those of Embodiment 1 are denoted with the same reference numerals and shown in FIG. 15, constituting members different from those of Embodiment 1 are denoted with new reference numerals, and a different respect will be mainly described.

Moreover, in the same manner as in Embodiment 1, the optical pickup device 20B and the optical disc driving apparatus 10B to which the optical pickup device is applied in Embodiment 2 according to the present invention have been developed in such a manner that the extra-high density optical disc 1, the DVD 2 having a recording density lower than that of the extra-high density optical disc 1, and the combined optical recording medium in which the respective signal surfaces 1b, 2b of both the optical discs 1, 2 are combined and integrally stacked are selectively applicable. In this case, the objective lens 31 designed for the extra-high density optical disc has the same specifications as those of Embodiment 1, the description is omitted.

Here, the respect different from Embodiment 1 will be described. Since the phase plate 41 is disposed after the change of the ray direction by 90° in the plane mirror 28, the phase plate is usable in common to the first laser light L1 having the wavelength λ1=405 nm emitted from the blue semiconductor laser 22 and the second laser light L2 having the wavelength λ2=660 nm emitted from the red semiconductor laser 23. Accordingly, disturbances of polarization characteristics of the dichroic prism 27 and plane mirror 28 do not have to be considered, and the number of phase plates can be reduced as compared with Embodiment 1. Additionally, since the phase plate 41 is inserted after the plane mirror 28, phase characteristics have to be maintained for both the wavelengths of the first and second laser lights L1, L2.

In this case, as shown in FIGS. 16A and 16B, an outer configuration of the phase plate 41 is a 5 mm square single plate, an effective diameter which gives a phase difference is φ4.5 mm, the thickness is 0.583 mm, and the optical axis direction is 45°. Moreover, crystal is used in the glass material of the phase plate 41, the refractive index no1 of a normal light having the wavelength λ1 is 1.557067, the refractive index ne1 of an abnormal light is 1.566615, the refractive index no2 of the normal light having the wavelength λ2 is 1.541772, and the refractive index ne2 of the abnormal light is 1.550784. Moreover, with the above-described thicknesses and refractive indexes, the phase plate 41 gives a phase difference of 0.25λ1 with respect to the first laser light L1 having the wavelength λ1=405 nm, whereas the phase plate gives a phase difference of 0.26λ2 with respect to the second laser light L2 having the wavelength λ2=660 nm.

Therefore, the phase plate 41 is a phase plate having an approximately ¼ wavelength with respect to the first laser light L1 having the wavelength λ1=405 nm and the second laser light L2 having the wavelength λ2=660 nm. That is, when the linearly polarized light is incident upon the phase plate 41 with the wavelength λ1, a circularly polarized light is emitted. When the linearly polarized light is incident with the wavelength λ2, a substantially circularly polarized light is emitted. The optical disc driving apparatus 10B (FIG. 15) usable in common to the extra-high density optical disc 1 and the DVD 2 can be realized without any disturbance in the polarization characteristics by only the phase plate 41 which is single plate so that the cost can be reduced.

Next, as shown in FIGS. 17A to 17C, the aberration correction element 42 constituting the main part of Embodiment 2 is similar to the aberration correction element 30 of Embodiment 1 described above with reference to FIGS. 7A to 7C in that the outer configuration is formed in the 5 mm square using borosilicate crown glass (BK7) having light-transparency and having a thickness of 0.925 mm. The stair-like diffraction pattern portion 42a1 whose stair number is four is depressed in a stair concave form with respect to an upper surface 42a, and formed in a ring shape (annular strip shape) in the inner circular region having a diameter φ2.43 mm centering on the center "O" on the upper surface 42a side facing the objective lens 31 (FIG. 15). Moreover, the outer circular region adjacent to the periphery of the stair-like diffraction pattern portion 42a1 forms a flat upper surface 42a on which any stair-like diffraction pattern portion is not formed.

When viewed in a microscopic manner, in the stair-like diffraction pattern portion 42a1 of the aberration correction element 42, the number n of stairs of the stair structure is four, and therefore the number n−1 of steps is three. On the other hand, when viewed in a macroscopic manner, a plurality of pattern portions are formed in the annular shape in such a manner that the repeating period T of the stair-like concave portions is gradually shortened or lengthened toward the outer circular portion from the inner circular portion, and a multistage blade-like (saw teeth-like) diffraction pattern is constituted.

In this case, when the depth of the whole stair-like concave portion in the stair-like diffraction pattern portion 42a1 including the 4-stair structure whose step number is three is determined, it is generally represented by an n-value based on the stair number n of the stair-like diffraction pattern portion 42a1. Then, the depth can be shown by the following equations (8), (9).

That is, in the stair-like diffraction pattern portion whose stair number of the stair structure is n and whose step number is n−1, a depth d(n−1) of the whole stair concave portion in the stair-like diffraction pattern portion with respect to the 0-order light of the first laser light L1 can be obtained from the following equation (8):

$$d(n-1) = (n-1) \times \frac{(\lambda 1)}{(N1)-1} \times (k1), \qquad (8)$$

where n denotes the stair number of the stair-like diffraction pattern portion;

d(n−1) is a depth of the whole stair-like concave portion in the stair-like diffraction pattern portion with respect to the 0-order light of the first laser light L1;

λ1 is a wavelength of the first laser light L1;

N1 is a refractive index of the aberration correction element having an n-stair structure with respect to the first laser light L1; and k1 is a period coefficient with respect to the 0-order light of the first laser light L1 (natural number).

On the other hand, a depth d(n−1)' of the whole stair-like concave portion in the stair-like diffraction pattern portion with respect to the 1st order light of the second laser light L2 can be obtained from the following equation (9).

$$d(n-1)' = \frac{(n-1)}{n} \times \frac{(\lambda 2)}{(N2)-1} \times (k2), \qquad (9)$$

where n is the stair number of the stair-like diffraction pattern portion;

d(n−1)' is a depth of the whole stair-like concave portion of the stair-like diffraction pattern portion with respect to the 1st order light of the second laser light L2;

λ2 is a wavelength of the second laser light L2;

N2 is a refractive index of the aberration correction element of the n-stair structure with respect to the second laser light L2; and k2 is a period coefficient (natural number) with respect to the 1st order light of the second laser light L2.

Moreover, when depths d(4-1), d(4-1)' of the whole stair-like concave portion in the stair-like diffraction pattern portion 42a1 including the 4-stair structure having a step number of three are denoted with d3, d3', the depth of the stair-like concave portion per stair is (d3)/3, (d3)'/3. The depth (d3)/3, (d3)'/3 of the stair-like concave portion per stair is set to be the optical path difference (integer time of twice the phase difference 2λ) corresponding to twice the wavelength λ1 of the first laser light L1 described later. It is to be noted that the depth of the stair-like concave portion per stair is also a dimension of the step per stair.

Furthermore, on an undersurface 42b of the aberration correction element 42, a light-transparent flat portion 42b1 is formed in a circular shape in the inner circular region having a diameter φ2.43 mm or less centering on the center "O" at a portion corresponding to the upper side stair-like diffraction pattern portion 42a1. Moreover, an aperture limiting portion 42b2 for the second laser light is formed in an annular shape using the dichroic film so as to limit the numerical aperture into the objective lens 31 to 0.6 with respect to the second laser light L2 in an outer circular region having a diameter φ2.43 mm or more and φ3.8 mm or less, adjacent to the periphery of the light-transparent flat portion 42b1.

In this case, the aperture limiting portion 42b2 for the second laser light formed on the undersurface 42b of the aberration correction element 42 has characteristics that the first laser light L1 having a wavelength λ1=405 nm±8 nm emitted from the blue semiconductor laser 22 (FIG. 15) is transmitted through the dichroic film having the wavelength selecting property and that the second laser light L2 having a wavelength λ2=660 nm±10 nm emitted from the red semiconductor laser 23 (FIG. 15) is interrupted.

It is to be noted that instead of forming the dichroic film as the aperture limiting portion 42b2 for the second laser light formed on the undersurface 42b of the aberration correction element 42, a concave/convex diffraction pattern having a similar performance and different from the stair-like diffraction pattern portion 42a1 may also be formed in the annular form in the outer circular region.

Furthermore, when the reflection preventive films (not shown) each having a reflectance of 0.5% or less are formed on the upper surface 42a and the undersurface 42b of the aberration correction element 42, a light transmittance is 98% or more.

Therefore, in the aberration correction element 42, the circular light-transparent flat portion 42b1 and the annular aperture limiting portion 42b2 for the second laser light are formed in order toward the outer circular portion from the central portion on the undersurface 42b on the side of the first and second laser light sources 22, 23. Moreover, the stair-like diffraction pattern portion 42a1 including the 4-stair structure is formed on the inner circular region of the upper surface 42a at the objective lens 31 side, and the outer side of this stair-like diffraction pattern portion 42a1 is formed to be flat.

In this case, in the preparation method of the aberration correction element 42, the element can be prepared by repeating the processes of FIGS. 4A to 4C, 5A to 5F, or 6A to 6E described above a plurality of times. For example, when the stair-like diffraction pattern portion 42a1 including the 4-stair structure is prepared using the preparation method of FIGS. 4A to 4C or 5A to 5F, the element can be prepared by repeating the process at least twice.

Moreover, the shape of the stair-like concave portion of the stair-like diffraction pattern portion 42a1 including the 4-stair structure can be calculated by applying the equation (3) described above while replacing x therein with the distance of the radial direction from the center "O" of the stair-like diffraction pattern portion 42a1 and also applying the equations (8), (9) and Table 1.

Furthermore, when borosilicate crown glass (BK7) is used in the glass material of the aberration correction element 42 in the same manner as in Embodiment 1, the refractive index N1 with respect to the first laser light L1 having the wavelength $\lambda 1=405$ nm emitted from the blue semiconductor laser 22 (FIG. 15) is 1.5302, and the refractive index N2 with respect to the second laser light L2 having the wavelength $\lambda 2=660$ nm emitted from the red semiconductor laser 23 (FIG. 15) is 1.5142.

Moreover, when the extra-high density optical disc 1 is recorded or reproduced with the aberration correction element 42, substantially in the same manner as in Embodiment 1 described with reference to FIG. 9, the first laser light L1 having the wavelength $\lambda 1=405$ nm emitted from the blue semiconductor laser 22 (FIG. 15) is formed in the parallel light in the collimator lens 24 (FIG. 15), and the parallel light is incident on the undersurface 42b side. In this case, the parallel light of the first laser light L1 is passed as such through the circular light-transparent flat portion 42b1 and the annular aperture limiting portion 42b2 for the second laser light formed in the inner and outer circular regions of the undersurface 42b. Thereafter, the parallel light of the first laser light L1 is further transmitted as the 0-order light as such without being diffracted in the stair-like diffraction pattern portion 42a1 formed in the inner circular region of the upper surface 42a, and the light remains to be the parallel light, and is incident upon the first surface 31a of the objective lens 31.

On the other hand, when the DVD 2 is recorded or reproduced with the aberration correction element 42, substantially in the same manner as in Embodiment 1 described with reference to FIG. 10, the second laser light L2 having the wavelength $\lambda 2=660$ nm emitted from the red semiconductor laser 23 (FIG. 15) is formed in the parallel light in the collimator lens 39 (FIG. 15). When the parallel light is incident on the undersurface 42b side, the parallel light of the second laser light L2 is interrupted by the annular aperture limiting portion 42b2 for the second laser light formed in the outer circular region of the undersurface 42b, and the aperture is limited so as to set the numerical aperture (NA) into the objective lens 31 to 0.6. Even in this case, after transmitted through the circular light-transparent flat portion 42b1 formed in the inner circular region of the undersurface 42b, the parallel light of the second laser light L2 is diffracted by the stair-like diffraction pattern portion 42a1 formed in the inner circular region of the upper surface 42a. The 1st order light as divergent light obtained by the diffraction is incident upon the first surface 31a of the objective lens 31 to correct a spherical aberration thereon.

It is to be noted that even in Embodiment 2, the aberration correction element 42' shown in FIGS. 18A to 18C may also be used in order to partially simplify the aberration correction element 42. In the aberration correction element 42', the stair-like diffraction pattern portion 42a1 including the 4-stair structure is formed in the upper surface 42a, but the undersurface 42b is formed to be simply flat without forming the aperture limiting portion for the second laser light for limiting the numerical aperture into the objective lens 31 with respect to the second laser light L2.

Therefore, when the extra-high density optical disc 1 is recorded or reproduced by the aberration correction element 42' of the above-described modification, substantially in the same manner as in Embodiment 1 described with reference to FIG. 13, the first laser light L1 having the wavelength $\lambda 1=405$ nm emitted from the blue semiconductor laser 22 (FIG. 15) is formed into the parallel light by the collimator lens 24 (FIG. 15). This parallel light is incident upon the undersurface 42b side and is not diffracted by the stair-like diffraction pattern portion 42a1 formed in the inner circular region of the upper surface 42a, and the 0-order light is transmitted as such. The light remains to be the parallel light, and is incident upon the first surface 31a of the objective lens 31.

On the other hand, when the DVD 2 is recorded or reproduced with the aberration correction element 42, substantially in the same manner as in Embodiment 1 described with reference to FIG. 14, the second laser light L2 having the wavelength $\lambda 2=660$ nm emitted from the red semiconductor laser 23 (FIG. 15) is formed in the parallel light in the collimator lens 39 (FIG. 15), and the parallel light is incident on the undersurface 42b side.

Here, the parallel light of the outer circular region with $\phi 2.43$ mm or more outside the stair-like diffraction pattern portion 42a1 formed in the inner circular region of the upper surface 42a in the parallel light incident upon the undersurface 42b side of the aberration correction element 42' is transmitted as such through the outer circular region of the flat upper surface 42a on which any stair-like diffraction pattern portion is not formed. Therefore, the aberration in a peripheral portion on the aberration correction element 42' is large, the wave fronts of the inner and outer peripheries non-continuously change, the continuity of the wave front is not kept, and thus an outer circular region light does not contribute to the formation of the spot on the signal surface 2b.

On the other hand, for the parallel light incident upon the undersurface 42b side of the aberration correction element 42', only the parallel light of the inner circular region with φ2.43 mm or less inside the stair-like diffraction pattern portion 42a1 formed in the inner circular region of the upper surface 42a is diffracted by the stair-like diffraction pattern portion 42a1. The 1st order light as divergent light obtained by the diffraction is incident upon the first surface 31a of the objective lens 31 to correct a spherical aberration thereon.

It is to be noted that the aberration correction element 42 in Embodiment 2 or the aberration correction element 42' of the modification may also be applied to the optical pickup device 20A (FIG. 3) and the optical disc driving apparatus 10A (FIG. 3) of Embodiment 1 described above.

Here, FIG. 19 shows results of calculation of the diffraction efficiency of the 0-order light of the macro structure at a time when the first laser light L1 having the wavelength λ1=405 nm for the extra-high density optical disc is incident, and the diffraction efficiency of the 1st order light at a time when the second laser light L2 having the wavelength λ2=660 nm for the DVD is incident on the aberration correction element 42 in Embodiment 2 or the aberration correction element 42' of the modification in the above-described equation (5) in which T is changed to the period of the stair-like concave portion in the stair-like diffraction pattern portion 42a1.

When viewed in the macroscopic manner as described above, the stair-like diffraction pattern portion 42a1 is constituted by the multistage blade-like diffraction pattern in the aberration correction elements 42, 42' including the 4-stair structure. In this case, unless the structure is clarified in the description of the diffraction structure, it becomes complicated. In the following, the diffraction order and diffraction efficiency of the macro structure will be described.

It is to be noted that in a case where the depth (d3)/3, (d3)'/3 of the stair-like concave portion per stair is an optical path difference twice the wavelength λ1 of the first laser light L1 in the stair-like diffraction pattern portion 42a1 including the 4-stair structure having a step number is three, the wave fronts of a secondary diffracted light having the wavelength λ1 are connected to form a plane wave. However, emitted wave fronts are parallel, considering the macro structure. In the following description, a case where the depth (d3)/3, (d3)'/3 of the stair-like concave portion per stair corresponds to be twice the wavelength λ1 of the first laser light L1 is supposed as the macro structure, and this secondary diffracted light is represented as a 0-order diffracted light.

Here, from FIG. 19, when a depth d3 of the whole stair-like concave portion in the stair-like diffraction pattern portion 42a1 including the 4-stair structure is minimum, and a diffraction efficiency of 100% is obtained with respect to the 0-order light of the first laser light L1 having the wavelength λ1=405 nm, the depth d3 of the whole stair-like concave portion is 2.289 μm on a line U in FIG. 19. Accordingly, the depth (d3)/3 per stair is 0.763 μm, and is equal to the optical path difference corresponding to the wavelength λ1 of the first laser light L1. However, at this time, the diffraction efficiency with respect to the 1st order light of the second laser light L2 having the wavelength λ2=660 nm is 5.6% and is remarkably low. Thus, when the depth d3 of the whole stair-like concave portion is around 2.289 μm, the diffraction efficiency of the 1st order light of the second laser light is low, and even the playback of the DVD 2 is impossible.

Then, the diffraction efficiency of 100% is obtained with respect to the 0-order light of the first laser light L1 having the wavelength λ1=405 nm, and the next largest depth d3 of the whole stair-like concave portion in the stair-like diffraction pattern portion 42a1 including the 4-stair structure is d3z=4.578 μm on a line V in FIG. 19. At this time, the diffraction efficiency of the 1st order light of the second laser light L2 having the wavelength λ2=660 nm is 67.1%. As compared with Embodiment 1, it can be said that the diffraction efficiency of the 1st order light of the second laser light L2 having the wavelength λ2 is enhanced. When T is replaced with the period of the stair-like concave portions in the stair-like diffraction pattern portion 42a1 in the above-described equation (5), the maximum diffraction efficiency with respect to the 1st order light of the second laser light L2 having the wavelength λ2 is 81.1% , and therefore there is further room for improvement.

Moreover, when the depth d3 of the whole stair-like concave portion in the stair-like diffraction pattern portion 42a1 including the 4-stair structure is 4.578 μm with respect to the 0-order light of the first laser light L1, the depth (d3)/3 of the stair-like concave portion per stair is 1.526 μm, and is therefore equal to the optical path difference corresponding to twice the wavelength λ1 of the first laser light L1. In this case, the phase difference corresponds to twice the wavelength λ1 of the first laser light L1 with respect to the micro structure, the secondary diffracted light forms a plane wave, and the 0-order diffraction efficiency of the macro structure is 100%.

In the above description, conditions on which the diffraction efficiency of the 1st order light is substantially maximized with respect to the second laser light L2 having the wavelength λ2=660 nm for the DVD are determined. As a result, a depth d3' of the whole stair-like concave portion in the stair-like diffraction pattern portion 42a1 including the 4-stair structure is 4.776 μm on a line W in FIG. 18, and the maximum diffraction efficiency of the 1st order light with respect to the second laser light L2 is 80.7%. On the other hand, when the depth d3' is 4.776 μm, the diffraction efficiency of the 0-order light with respect to the first laser light L1 having the wavelength λ1=405 nm for the extra-high density optical disc is 70%.

Therefore, when the depth d3, (d3') of the whole stair-like concave portion in the stair-like diffraction pattern portion 42a1 including the 4-stair structure is designed to be slightly smaller than 4.776 μm, a balance between the diffraction efficiency of the 0-order light of the first laser light L1 having the wavelength λ1 and that of the 1st order light of the second laser light L2 having the wavelength λ2 becomes better. Accordingly, the depth d3, (d3') of the whole stair-like concave portion in the stair-like diffraction pattern portion 42a1 including the 4-stair structure is in a section between the depth capable of obtaining substantially the maximum diffraction efficiency with respect to the first laser light L1 and that capable of obtaining substantially the maximum diffraction efficiency with respect to the second laser light L2. In this section, the diffraction efficiency obtained with respect to the first laser light having the wavelength λ1=405 nm is set to 80% or more, and the diffraction efficiency obtained with respect to the second laser light having the wavelength λ2=660 nm is set to 67% or more. Then, a section corresponding to the above-described section is held between the lines V and W in FIG. 19.

From the above description, in the stair-like diffraction pattern portion 42a1 including the 4-stair structure, the depth (d3)/3 per stair is set to be the optical path difference corresponding to twice the wavelength λ1 of the first laser light L1 when viewed in the microscopic manner. Further, a structure similar to the multistage blade is employed so that a high efficiency is obtained with the wavelength λ2 of the second laser light L2 when viewed in the macroscopic manner.

In this case, since the stair-like diffraction pattern portion 42a1 of the aberration correction element 42, 42' includes the 4-stair structure, unlike the 2-stair structure of Embodiment 1, the 1st order light of the second laser light L2 is not symmetric with the −1st order light, the efficiency of the −1st order light is low, the efficiency of a high-order diffracted light is also low, and there is further little unnecessary light. Needless to say, since the diffracted light other than the 1st order light of the second laser light L2 is not formed into any image on the signal surface 2b of the DVD 2, there is not any influence.

It is to be noted that it is theoretically possible to further increase the depth d3, (d3') of the whole stair-like concave portion in the stair-like diffraction pattern portion 42a1 including the 4-stair structure so that the well-balanced diffraction efficiency of the extra-high density optical disc 1 and the DVD 2 is obtained in the aberration correction element 42, 42'. However, since the preparation method of the aberration correction element by FIGS. 4A to 4C, 5A to 5F, or 6A to 6E is employed, the depth d3, (d3') of the whole stair-like concave portion is preferably 6 µm or less.

Moreover, FIG. 19 shows an example of the diffraction efficiency at a time when the stair number n of stairs of the stair-like diffraction pattern portion 42a1 comprises four values. In the stair-like diffraction pattern portion 42a1 including the 4-stair structure, a depth d3v (depth in which the 0-order diffraction efficiency is maximized at λ1) of the whole stair-like concave portion on the line V is represented by the following equation (10). In this case, the stair number n is 4 in the above-described equation (8), and the period coefficient k1 with respect to the 0-order light of the first laser light L1 is 2 on the line V. These values are substituted into the equation (8) to constitute the following equation (10).

$$d3v = \frac{3 \times (\lambda 1)}{(N1) - 1} \times 2 \quad (10)$$

On the other hand, in the stair-like diffraction pattern portion 42a1 including the 4-stair structure, a depth d3'w of the whole stair-like concave portion on the line W is represented by the following equation (11). In this case, the stair number n is 4 in the above-described equation (9), and the period coefficient k2 with respect to the 1st order light of the second laser light L2 is 5 on the line W, and these values are substituted into the equation (9) to constitute the following equation (11).

$$d3'w = \frac{3 \times (\lambda 2)}{4 \times \{(N2) - 1\}} \times 5 \quad (11)$$

In this case, when the range of the wavelength λ1 of the first laser light L1 is 403 nm or more and 415 nm or less, the range of the wavelength λ2 of the second laser light L2 is 640 nm or more and 660 nm or less, and the respective refractive indexes N1, N2 of the glass material of the aberration correction element 42 with respect to the first and second laser lights L1, L2 at this time are as shown in Table 8 described below, the depths d3v, d3'w of the whole stair-like concave portions on the lines V, W capable of obtaining the maximum diffraction efficiency are shown in Table 8.

TABLE 8

| | | d3v [µm] | | d3'w [µm] | |
| --- | --- | --- | --- | --- | --- |
| Refractive index N1 | Refractive index N2 | λ1 = 403 nm | λ1 = 415 nm | λ2 = 640 nm | λ2 = 660 nm |
| 1.4 | 1.39 | 6.045 | 6.225 | 6.153 | 6.346 |
| 1.5 | 1.49 | 4.836 | 4.980 | 4.898 | 5.051 |
| 1.6 | 1.59 | 4.030 | 4.150 | 4.067 | 4.195 |
| 1.7 | 1.69 | 3.454 | 3.557 | 3.478 | 3.587 |

In the Table 8, for example, when the refractive indexes of the glass materials of the aberration correction elements 42, 42' are N1=1.5 with respect to the first laser light L1, and N2=1.49 with respect to the second laser light L2, and the depth of the stair-like concave portion in the stair-like diffraction pattern portion 42a1 is d3v=4.836 µm or more, d3'w=5.051 µm or less, the diffraction efficiencies can be well balanced. As apparent also from FIG. 19, the changes of the diffraction efficiencies are gentle in the vicinity of d3v, d3'w.

Moreover, in the respective refractive indexes N1, N2 in Table 8, when the wavelength λ1 of the first laser light L1 is 403 nm to 415 nm, the wavelength λ2 of the second laser light L2 is 640 nm to 660 nm, and the respective refractive indexes N1, N2 of the glass materials of the aberration correction elements 42, 42' with respect to the first and second laser lights L1, L2 at this time are as shown in Table 9 described below, the depths d3v, d3'w are set to the maximum widths, and the diffraction efficiencies at this time are shown in Table 9.

TABLE 9

| | | 0-order diffraction efficiency of λ1 [%] | | 1st order diffraction efficiency of λ2 [%] | |
| --- | --- | --- | --- | --- | --- |
| Refractive index | Maximum width [µm] of depths d3v and d3'w | 403 nm | 415 nm | 640 nm | 660 nm |
| N1 = 1.4 | 6.045 to | 60.2 to | 84.4 to | 75.1 to | 67.9 to |
| N2 = 1.39 | 6.346 | 100.0 | 100.0 | 81.1 | 81.1 |
| N1 = 1.5 | 4.836 to | 67.1 to | 84.8 to | 75.1 to | 70.3 to |
| N2 = 1.49 | 5.0510 | 100.0 | 100.0 | 81.1 | 81.1 |
| N1 = 1.6 | 4.030 to | 71.4 to | 84.8 to | 75.1 to | 71.8 to |
| N2 = 1.59 | 4.195 | 100.0 | 100.0 | 81.1 | 81.1 |
| N1 = 1.7 | 3.454 to | 74.4 to | 84.7 to | 75.1 to | 72.8 to |
| N2 = 1.69 | 3.587 | 100.0 | 100.0 | 81.1 | 81.1 |

As apparent from Table 9, when the depth d3, (d3') of the whole stair-like concave portion in the stair-like diffraction pattern portion 42a1 including the 4-stair structure is set between d3v and d3'w in the wavelength range, the change is gentle in the vicinity of the maximum diffraction efficiency for both the extra-high density optical disc 1 and the DVD 2. Therefore, the high and good-balance diffraction efficiency can be obtained.

Especially, since the glass material having the high refractive index is used in the aberration correction element 42, 42', the high efficiency is obtained for both the extra-high density optical disc 1 and the DVD 2.

Embodiment 3

Figure 20A:
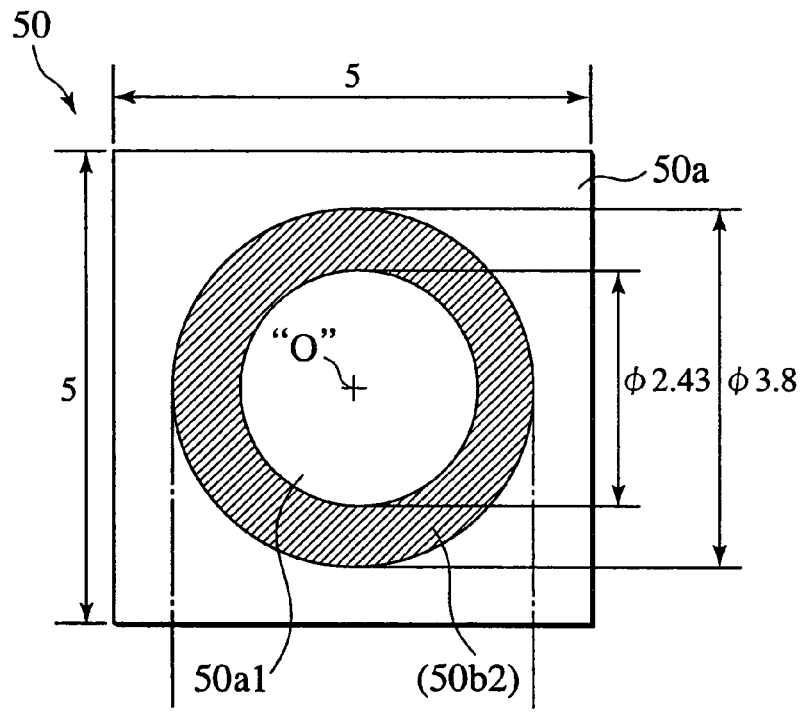
FIGS. 20A to 20C are explanatory views of the aberration correction element in Embodiment 3, where
Figure 20B:
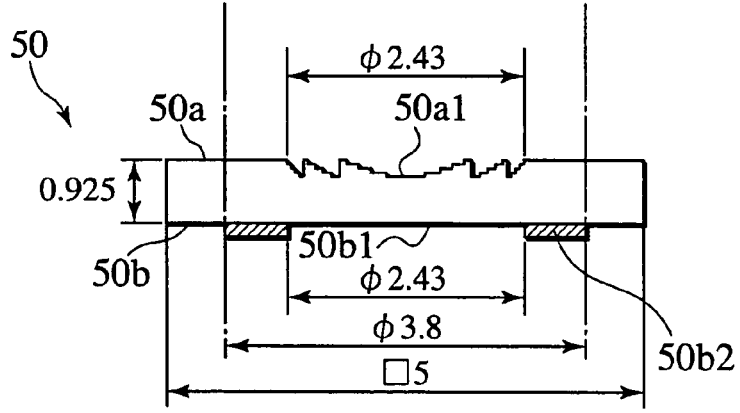
Figure 20C:
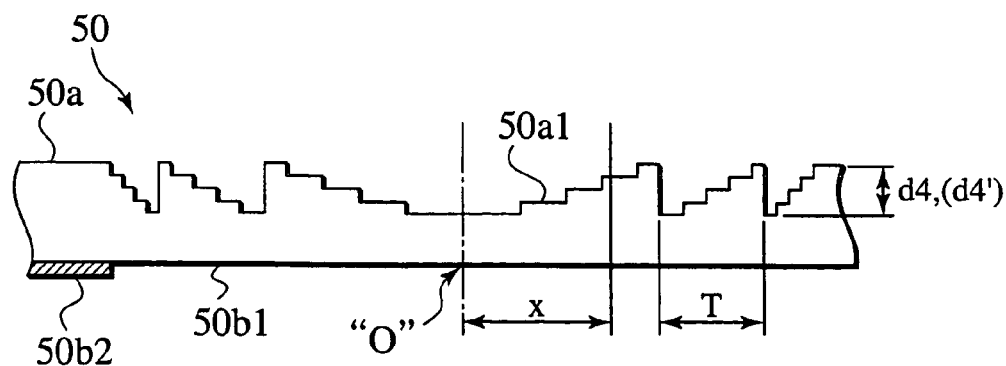

FIGS. 20A to 20C are explanatory views of the aberration correction element in Embodiment 3, where FIG. 20A is a top plan view, FIG. 20B is a front view, and FIG. 20C is an enlarged view of the stair-like diffraction pattern portion including a 5-stair structure. FIGS. 21A to 21C are explanatory views of the aberration correction element of a modification in which the aberration correction element in Embodiment 3 is partially simplified, where FIG. 21A is a top plan view, FIG. 21B is a front view, and FIG. 21C is an enlarged view of the stair-like diffraction pattern portion including the 5-stair structure. FIG. 22 is a diagram showing a relation between each diffraction efficiency at a time at which the first and second laser lights having the wavelengths $\lambda 1$, $\lambda 2$ are incident upon the stair-like diffraction pattern portion having the 5-stair structure and the depth of the whole stair-like concave portion in the stair-like diffraction pattern portion.

In Embodiment 3, since the structures of the optical pickup device and optical recording medium driving apparatus except an aberration correction element 50 shown in FIGS. 20A to 20C and an aberration correction element 50' of a modification shown in FIGS. 21A to 21C are the same as those of Embodiment 1 or 2, the detailed description is omitted. These aberration correction elements 50, 50' are also applicable to optical pickup device 20A and optical disc driving apparatus 10A of Embodiment 1 or the optical pickup device 20B and optical disc driving apparatus 10B of Embodiment 2.

As shown in FIGS. 20A to 20C, the aberration correction element 50 constituting the main part of Embodiment 3 is similar to the aberration correction elements 30, 42 of Embodiments 1, 2 described above with reference to FIGS. 7A to 7C, 17A to 17C in that the outer configuration is formed in the 5 mm square using borosilicate crown glass (BK7) having light-transparency and having a thickness of 0.925 mm. The respects different from the aberration correction elements 30, 42 of Embodiments 1, 2 will be described. A stair-like diffraction pattern portion 50a1 whose stair number is five is depressed in a stair concave form with respect to an upper surface 50a, and formed in a ring shape (annular strip shape) in the inner circular region having a diameter $\phi 2.43$ mm centering on the center "O" on the upper surface 50a side facing the objective lens 31 (FIGS. 3, 15). Moreover, the outer circular region adjacent to the periphery of the stair-like diffraction pattern portion 50a1 forms a flat upper surface 50a on which any stair-like diffraction pattern portion is not formed.

When viewed in the microscopic manner, in the stair-like diffraction pattern portion 50a1 of the aberration correction element 50, the number n of stairs of the stair structure is five, and therefore the number n−1 of steps is four. On the other hand, when viewed in the macroscopic manner, a plurality of pattern portions are formed in the annular shape in such a manner that the repeating period T of the stair-like concave portions is gradually shortened or lengthened toward the outer circular portion from the inner circular portion, and the multistage blade-like (saw teeth-like) diffraction pattern is constituted.

In this case, when the depth of the whole stair-like concave portion in the stair-like diffraction pattern portion 50a1 including the 5-stair structure whose step number is four is determined, it also can be shown by the above-described equations (8) and (9). Then, a depth d4 of the whole stair-like concave portion in the stair-like diffraction pattern portion 50a1 with respect to the 0-order light of the first laser light L1, and a depth d4' of the whole stair-like concave portion in the stair-like diffraction pattern portion 50a1 with respect to the 1st order light of the second laser light L2 can be obtained.

Moreover, assuming that the depth of the whole stair-like concave portion in the stair-like diffraction pattern portion 50a1 including the 5-stair structure having a step number of four is d4, d4', the depth of the stair-like concave portion per stair is (d4)/4, (d4)'/4. The depth (d4)/4, (d4)'/4 of the stair-like concave portion per stair is set to be the optical path difference corresponding to twice the wavelength $\lambda 1$ of the first laser light L1 described later.

Furthermore, on an undersurface 50b of the aberration correction element 50, a light-transparent flat portion 50b1 is formed in the circular shape in the inner circular region having a diameter $\phi 2.43$ mm or less centering on the center "O" at a portion corresponding to the upper side stair-like diffraction pattern portion 50a1. Moreover, an aperture limiting portion 50b2 for the second laser light is formed in an annular shape using the dichroic film so as to limit the numerical aperture into the objective lens 31 to 0.6 with respect to the second laser light L2 in an outer circular region having a diameter $\phi 2.43$ mm or more and $\phi 3.8$ mm or less, adjacent to the periphery of the light-transparent flat portion 50b1.

It is to be noted that even in Embodiment 3, the aberration correction element 50' shown in FIGS. 21A to 21C may also be used in order to partially simplify the aberration correction element 50. In the aberration correction element 50', the stair-like diffraction pattern portion 50a1 including the 5-stair structure is formed in the upper surface 50a, but the undersurface 50b is formed to be simply flat without forming the aperture limiting portion for the second laser light for limiting the numerical aperture into the objective lens 31 with respect to the second laser light L2.

In this case, in the preparation method of the aberration correction elements 50, 50', the elements can be prepared by repeating the processes of FIGS. 4A to 4C, 5A to 5F, or 6A to 6E described above a plurality of times. For example, when the stair-like diffraction pattern portion 50a1 including the 5-stair structure is prepared using the preparation method of FIGS. 4A to 4C or 5A to 5F, the element can be prepared by repeating the process at least three times.

Furthermore, the shape of the stair-like concave portion of the stair-like diffraction pattern portion 50a1 including the 5-stair structure can be calculated by applying the equation (3) described above while replacing x therein with the distance of the radial direction from the center "O" of the stair-like diffraction pattern portion 50a1 and also applying the equations (8), (9) and Table 1.

Moreover, since the operation of the above-described aberration correction element 50, 50' is the same as that of the aberration correction element 42, 42' described above in Embodiment 2, the description is omitted here.

Here, FIG. 22 shows the results of calculation of the diffraction efficiency of the 0-order light of the macro structure at a time when the first laser light L1 having the wavelength $\lambda 1 = 405$ nm for the extra-high density optical disc is incident, and the diffraction efficiency of the 1st order light at a time when the second laser light L2 having the wavelength $\lambda 2 = 660$ nm for the DVD is incident on the aberration correction element 50 in Embodiment 3 or the aberration correction element 50' of the modification in the above-described equation (5) in which T is changed to the period of the stair-like concave portion in the stair-like diffraction pattern portion 50a1.

The aberration correction element 50 including the 5-stair structure or the aberration correction element 50' of the modification comprises the multistage blade-like diffraction pattern when seen in the macroscopic manner as described above. In the following description, the diffraction order and efficiency of the macro structure will be described. Therefore, in the same manner as in the 4-stair structure of Embodiment 2, when the depth (d4)/4, (d4)'/4 of the stair-like concave portion per stair is the optical path difference corresponding to twice the wavelength λ1 of the first laser light L1 in the stair-like diffraction pattern portion 50a1 of the 5-stair structure having a step number of four, the wave fronts of the secondary diffracted light having the wavelength λ1 are connected to form the plane wave. However, the emitted wave fronts are parallel, considering the macro structure. In the following description, a case where the depth (d4)/4, (d4)'/4 of the stair-like concave portion per stair corresponds to be substantially twice the wavelength λ1 of the first laser light L1 is supposed as the macro structure, and this secondary diffracted light is represented as the 0-order diffracted light.

Here, from FIG. 22, when a depth d4 of the whole stair-like concave portion in the stair-like diffraction pattern portion 50a1 including the 5-stair structure is minimum, and a diffraction efficiency of 100% is obtained with respect to the 0-order light of the first laser light L1 having the wavelength λ1=405 nm, the depth d4 of the whole stair-like concave portion is 3.06 μm on a line Y in FIG. 22. Accordingly, the depth (d4)/4 per stair is 0.765 μm, and is equal to the optical path difference corresponding to the wavelength λ1 of the first laser light L1. However, at this time, the diffraction efficiency with respect to the 1st order light of the second laser light L2 having the wavelength λ2=660 nm is 0% and is remarkably low. Thus, when the depth d4 of the whole stair-like concave portion is around 3.06 μm, the diffraction efficiency of the 1st order light of the second laser light is low, and even the playback of the DVD 2 is impossible.

Then, the diffraction efficiency of 100% is obtained with respect to the 0-order light of the first laser light L1 having the wavelength λ1=405 nm, and the next largest depth d4 of the whole stair-like concave portion in the stair-like diffraction pattern portion 50a1 including the 5-stair structure is d4z=6.12 μm on a line Z in FIG. 22. At this time, the diffraction efficiency of the 1st order light of the second laser light L2 having the wavelength λ2=660 nm is 87.1%. As compared with Embodiment 2 described above, the diffraction efficiency of the 1st order light of the second laser light L2 is enhanced. When T is replaced with the period of the stair-like concave portions in the stair-like diffraction pattern portion 50a1 in the above-described equation (5), the maximum diffraction efficiency with respect to the 1st order light of the second laser light L2 having the wavelength λ2 is 87.5%. Therefore, substantially the maximum diffraction efficiency of the 1st order light having the wavelength λ2 can also be obtained in the vicinity of the above-described depth d4z=6.12 μm (vicinity of the line Z).

Moreover, when the depth d4 (=d4z) of the whole stair-like concave portion in the stair-like diffraction pattern portion 50a1 including the 5-stair structure is 6.12 μm with respect to the 0-order light of the first laser light L1, the depth (d4)/4 of the stair-like concave portion per stair is 1.53 μm, and is therefore substantially equal to the optical path difference corresponding to twice the wavelength λ1 of the first laser light L1. In this case, the phase difference corresponds to twice the wavelength λ1 of the first laser light L1 with respect to the micro structure, the secondary diffracted light forms a plane wave, and the 0-order diffraction efficiency of the macro structure is 100%.

FIG. 22 shows an example of the diffraction efficiency at a time when the stair number n of stairs of the stair-like diffraction pattern portion 50a1 comprises five values. In the stair-like diffraction pattern portion 50a1 including the 5-stair structure, a depth d4z of the whole stair-like concave portion on the line Z is represented by the following equation (12). In this case, the stair number n is 5 in the above-described equation (8), the period coefficient k1 with respect to the 0-order light of the first laser light L1 is 2 on the line Z, and these values are substituted into the equation (8) to constitute the following equation (12).

$$d4e = \frac{4 \times (\lambda 1)}{(NI) - 1} \times 2 \quad (12)$$

From the above description, in the stair-like diffraction pattern portion 50a1 including the 5-stair structure, the depth (d4)/4 per stair is set to be the optical path difference corresponding to twice the wavelength λ1 of the first laser light L1 when viewed in the microscopic manner. Further, a structure similar to the multistage blade is employed so that a high efficiency is obtained with the wavelength λ2 of the second laser light L2 when viewed in the macroscopic manner. Here, in the case of this 5-stair structure, when the depth (d4)/4 per stair is the optical path difference corresponding to twice the wavelength λ1 of the first laser light L1, the diffraction efficiency of the 1st order light of the second laser light L2 having the wavelength λ2 is also substantially maximized. Therefore, the balance between the 0-order light having the wavelength λ1 and the 1st order light having the wavelength λ2 does not have to be considered as in Embodiments 1, 2.

Furthermore, since the aberration correction element 50, 50' includes the 5-stair structure, unlike the 2-stair structure of Embodiment 1, the 1st order light of the second laser light L2 is not symmetric with the −1st order light, the efficiency of the −1st order light is low, the efficiency of a high-order diffracted light is also low, and there is further little unnecessary light. Needless to say, since the diffracted light other than the 1st order light of the second laser light L2 is not formed into any image on the signal surface 2b of the DVD 2, there is not any influence.

Embodiment 4

Figure 23A:
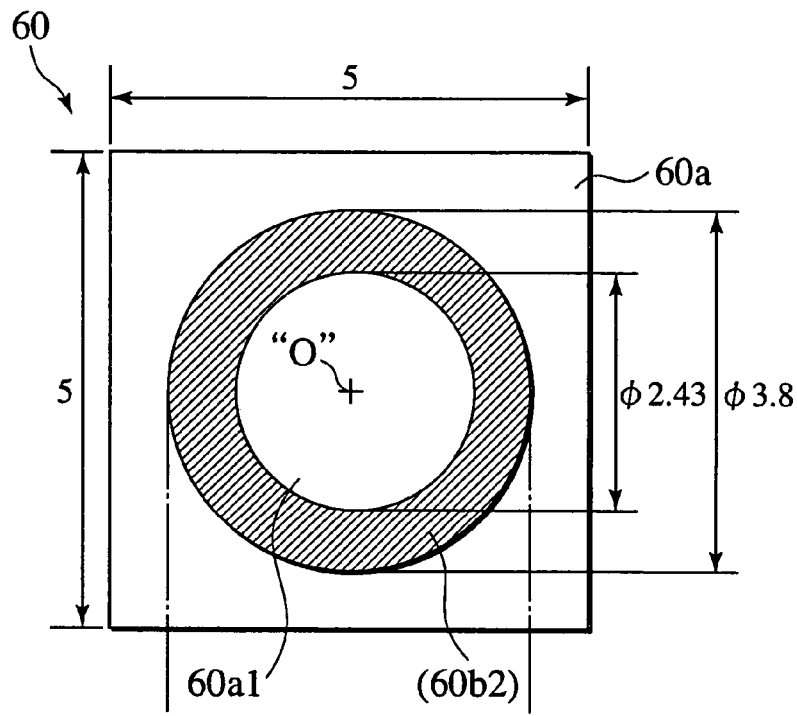
FIGS. 23A to 23C are explanatory views of the aberration correction element in Embodiment 4, where
Figure 23B:
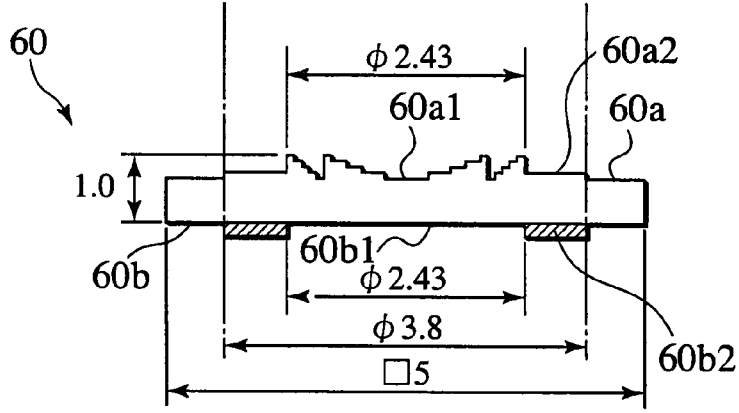
Figure 23C:
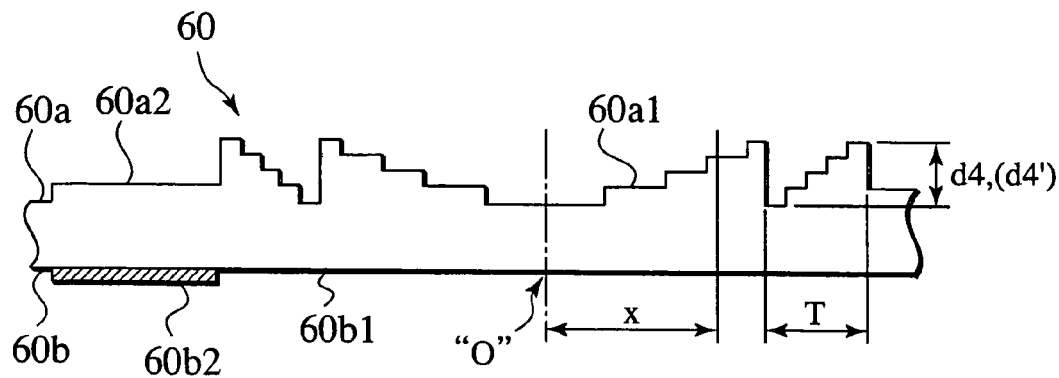
Figure 24A:
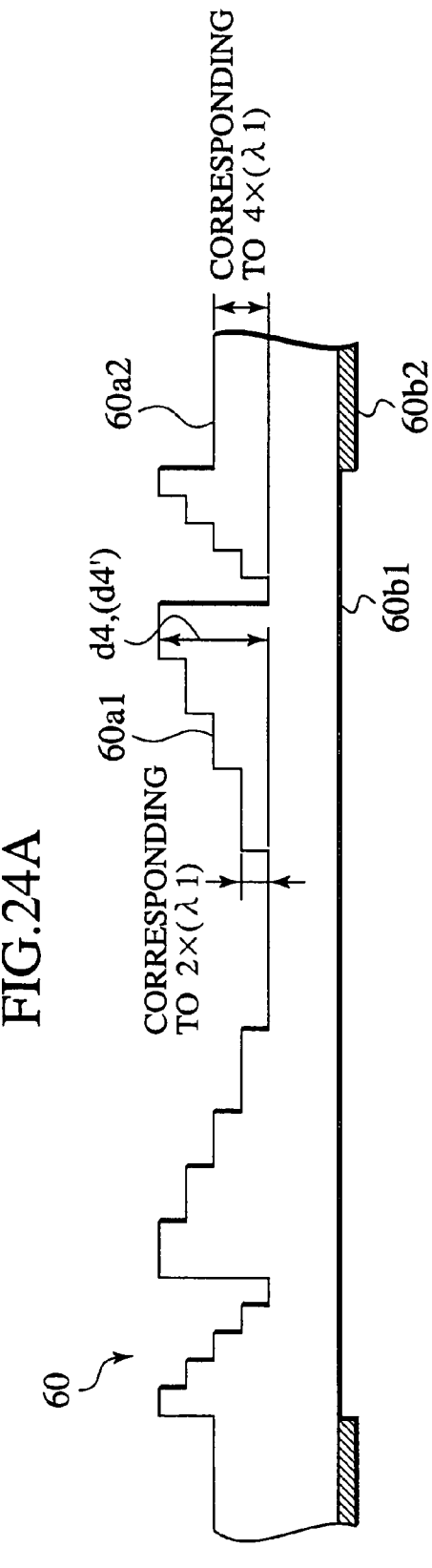
FIGS. 24A and 24B are enlarged views of the stair-like diffraction pattern portion including the 5-stair structure in Embodiment 4.
Figure 24B:
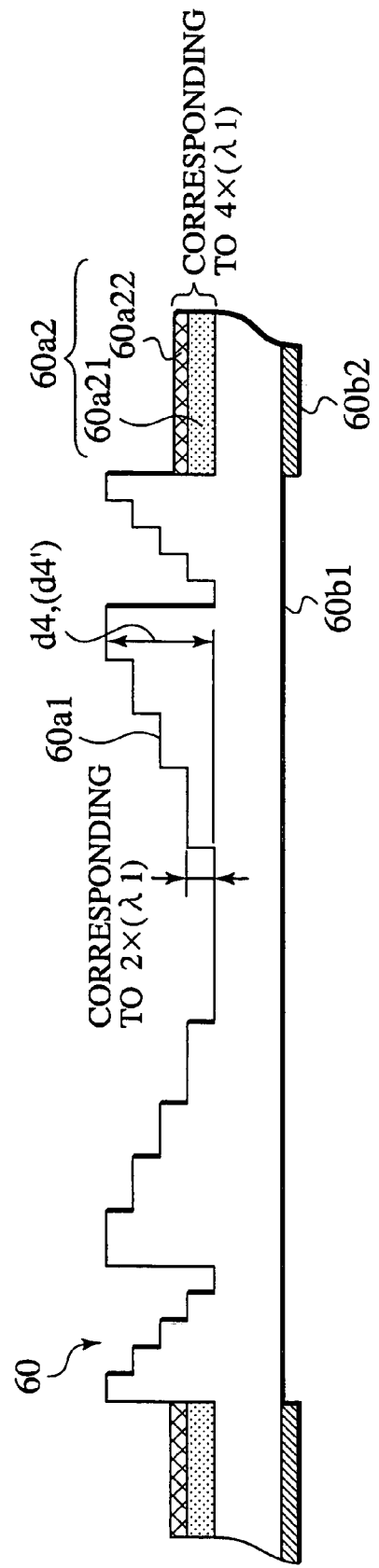
Figure 26A:
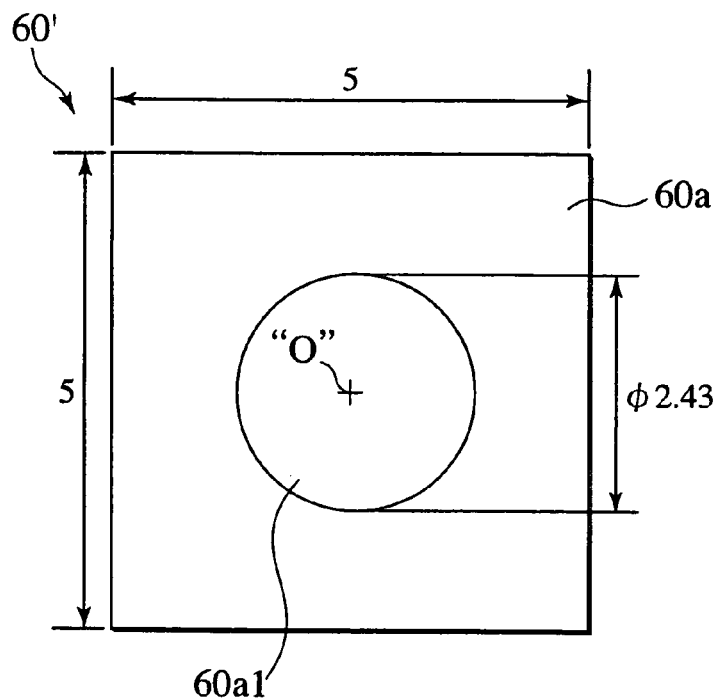
FIGS. 26A to 26C are explanatory views of the aberration correction element as a modification in which the aberration correction element in Embodiment 4 is partially simplified, where
Figure 26B:
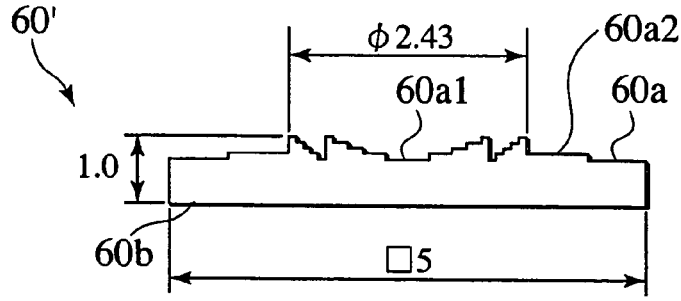
Figure 26C:
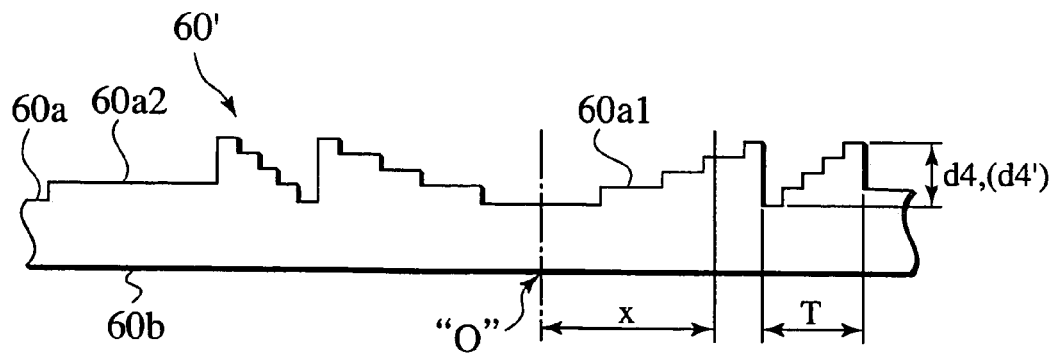
Figure 27:
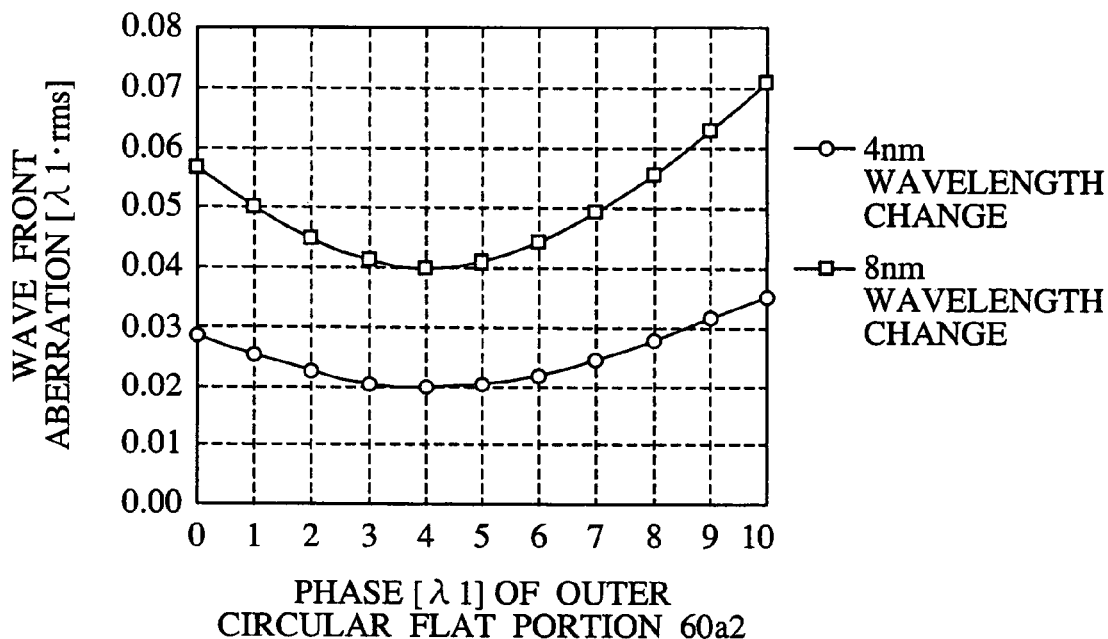
FIG. 27 is a diagram showing a relation between a wave front phase and wave front aberration of an outer circular region in a case where chromatic aberration is corrected by the aberration correction element including the 5-stair structure.
Figure 28:
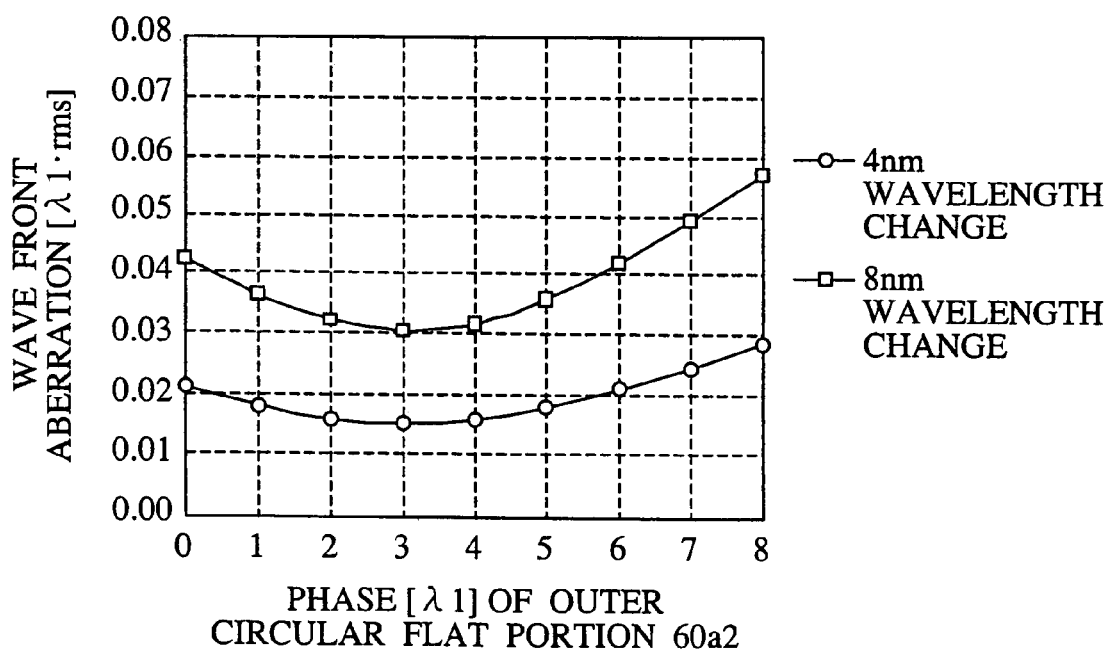
FIG. 28 is a diagram showing a relation between the wave front phase and wave front aberration of the outer circular region in a case where the chromatic aberration is corrected by the aberration correction element including the 4-stair structure.

FIGS. 23A to 23C are explanatory views of the aberration correction element in Embodiment 4, where FIG. 23A is a top plan view, FIG. 23B is a front view, and FIG. 23C is an enlarged view of the stair-like diffraction pattern portion of the 5-stair structure. FIGS. 24A and 24B are enlarged views of the stair-like diffraction pattern portion of the 5-stair structure in Embodiment 4. FIGS. 25A and 25B are enlarged views of the stair-like diffraction pattern portion including the 4-stair structure in Embodiment 4. FIGS. 26A to 26C are explanatory views of the aberration correction element as a modification in which the aberration correction element in Embodiment 4 is partially simplified, where FIG. 26A is a top plan view, FIG. 26B is a front view, and FIG. 26C is an enlarged view of the stair-like diffraction pattern portion of the 5-stair structure. FIG. 27 is a diagram showing a relation between a wave front phase and wave front aberration of an outer circular region in a case where chromatic aberration is corrected by the aberration correction element of the 5-stair structure. FIG. 28 is a diagram showing a relation between the wave front phase and wave front aberration of the outer circular region in a case where the chromatic aberration is corrected by the aberration correction element of the 4-stair structure.

In Embodiment 4, since the structures of the optical pickup device and optical recording medium driving apparatus except an aberration correction element 60 of the 5-stair structure shown in FIGS. 23A to 23C and 24A and 24B, an aberration correction element 61 of the 4-stair structure shown in FIGS. 25A and 25B, and an aberration correction element 60' of the 5-stair structure of a modification shown in FIGS. 26A to 26C are the same as those of Embodiment 1 or 2, the detailed description is omitted. These aberration correction elements 60, 61, 60' are also applicable to optical pickup device 20A and optical disc driving apparatus 10A of Embodiment 1 or the optical pickup device 20B and optical disc driving apparatus 10B of Embodiment 2.

As shown in FIGS. 23A to 23C, in the aberration correction element 60 constituting the main part of Embodiment 4, the outer configuration is formed in the 5 mm square using borosilicate crown glass (BK7) having the transmittance and having a thickness of 1.0 mm.

Moreover, in the aberration correction element 60, a stair-like diffraction pattern portion 60a1 is protruded upwards from an upper surface 60a and has a stair number of five, and the stair-like concave portion is formed in a ring shape (annular strip shape) in the inner circular region having a diameter φ2.43 mm centering on the center "O" on the upper surface 60a side facing the objective lens 31 (FIG. 15). Moreover, in the outer circular region adjacent to the periphery of the stair-like diffraction pattern portion 60a1 and having a diameter φ2.43 mm or more and φ3.8 mm or less, an outer circular flat portion 60a2 is slightly protruded upwards from the upper surface 60a. The upper surface 60a is flat outside this outer circular flat portion 60a2.

When viewed in the microscopic manner, in the stair-like diffraction pattern portion 60a1 of the aberration correction element 60, the number n of stairs of the stair structure is five, and therefore the number n−1 of steps is four. On the other hand, when viewed in the macroscopic manner, a plurality of pattern portions are formed in the annular shape in such a manner that the repeating period T of the stair-like concave portions is gradually shortened or lengthened toward the outer circular portion from the inner circular portion, and the multistage blade-like (saw teeth-like) diffraction pattern is constituted.

In this case, when the depth of the whole stair-like concave portion in the stair-like diffraction pattern portion 60a1 including the 5-stair structure whose step number is four is determined, it also can be shown by the above-described equations (8) and (9) in the same manner as in Embodiment 3. Then, the depth d4 of the whole stair-like concave portion in the stair-like diffraction pattern portion 60a1 with respect to the 0-order light of the first laser light L1, and the depth d4' of the whole stair-like concave portion in the stair-like diffraction pattern portion 60a1 with respect to the 1st order light of the second laser light L2 can be obtained.

Moreover, assuming that the depth of the whole stair-like concave portion in the stair-like diffraction pattern portion 60a1 including the 5-stair structure having a step number of four is d4, d4', the depth of the stair-like concave portion per stair is (d4)/4, (d4)'/4. The depth (d4)/4, (d4)'/4 of the stair-like concave portion per stair is set to be the optical path difference corresponding to twice the wavelength λ1 of the first laser light L1 in the same manner as in Embodiment 3.

Moreover, in an example of the outer circular flat portion 60a2 of the aberration correction element 60, as enlarged and shown in FIG. 24A, the flat portion is formed integrally with the stair-like diffraction pattern portion 60a1 including the 5-stair structure. Moreover, a height to the surface (upper surface) of the outer circular flat portion 60a2 from the position of a stair-like concave portion lowermost stair in the stair-like diffraction pattern portion 60a1 of the 5-stair structure is set to be the optical path difference corresponding to four times (n−1=4) the wavelength λ1 of the first laser light L1. Accordingly, the aberration correction element 60 is formed so as to reduce a chromatic aberration with respect to the first laser light L1.

In another example of the outer circular flat portion 60a2 of the aberration correction element 60, as enlarged and shown in FIG. 24B, the flat portion is formed by a coating film separate from the stair-like diffraction pattern portion 60a1 of the 5-stair structure. As the coating film, for example, a ZnS film 60a21 having a refractive index of about 2.2 with respect to a visible light is formed to be thick. Since the ZnS film 60a21 has absorbency, an MgF2 film 60a22 having a refractive index of about 1.38 with respect to the visible light is formed to be thin on the ZnS film 60a21. Moreover, since the height to the surface (upper surface) of the outer circular flat portion 60a2 by the ZnS film 60a21 and MgF2 film 60a22 from the position of the stair-like concave portion lowermost stair in the stair-like diffraction pattern portion 60a1 of the n-stair structure having the stair number n=5 is set to be the optical path difference corresponding to 4 (n−1=4) times the wavelength λ1 of the first laser light L1. The aberration correction element 60 is formed so as to reduce the chromatic aberration with respect to the first laser light L1. It is to be noted that the coating film forming the outer circular flat portion 60a2 may be a single layer or two or more layers.

In the above description, the stair-like diffraction pattern portion 60a1 of the aberration correction element 60 having n=5 (five values) has been described, but n may also be an integer of 3 or more.

For example, instead of the aberration correction element 60 in which the stair-like diffraction pattern portion 60a1 of the 5-stair structure is formed, as enlarged and shown in FIGS. 25A and 25B, the aberration correction element 61 includes a stair-like diffraction pattern portion 61a1 of the 4-stair structure having a step number of three, and an outer circular flat portion 61a2. In this application, in the above-described equations (8), (9), assuming that the depth of the whole stair-like concave portion in the stair-like diffraction pattern portion 60a1 with respect to the 0-order light of the first laser light L1 is d3, and the depth of the whole stair-like concave portion in the stair-like diffraction pattern portion 60a1 with respect to the 1st order light of the second laser light L2 is d3', the depth of the stair-like concave portion per stair is (d3)/3, (d3')/3. The depth (d3)/3, (d3')/3 of the stair-like concave portion per stair is set to be the optical path difference corresponding to twice the wavelength λ1 of the first laser light L1.

In this case, as enlarged and shown in FIG. 25A, when the stair-like diffraction pattern portion 61a1 is integrally formed with the outer circular flat portion 61a2 in the aberration correction element 61, the height to the surface (upper surface) of the outer circular flat portion 61a2 from the position of the stair-like concave portion lowermost stair in the stair-like diffraction pattern portion 61a1 of the n-stair structure having the stair number n=4 is set to be the optical path difference corresponding to 3 (n−1=3) times the wavelength λ1 of the first laser light L1. The aberration correction element 61 is formed so as to reduce the chromatic aberration with respect to the first laser light L1.

On the other hand, as enlarged and shown in FIG. 25B, when the stair-like diffraction pattern portion 61a1 is formed separately from the outer circular flat portion 61a2 in the aberration correction element 61, the height to the surface (upper surface) of the outer circular flat portion 61a2 by a ZnS film 61a21 and MgF2 film 61a22 from the position of the stair-like concave portion lowermost stair in the stair-like diffraction pattern portion 61a1 of the n-stair structure having the stair number n=4 is set to be the optical path difference corresponding to 3 (n−1=3) times the wavelength λ1 of the first laser light L1. The aberration correction element 61 is formed so as to reduce the chromatic aberration with respect to the first laser light L1.

Again, returning to FIGS. 23A to 23C, on an undersurface 60b of the aberration correction element 60, a light-transparent flat portion 60b1 is formed in the circular shape in the inner circular region having a diameter φ2.43 mm or less centering on the center "O" at the portion corresponding to the upper side stair-like diffraction pattern portion 60a1. Moreover, an aperture limiting portion 60b2 for the second laser light is formed in the annular shape using the dichroic film so as to limit the numerical aperture into the objective lens 31 to 0.6 with respect to the second laser light L2 in an outer circular region having a diameter φ2.43 mm or more and φ3.8 mm or less. The limiting portion corresponds to the upper side outer circular flat portion 60a2 and is adjacent to the periphery of the light-transparent flat portion 60b1. In this case, instead of forming the outer circular flat portion 60a2 by the ZnS film 60a21 and MgF2 film 60a22 on the upper surface 60a side as described above with reference to FIG. 24B, the ZnS film 60a21 and MgF2 film 60a22 may be additionally formed on the aperture limiting portion 60b2 for the second laser light in the undersurface 60b. Accordingly, the structure is capable of serving also as a structure for reducing the chromatic aberration with respect to the first laser light L1.

It is to be noted that even in Embodiment 4, the aberration correction element 60' shown in FIGS. 26A to 26C may also be used in order to partially simplify the aberration correction element 60. In the aberration correction element 60', the stair-like diffraction pattern portion 60a1 of the 5-stair structure and outer circular flat portion 60a2 are formed on the upper surface 60a side, but the undersurface 60b is formed to be simply flat without forming the aperture limiting portion for the second laser light for limiting the numerical aperture into the objective lens 31 with respect to the second laser light L2. Needless to say, even in the aberration correction element 61 of the 4-stair structure shown in FIGS. 25A and 25B, the aberration correction element (61' . . . not shown) of the modification partially simplified as described above may also be formed.

Furthermore, the shape of the stair-like concave portion of the stair-like diffraction pattern portion 60a1 of the 5-stair structure or the stair-like diffraction pattern portion 61a1 of the 4-stair structure can be calculated by applying the equation (3) described above while replacing x therein with the distance of the radial direction from the center "O" of the stair-like diffraction pattern portion 60a1 (or 61a1) and also applying d above to apply the equations (8), (9) and Table 1.

Moreover, since the operation of the above-described aberration correction element 60, 60', 61, (61' . . . not shown) is the same as that of the aberration correction element 42, 42' described above in Embodiment 2, or the aberration correction element 50, 50' of Embodiment 3, the description is omitted here.

Furthermore, the diffraction efficiency of the 0-order light of the macro structure at a time when the first laser light L1 having the wavelength λ1=405 nm for the extra-high density optical disc is incident upon the aberration correction element 60 of the 5-stair structure in Embodiment 4 or the aberration correction element 60' of the modification, and that of the 1st order light at a time when the second laser light L2 having the wavelength λ2=660 nm for the DVD are the same as those in Embodiment 3 described above with reference to FIG. 22. Therefore, the description is omitted.

On the other hand, since the diffraction efficiency in the aberration correction element 61 of the 4-stair structure is also the same as that in Embodiment 2 described above with respect to FIG. 19, the description is omitted.

Here, in the stair-like diffraction pattern portion 60a1 of the 5-stair structure formed on the upper surface 60a side of the aberration correction element 60, 60' of the 5-stair structure, the depth (d4)/4, (d4')/4 of the stair-like concave portion per stair corresponds to twice the wavelength λ1 of the first laser light L1. Therefore, a phase difference of 10 wavelengths is generated in the first laser light L1 passed through the stair-like diffraction pattern portion 60a1 in a place where the phase is most advanced or delayed in consideration of the micro structure. In this case, since the phase difference is an integer times with the first laser light L1 having a reference wavelength of 405 nm, any change is not generated in the wave front. However, when the wavelength λ1 of the first laser light L1 changes by about 1% (±4 nm), a phase difference of 10% is generated in the first laser light L1 passed through the stair-like diffraction pattern portion 60a1. This means that there is a large influence of the chromatic aberration by the wavelength change. Needless to say, even in the aberration correction element 61, (61' . . . not shown) of the 4-stair structure, the depth (d3)/3, (d3')/3 of the stair-like concave portion per stair corresponds to twice the wavelength λ1 of the first laser light L1 in the stair-like diffraction pattern portion 61a1, the above description also applies.

Moreover, when the phase difference given by the outer circular flat portion 60a2 formed on the upper surface 60a side of the aberration correction element 60, 60' of the 5-stair structure is integer times the wavelength of the first laser light L1 having a reference wavelength of 405 nm, the diffraction efficiency of the 0-order light is not influenced. Therefore, as described above with reference to FIG. 24A or 24B, since the phase difference is set to be four times the wavelength λ1 of the first laser light L1 with respect to the stair-like diffraction pattern portion 60a1, the chromatic aberration can be reduced as shown in FIG. 27.

That is, in FIG. 27, in consideration of the chromatic aberration correction by the aberration correction element 60, 60' of the 5-stair structure, the abscissa indicates a phase [λ1] of the outer circular flat portion 60a2, and the ordinate indicates a wave front aberration [λ1·rms]. When the wavelength λ1 of the first laser light L1 changes by 1% (4 nm) with respect to the reference wavelength of 405 nm as shown by mark ○, or changes by 2% (8 nm) as shown by □, the phase difference of the outer circular flat portion 60a2 described above with reference to FIG. 24A or 24B is changed with respect to the stair-like diffraction pattern portion 60a1. Accordingly, the wave front aberration of the aberration correction element 60 in which the stair-like diffraction pattern portion 60a1 is combined with the outer circular flat portion 60a2 is shown.

It is seen from FIG. 27 that the wave front aberration of the whole aberration correction element 60, 60' changes by the phase difference of the outer circular flat portion 60a2 of the aberration correction element 60, 60'. However, when the phase difference of the outer circular flat portion 60a2 is set to correspond to four times the wavelength λ1 of the first laser light L1, the chromatic aberration of the whole aberration correction element 60, 60' can be reduced.

It is to be noted that in FIG. 28, when the chromatic aberration is corrected by the aberration correction element 61, (61'... not shown) of the 4-stair structure instead of the aberration correction element 60 of the 5-stair structure, the abscissa indicates a phase [λ1] of the outer circular flat portion 61a2, and the ordinate indicates a wave front aberration [λ1·rms]. In this case, the wave front aberration of the whole aberration correction element 61, (61') changes by the phase difference of the outer circular flat portion 61a2 described above with reference to FIG. 25A or 25B in the same manner as described above. However, when the phase difference of the outer circular flat portion 61a2 is set to correspond to three times the wavelength λ1 of the first laser light L1, it is seen that the chromatic aberration of the whole aberration correction element 61, (61') can be reduced.

It should be understood that many modifications and adaptations of the invention will become apparent to those skilled in the art and it is intended to encompass such obvious modifications and changes in the scope of the claims appended hereto.

What is claimed is:

1. An optical pickup device which selectively records or reproduces data on or from a first optical recording medium, a second optical recording medium having a recording density lower than that of the first optical recording medium and having a substrate thickness larger than that of the first optical recording medium, and a combined optical recording medium including combined and integrally stacked signal surfaces of the first and second optical recording mediums, the device comprising:
    a first laser light source which emits a first laser light having a wavelength of 450 nm or less for the first optical recording medium;
    a second laser light source which emits a second laser light having a wavelength longer than that of the first laser light for the second optical recording medium;
    an objective lens whose numerical aperture (NA) is set to 0.75 or more for the first optical recording medium and in which at least one of first and second surfaces turning to a reverse direction each other is formed in a nonspherical surface and which converges the first and second laser lights on the respective signal surfaces of the first and second optical recording mediums; and
    an aberration correction element in which a circular light-transparent flat portion and an annular aperture limiting portion for the second laser light are formed toward an outer circular portion from a central portion on the side of the first and second laser light sources and in which a diffraction pattern portion is formed in an inner circular region on the side of the objective lens and in which an outer side of the diffraction pattern portion is flatted,
    wherein the aberration correction element transmits the first laser light, which is incident thereon in a parallel light state, as such through the light-transparent flat portion and the aperture limiting portion for the second laser light, transmits the first laser light without diffracting the first laser light through the diffraction pattern portion, and allows a 0-order light thereof to be incident upon the objective lens, and
    the aberration correction element interrupts the second laser light, which is incident thereon in the parallel light state, by the aperture limiting portion for the second laser light to limit the numerical aperture into the objective lens to a predetermined numerical aperture, transmits the second laser light through the light-transparent flat portion, and thereafter diffracts the second laser light by the diffraction pattern portion so that a 1st order light of the second laser light capable of correcting a spherical aberration that will occur on the objective lens is incident upon the objective lens.

2. The optical pickup device according to claim 1, wherein in the diffraction pattern portion, a plurality of concave/convex diffraction pattern portions formed in a concave/convex state are formed in an annular form in such a manner that a concave/convex repeating period is gradually shortened or lengthened toward an outer circular portion from an inner circular portion, and a depth of a concave portion in the diffraction pattern portion is set to be between a depth capable of obtaining a maximum diffraction efficiency with respect to the first laser light and a depth capable of obtaining a maximum diffraction efficiency with respect to the second laser light.

3. The optical pickup device according to claim 1, wherein in the diffraction pattern portion, a plurality of concave/convex diffraction pattern portions formed in a concave/convex state are formed in an annular form in such a manner that a concave/convex repeating period is gradually shortened or lengthened toward an outer circular portion from an inner circular portion, and a depth of a concave portion in the diffraction pattern portion is set to be equal to an optical path difference corresponding to the wavelength of the first laser light.

4. The optical pickup device according to claim 1, wherein in the diffraction pattern portion, a plurality of stair-like diffraction pattern portions formed in a stair concave state including n (n is a natural number of 3 or more) or more stairs are formed in an annular form in such a manner that a period of a stair-like concave portion is gradually shortened or lengthened toward an outer circular portion from an inner circular portion, and a depth of the whole stair-like concave portion in the diffraction pattern portion is set to be between a depth capable of obtaining a maximum diffraction efficiency with respect to the first laser light and a depth capable of obtaining a maximum diffraction efficiency with respect to the second laser light.

5. The optical pickup device according to claim 4, wherein an outer circular flat portion is formed outside the stair-like diffraction pattern portion, and a height to the surface of the outer circular flat portion from a position of a stair-like concave portion lowermost stair in the diffraction pattern portion is set to be an optical path difference corresponding to (n−1) times the wavelength of the first laser light.

6. The optical pickup device according to claim 1, wherein in the diffraction pattern portion, a plurality of stair-like diffraction pattern portions formed in a stair concave state including n (n is a natural number of 3 or more) or more stairs are formed in an annular form in such a manner that a period of a stair-like concave portion is gradually shortened or lengthened toward an outer circular portion from an inner circular portion, and a depth of the whole stair-like concave portion per stair is set to be an optical path difference corresponding to twice the wavelength of the first laser light.

7. The optical pickup device according to claim 6, wherein an outer circular flat portion is formed outside the stair-like diffraction pattern portion, and a height to the surface of the outer circular flat portion from a position of a stair-like concave portion lowermost stair in the diffraction pattern portion is set to be an optical path difference corresponding to (n−1) times the wavelength of the first laser light.

8. An optical pickup device which selectively records or reproduces data on or from a first optical recording medium, a second optical recording medium having a recording density lower than that of the first optical recording medium and having a substrate thickness larger than that of the first optical recording medium, and a combined optical recording medium including combined and integrally stacked signal surfaces of the first and second optical recording mediums, the device comprising:

a first laser light source which emits a first laser light having a wavelength of 450 nm or less for the first optical recording medium;

a second laser light source which emits a second laser light having a wavelength longer than that of the first laser light for the second optical recording medium;

an objective lens whose numerical aperture (NA) is set to 0.75 or more for the first optical recording medium and in which at least one of first and second surfaces turning to a reverse direction each other is formed in a non-spherical surface and which converges the first and second laser lights on the respective signal surfaces of the first and second optical recording mediums; and an aberration correction element which is formed to be flat on the side of the first and second laser light sources and in which a diffraction pattern portion is formed in an inner circular region on the side of the objective lens and in which an outer side of the diffraction pattern portion is formed to be flat, wherein the aberration correction element transmits the first laser light, which is incident thereon in a parallel light state, without diffracting the first laser light through the diffraction pattern portion, and allows a 0-order light thereof to be incident upon the objective lens, and the aberration correction element diffracts only light through the diffraction pattern portion of the second laser light, which is incident thereon in the parallel light state, so that a 1st order light of the second laser light capable of correcting a spherical aberration that will occur on the objective lens is incident upon the objective lens.

9. The optical pickup device according to claim 8, wherein in the diffraction pattern portion, a plurality of concave/convex diffraction pattern portions formed in a concave/convex state are formed in an annular form in such a manner that a concave/convex repeating period is gradually shortened or lengthened toward an outer circular portion from an inner circular portion, and a depth of a concave portion in the diffraction pattern portion is set to be between a depth capable of obtaining a maximum diffraction efficiency with respect to the first laser light and a depth capable of obtaining a maximum diffraction efficiency with respect to the second laser light.

10. The optical pickup device according to claim 8, wherein in the diffraction pattern portion, a plurality of concave/convex diffraction pattern portions formed in a concave/convex state are formed in an annular form in such a manner that a concave/convex repeating period is gradually shortened or lengthened toward an outer circular portion from an inner circular portion, and a depth of a concave portion in the diffraction pattern portion is set to be equal to an optical path difference corresponding to the wavelength of the first laser light.

11. The optical pickup device according to claim 8, wherein in the diffraction pattern portion, a plurality of stair-like diffraction pattern portions formed in a stair concave state including n (n is a natural number of 3 or more) or more stairs are formed in an annular form in such a manner that a period of a stair-like concave portion is gradually shortened or lengthened toward an outer circular portion from an inner circular portion, and a depth of the whole stair-like concave portion in the diffraction pattern portion is set to be between a depth capable of obtaining a maximum diffraction efficiency with respect to the first laser light and a depth capable of obtaining a maximum diffraction efficiency with respect to the second laser light.

12. The optical pickup device according to claim 11, wherein an outer circular flat portion is formed outside the stair-like diffraction pattern portion, and a height to the surface of the outer circular flat portion from a position of a stair-like concave portion lowermost stair in the diffraction pattern portion is set to be an optical path difference corresponding to (n−1) times the wavelength of the first laser light.

13. The optical pickup device according to claim 8, wherein in the diffraction pattern portion, a plurality of stair-like diffraction pattern portions formed in a stair concave state including n (n is a natural number of 3 or more) or more stairs are formed in an annular form in such a manner that a period of a stair-like concave portion is gradually shortened or lengthened toward an outer circular portion from an inner circular portion, and a depth of the whole stair-like concave portion per stair is set to be an optical path difference corresponding to twice the wavelength of the first laser light.

14. The optical pickup device according to claim 13, wherein an outer circular flat portion is formed outside the stair-like diffraction pattern portion, and a height to the surface of the outer circular flat portion from a position of a stair-like concave portion lowermost stair in the diffraction pattern portion is set to be an optical path difference corresponding to (n−1) times the wavelength of the first laser light.

15. An optical recording medium driving apparatus in which a first optical recording medium, a second optical recording medium having a recording density lower than that of the first optical recording medium and having a substrate thickness larger than that of the first optical recording medium, and a combined optical recording medium including combined and integrally stacked signal surfaces of the first and second optical recording mediums are selectively attached onto a rotatable turntable, and an information signal is recorded on or reproduced from the signal surface of the first or second optical recording medium by an optical pickup device, wherein the optical pickup device according to claim 1 is applied, the aberration correction element and the objective lens having optical axes aligned with each other are stored in a lens holder, and the lens holder is supported rockably in a focus direction and a tracking direction of the first and second optical recording mediums.

16. An optical recording medium driving apparatus in which a first optical recording medium, a second optical recording medium having a recording density lower than that of the first optical recording medium and having a substrate thickness larger than that of the first optical recording medium, and a combined optical recording medium including combined and integrally stacked signal surfaces of the first and second optical recording mediums are selectively attached onto a rotatable turntable, and an information signal is recorded on or reproduced from the signal surface of the first or second optical recording medium by an optical pickup device, wherein the optical pickup device according to claim 8 is applied, the aberration correction element and the objective lens having optical axes aligned with each other are stored in a lens holder, and the lens holder is supported rockably in a focus direction and a tracking direction of the first and second optical recording mediums.

* * * * *